(12) United States Patent
Mitsunaga

(10) Patent No.: US 7,570,390 B2
(45) Date of Patent: Aug. 4, 2009

(54) IMAGE PROCESSING DEVICE AND METHOD

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 677 days.

(21) Appl. No.: 10/507,274

(22) PCT Filed: Dec. 10, 2003

(86) PCT No.: PCT/JP03/15758

§ 371 (c)(1),
(2), (4) Date: Sep. 8, 2004

(87) PCT Pub. No.: WO2004/064388

PCT Pub. Date: Jul. 29, 2004

(65) Prior Publication Data

US 2005/0226526 A1  Oct. 13, 2005

(30) Foreign Application Priority Data

Jan. 9, 2003  (JP)  ............... 2003-003134
Jan. 9, 2003  (JP)  ............... 2003-003135

(51) Int. Cl.
*G06F 15/00* (2006.01)
*G06K 1/00* (2006.01)
*H04N 1/60* (2006.01)
*G06K 15/00* (2006.01)
*H04N 1/405* (2006.01)

(52) U.S. Cl. .......................... 358/1.9; 358/3.1
(58) Field of Classification Search ................. 358/448, 358/463, 518; 382/266; 348/607
See application file for complete search history.

(56) References Cited

U.S. PATENT DOCUMENTS 5,517,333 A * 5/1996 Tamura et al. ............... 358/518
6,075,926 A * 6/2000 Atkins et al. ................ 358/1.2

(Continued)

FOREIGN PATENT DOCUMENTS

JP  04-321379  11/1992

(Continued)

OTHER PUBLICATIONS

Gonzalez, Rafael C. and Woods, Richard E. Digital Image Processing, Second Edition. pp. 82 and 85 included.*

*Primary Examiner*—Douglas Q Tran
(74) *Attorney, Agent, or Firm*—Finnegan, Henderson, Farabow, Garrett & Dunner, L.L.P.

(57) ABSTRACT

The present invention relates to an image processing apparatus and a method, and in particular to an image processing apparatus and a method preferably applicable to conversion of a wide dynamic-range image having a dynamic range of pixel values wider than the normal one to a narrow dynamic-range image having a narrower dynamic range of pixel values, and to enhancement of contrast. In step S1, an input wide-DR luminance image of the current frame is converted into a narrow-DR luminance image based on the intermediate information calculated for the previous frame's wide-DR luminance image. In step S2, the stored intermediate information of the previous frame is updated using the calculated intermediate information. In step S3, it is determined if there is any succeeding frame. If there is the succeeding frame, the process returns to step S1 and processes thereafter are repeated. The present invention is applicable to a digital video camera and the like.

9 Claims, 45 Drawing Sheets

U.S. PATENT DOCUMENTS

| | | | |
|---|---|---|---|
| 6,856,704 B1 * | 2/2005 | Gallagher et al. | 382/263 |
| 7,081,918 B2 * | 7/2006 | Takemoto | 348/223.1 |
| 7,110,604 B2 * | 9/2006 | Olsson | 382/224 |
| 7,272,265 B2 * | 9/2007 | Kouri et al. | 382/260 |
| 2001/0041018 A1 * | 11/2001 | Sonoda | 382/275 |
| 2002/0008762 A1 | 1/2002 | Takemoto | |
| 2005/0053280 A1 | 3/2005 | Nishikawa | |

FOREIGN PATENT DOCUMENTS

| | | |
|---|---|---|
| JP | 06-090382 | 3/1994 |
| JP | 11-341511 | 12/1999 |
| JP | 2000-115534 | 4/2000 |
| JP | 2000-137805 | 5/2000 |
| JP | 2001-086369 | 3/2001 |
| JP | 2001-218057 | 8/2001 |
| JP | 2002-016821 | 1/2002 |
| JP | 2002-16939 | 1/2002 |
| JP | 2002-084446 | 3/2002 |
| JP | 2002-238016 | 8/2002 |
| JP | 2002-269582 | 9/2002 |

* cited by examiner

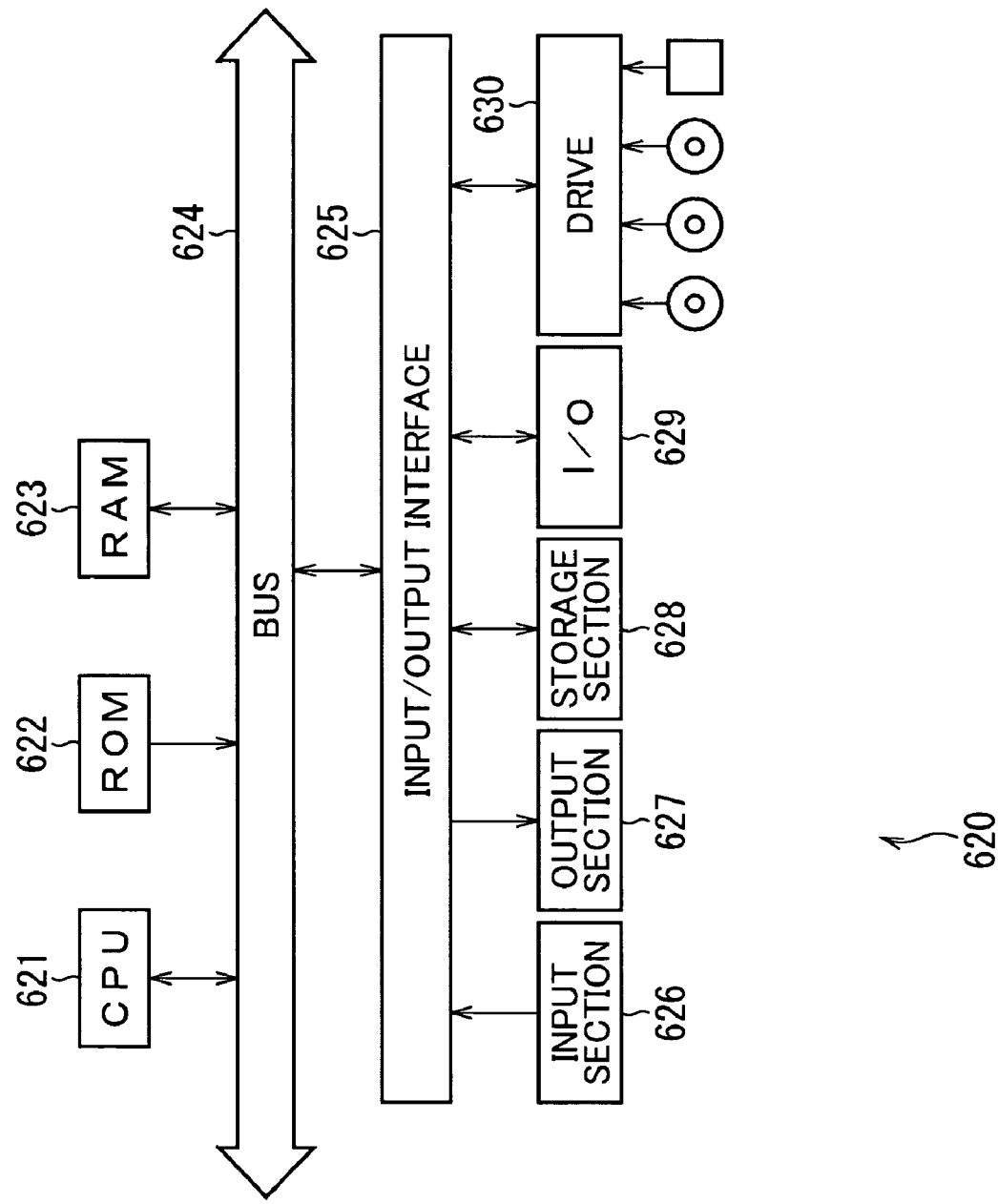

IMAGE PROCESSING DEVICE AND METHOD

TECHNICAL FIELD

The present invention relates to an image processing apparatus and a method, and in particular to an image processing apparatus and a method preferably applicable to conversion of a wide dynamic-range image having a dynamic range of pixel values wider than the normal one to a narrow dynamic-range image having a narrower dynamic range of pixel values, and to enhancement of contrast.

BACKGROUND ART

Conventionally, solid-state imaging elements such as CCD (Charge Coupled Device) and CMOS (Complementary Metal-Oxide Semiconductor) have been widely used for the imaging instruments such as video cameras and still cameras; and optical measurement apparatuses such as component inspection apparatus used in FA (Factory Automation) and optical measurement apparatuses such as electronic fiberscope used in ME (Medical Electronics).

In recent years, there are proposed a large number of techniques for obtaining an image having a wide dynamic-range (referred to as "wide-DR image", hereinafter) of pixel values in comparison with that of optical film photograph using these solid-state imaging elements.

On the other hand, display apparatuses for displaying moving image and still image such as CRT (Cathode Ray Tube) and LCD (Liquid Crystal Display), projection apparatuses such as projector, and various printing apparatuses are not yet widened in their supportable dynamic range of pixel values at present, and have only a limited range of supportable luminance grayscale. Hence the present status is that, even a wide-DE image should have successfully pictured, there are no apparatuses capable of displaying, projecting or printing the image as it is obtained.

Hence there is a need for a technique (referred to as "grayscale compression technique", hereinafter) by which the dynamic range of pixel values of the wide-DR image is narrowed, or in other words, the luminance grayscale is compressed, so as to produce an image (referred to as "narrow-DR image", hereinafter) adapted to the dynamic range of the display apparatuses and so forth.

The following paragraphs will explain a conventionally-proposed grayscale compression technique. The grayscale compression technique can simply be achieved by re-assigning the grayscale of pixel values of the wide-DR image so as to be suited to grayscale of a narrower dynamic range supportable by the display apparatuses or the like.

However, as described in the above, a uniform re-assignment of the grayscale of pixel values of the wide-DR image simply to the narrow dynamic-range only results in a reduced luminance variation of the image as a whole, and consequently in conversion into a poorly-looking image with a degraded contrast. There are conventionally proposed some grayscale compression techniques capable of suppressing the loss in contrast. Three grayscale compression techniques ever proposed will be explained below.

A technique which can be exemplified as a first grayscale compression technique relates to an adaptive determination of a grayscale redistribution rule based on a histogram of luminance of an input wide-DR image (more specifically, calculation of a grayscale conversion curve based on a histogram of an input image). The first grayscale compression technique is on the premise that a principal subject in an image has a large ratio of occupational area, and is to determine a grayscale conversion curve so as to assign the grayscale as much as possible to a luminance value at around a peak in the histogram, to thereby suppress lowering in the contrast of at least the principal subject.

It is, however, difficult to obtain a satisfactory result in every circumference only by an effort based on the grayscale assignment. In an exemplary case where an image has a plurality of principal subjects and has a background with a uniform luminance and a relatively wide area (e.g., blue sky), the subjects often fail in obtaining a sufficient grayscale assigned thereto.

A technique which can be exemplified as a second grayscale compression technique relates to an emphasis of high-frequency components of an image either before or after the grayscale conversion. The second grayscale compression technique is to estimate a portion of contrast lost (or supposed to be lost) through the grayscale conversion, and to compensate the lost portion using a high-frequency filter such as for unsharp masking.

The second grayscale compression technique is advantageous in that it does not raise a problem dependent on composition of image unlike the first grayscale compression technique. The high-frequency filter is, however, causative of overshoot at the contour portion of the subject and of noise emphasis at the flat portion, and is therefore understood as being not capable of always ensuring desirable images.

A technique which can be exemplified as a third grayscale compression technique relates to division of a wide-DR image into a low-frequency-component image and a high-frequency-component image, wherein only the low-frequency-component image is subjected to a proper grayscale conversion processing while leaving the high-frequency-component image unmodified, and the both finally added to produce one synthetic image.

Because the high-frequency-component image is left unmodified in the third grayscale conversion technique, lowering in the contrast due to the grayscale conversion is successfully avoidable. The third grayscale conversion technique, however, still suffers from a problem of overshoot at the contour portion of the subject, and noise emphasis at the flat portion similarly to the second grayscale conversion technique, so that there is also proposed a method of solving the problem by using a non-linear filter (e.g., median filter) in the process of division into the low-frequency-component image and high-frequency-component image.

Summarizing now the first to third grayscale compression techniques described in the above, they can be classified into those effecting the grayscale compression through a relatively local processing using neighboring pixels (first and second grayscale compression techniques), and that effecting the grayscale compression using an entire portion or a relatively large area of the image (third grayscale compression technique). The former results in an unnatural image having only the high-frequency component thereof enhanced, and is far from successful in obtaining effective grayscale compression results. The latter is successful in obtaining a more natural image than obtainable by the former and is said to be more effective in the grayscale compression, because it can adjust also components of relatively low frequencies in parallel to the emphasis of the high-frequency-components.

The latter, however, suffers from a problem in that the process therefor needs a large-capacity memory mainly for the delay line or frame memory, so that it is not adaptive to hardware construction. For instance, the third grayscale compression technique needs a spatial filter for dividing a luminance into a plurality of frequency components, wherein it is necessary to incorporate a large amount of delay lines into the circuit in order to allow installation of a large spatial filter, because a non-artificial, effective grayscale compression is available only when a large spatial filter relative to the image is used.

Meanwhile, for an exemplary case where a function for subjecting a wide-DR image to the grayscale compression processing is intended to be installed on the output section of an imaging apparatus such as digital video camera and digital still camera, there is a large need for the function of grayscale compression processing of the digital still camera, for example, to be incorporated into a hardware, because high-speed signal processing is necessary in order to output image signals while ensuring a predetermined frame rate. Even for a digital still camera for photographing still images, for example, there is a demand for high-speed grayscale compression processing, because it is necessary to output a monitored image to a finder in order to determine a composition of the image.

As described in the above, there is a strong demand for the grayscale compression technique which requires only a small memory capacity to be consumed and a light load of calculation, allows easy hardware construction, and ensures a large grayscale compression effect. This sort of grayscale compression technique has, however, not been proposed yet.

Additional problems, as described below, commonly reside in the above-described first to third grayscale compression techniques.

A first problem relates to generation of overshoot in the luminance at the contour portion of the subject in parallel with emphasis of the high-frequency components.

To suppress this, it is necessary to use a relatively large-sized (20×20 pixels), two-dimensional, non-linear filter. The two-dimensional, non-linear filter of this size expected as being realized on the software basis, however, raises a problem in that cost for the calculation will grow extremely high, and that expected as being realized on the hardware basis raises a problem in that the circuit scale will grow large due to necessity of a large volume of delay lines.

A second problem relates to control of the amount of contrast emphasis of high-frequency components in the high-luminance region and low-luminance region. The above-described second and third grayscale compression techniques are common in that the luminance is divided into a low-frequency component and a high-frequency component, and the grayscale compression is effected by enhancing the high-frequency component while keeping the low-frequency component relatively suppressed.

The emphasis of the high-frequency component, however, results in clipping of the luminance at around the maximum luminance and minimum luminance acceptable by a display apparatus or the like, and consequently in loss of detail of the image, so that the grayscale conversion could not be said as being appropriate, and this raises a need for some countermeasure by which the clipping of luminance is avoidable.

Another problem resides in that an excessive emphasis of the contrast results in an image having an unnaturally enhanced contour portion of the subject, even under a condition not causative of clipping of the luminance.

DISCLOSURE OF THE INVENTION

The present invention is conceived in view of the aforementioned situation, and an object thereof is to realize a grayscale compression technique which requires only a small memory capacity to be consumed and a less load of calculation, allows easy hardware construction, and ensures a large grayscale compression effect.

Another object is to make it possible to appropriately enhance the contrast of image using a smaller capacity of memory, based on a less amount of calculation, and based on a simple hardware construction.

An image processing apparatus of the present invention is characterized by comprising a reduced image generation means for generating a reduced image from an input image; a correction information acquisition means for acquiring a correction information of the input image based on the reduced image; and a grayscale conversion means for converting grayscale of the input image; wherein the grayscale conversion means corrects contrast of the input image using the correction information, as a processing to be performed before and/or after the grayscale is converted.

The image processing apparatus can further include a smoothing means for generating a smoothed image having luminance $L_c$ of pixels composing the input image smoothed based on interpolation calculation using pixels composing the reduced image, wherein the grayscale conversion means can be configured so as to generate a contrast-corrected image based on luminance $L_c$ of pixels composing the image, luminance $L_l$ of pixels composing the smoothed image, and a predetermined gain value g.

The grayscale conversion means can be configured so as to calculate luminance $L_u$ of pixels composing the contrast-corrected image according to the equation below:

$$L_u = g \cdot (L_c - L_l) + L_l$$

The reduction means can be configured so as to divide the input image into a plurality of blocks, to calculate an average value of luminance of pixels which belong to the individual blocks, and to produce a reduced image constructed from pixels in the same number with that of the blocks and having the average value as luminance of the pixels.

The smoothing means can be configured so as to pinpoint a position on the reduced image corresponded to an interpolated position which is a position of a pixel to be interpolated, and to use pixels which reside in the vicinity of the pinpointed position, to thereby calculate luminance $L_l$ of pixels of the smoothed image.

The smoothing means can also be configured so as to pinpoint a position on the reduced image corresponded to a position of interpolation which is a position of a pixel to be interpolated, and to use 4×4 pixels which reside in the vicinity of the pinpointed position, to thereby calculate luminance $L_l$ of pixels of the smoothed image based on bicubic interpolation.

The image processing apparatus of the present invention can further include a logarithmic conversion means for subjecting luminance $L_c$ of pixels composing the image before input to the smoothing means to logarithmic conversion, and a logarithmic inversion means for subjecting luminance of pixels composing the contrast-corrected image.

The image processing apparatus of the present invention can further include a smoothing means for generating a smoothed image having luminance $L_c$ of pixels composing the input image smoothed based on interpolation calculation using pixels composing the reduced image, and a gain value setting means for setting a gain value g used for correcting the contrast; wherein the grayscale conversion means can be configured so as to generate a contrast-corrected image based on luminance $L_c$ of pixels composing the input image, luminance $L_l$ of pixels composing the smoothed image, and a predetermined gain value g; and the gain value setting means can be configured so as to set the gain value g based on input initial gain value $g_0$, reference gain value 1, and an attenuation value attn ($Th_1$, $Th_2$, $L_c$) calculated using a first luminance threshold value $Th_1$, a second luminance threshold value $Th_2$, and luminance $L_c$ of pixels composing the input image.

The image processing apparatus of the present invention can further include a conversion means for generating a tone-converted image by converting luminance L of pixels composing the input image based on a conversion function; a smoothing means for generating a smoothed image by smoothing luminance $L_c$ of pixels composing the tone-converted image; and a gain value setting means for setting a gain value g used for correcting the contrast based on an initial gain value $g_0$ which expresses an inverse $1/\gamma$ of a slope $\gamma$ of the conversion function; wherein the contrast correction means can be configured so as to generate a contrast-corrected image based on luminance $L_c$ of pixels composing the tone-converted image, luminance $L_l$ of pixels composing the smoothed image, and a gain value g; and the gain value setting means can be configured so as to set the gain value g based on input initial gain value $g_0$, reference gain value 1, and an attenuation value attn ($Th_1$, $Th_2$, $L_c$) calculated using a first luminance threshold value $Th_1$, a second luminance threshold value $Th_2$, and luminance $L_c$ of pixels composing the tone-converted image.

The gain value setting means can be configured so as to set the gain value g according to the equation below:

$$g=1+(g_0-1)\cdot attn(Th_1,Th_2,L_c)$$

The gain value setting means can be configured also so as to calculate the attenuation value attn($Th_1$,$Th_2$,$L_c$) according to the equation below:

$$attn(Th_1,Th_2,L_c)=|(L_c-Th_1)/(Th_2-Th_1)| (2Th_1-Th_2 \leq L_c \leq Th_2)$$

$$attn(Th_1, Th_2, L_c)=1\ (L_c<2Th_1-Th_2,\ Th_2<L_c)$$

The grayscale conversion means can be configured so as to calculate the luminance $L_u$ of pixels composing the contrast-corrected image according to the equation below:

$$L_u=g\cdot(L_c-L_l)+L_l$$

The first luminance threshold value $Th_1$ can be defined as an intermediate gray level, and the second luminance threshold value $Th_2$ can be defined as a maximum white level.

The reduced image generation means can be configured so as to generate a reduced image by converting the input image into the tone-converted image based on the conversion function and then by reducing a size of the tone-converted image, and the correction information acquisition means can be configured so as to acquire correction information including slope of the conversion function, and the grayscale conversion means can be configured so as to correct contrast of the tone-converted image based on the reduced image and the slope of the conversion function.

The image processing apparatus of the present invention can further includes a hold means for holding the reduced image corresponded to a previous frame's image and a slope of the conversion function applied to the previous frame's image.

The reduced image generation means can be configured so as to convert a pixel value of an image of the current frame by step-wisely using one or more conversion functions, and the grayscale conversion means can be configured so as to generate the contrast-corrected image by correcting contrast of the tone-corrected image based on the reduced image held by the hold means and a product of the slopes individually corresponded to one or more conversion functions.

Of one or more conversion functions, at least one conversion function can be configured as a monotonously-increasing function.

The image processing apparatus of the present invention can further include an average value calculation means for calculating an average value of pixel values of the tone-converted image, and of one or more conversion functions, at least one conversion function can be configured so as to have a slope in proportion to an inverse of the average value calculated by the average value calculation means.

The average value calculation means can be configured so as to divide the tone-corrected image into a plurality of blocks, and so as to calculate, as the average value, a value by weighted addition of averages of pixel values of the individual blocks.

The reduced image generation means can be configured so as to generate a first reduced image by reducing a size of the tone-converted image, and to multiply the individual pixel values of the first reduced image by a value in proportion to an inverse of an average value of pixel values of the first reduced image, to thereby generate a second reduced image.

The image processing apparatus of the present invention can further include a logarithmic conversion means for subjecting pixel values of an image in the current frame to logarithmic conversion, and a logarithmic inversion means for subjecting pixel values of the contrast-corrected image to the logarithmic inversion.

The image processing apparatus of the present invention can further include a gamma conversion means for subjecting pixel values of the contrast-corrected image to gamma conversion; a luminance range information calculation means for calculating luminance range information which indicates a distribution range of luminance components of the contrast-corrected image after gone through the gamma conversion by the gamma conversion means; and a normalization means for normalizing, into a predetermined range, the distribution of pixel values of the contrast-corrected image after gone through the gamma conversion by the gamma conversion means based on the luminance range information calculated by the luminance range information calculation means.

The luminance range calculation means can be configured so as to calculate, as the luminance range information, an upper limit value and a lower limit value of the luminance components of the contrast-corrected image after gone through the gamma conversion by the gamma conversion means, and the normalization means can be configured so as to convert pixel values of the contrast-corrected image so that the upper limit value and the lower limit value of the luminance components of the contrast-corrected image calculated by the luminance range information calculation means respectively coincide with the upper limit value and the lower limit value of a range of luminous component reproducible by an assumed reproduction apparatus.

The hold means can be configured so as to hold previous frame's luminance range information calculated by the luminance range information calculation means.

The image can be a monochrome image constructed from pixels having luminance components.

The image can be a color image constructed from pixels having a plurality of color components.

The reduced image generation means can be configured so as to generate a first luminance image constructed from pixels having luminance components based on the color image, to convert the first luminance image into the tone-converted luminance image, and to generate a color tone-converted image constructed from pixels having a plurality of color components based on the tone-converted luminance image.

The reduced image generation means can be configured so as to calculate the individual color components of the tone-converted image, by calculating difference values between values of the individual color components of the color image and values of the luminance components, then by calculating a product of the difference values and slope of the conversion function, and by adding the product to the values of the individual color components of the tone-converted luminance image.

The reduced image generation means can be configured so as to calculate the individual color components of the tone-converted image, by calculating an average value of the luminance component of the first luminance image, then by calculating a coefficient in proportion to an inverse of the average value, and by multiplying values of the individual color components of the color image by the coefficient.

The grayscale conversion means can be configured so as to generate a color contrast-corrected image, by generating a second luminance image constructed from pixels having luminance components based on the color tone-converted image, then by correcting contrast of the color tone-converted image generated by the conversion means based on the second luminance image, the reduced image held by the hold means and the slope of the conversion function, to thereby generate the color contrast-corrected image.

The image processing apparatus of the present invention can further include a gamma conversion means for subjecting pixel values of the color contrast-corrected image to gamma conversion; a luminance range information calculation means for generating a third luminance image constructed from pixels having luminance component based on the color contrast-corrected image after gone through the gamma conversion by the gamma conversion means, and for calculating luminance range information which indicates a distribution range of luminance components of the third luminance image; and a normalization means for normalizing, into a predetermined range, the distribution of pixel values of the color contrast-corrected image after gone through the gamma conversion by the gamma conversion means based on the luminance range information calculated by the luminance range information calculation means.

The image processing method of the present invention is constructed from a reduced image generation step for generating a reduced image from an input image; a correction information acquisition step for acquiring a correction information of the input image based on the reduced image; and a grayscale conversion step for converting grayscale of the input image; wherein the grayscale conversion step corrects contrast of the input image using the correction information, as a processing to be performed before and/or after the grayscale is converted.

According to the image processing apparatus and method of the present invention, it is made possible to generate a reduced image from an input image, to acquire correction information based on the generated reduced image, and to convert grayscale of the input image. In the processing of the grayscale conversion, contrast of the input image is corrected using the correction information, as a processing to be performed before and/or after the grayscale is converted.

BRIEF DESCRIPTION OF THE DRAWINGS

FIG. 46 is a block diagram showing an exemplary configuration of a general-purpose personal computer.

BEST MODES FOR CARRYING OUT THE INVENTION

A digital video camera as one embodiment of the present invention will be explained below referring to the attached drawings.

Figure 1:
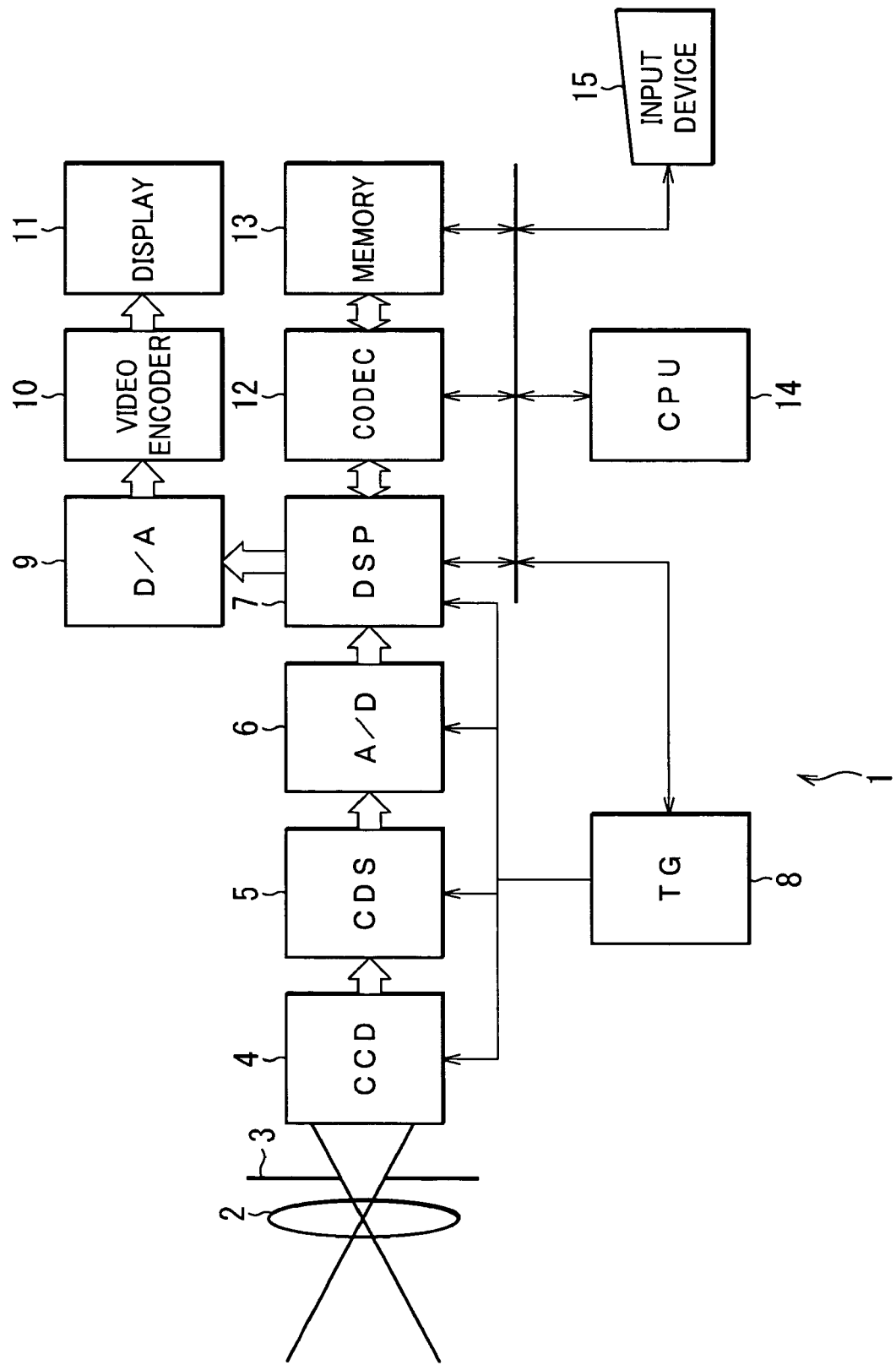
FIG. 1 is a block diagram showing an exemplary configuration of a digital video camera according to one embodiment of the present invention.

FIG. 1 shows an exemplary configuration of a digital video camera as one embodiment of the present invention. The digital video camera 1 takes a picture of a subject, generates a wide-DR image having a dynamic range of pixel values wider than a general one, saves the image into a predetermined storage medium, and outputs the wide-DR image after converting it into a narrow-DR image having a dynamic range of pixel values narrower than a general one, to a built-in display also used as a composition-determining finder or as an image monitor, or to external apparatuses.

The digital video camera 1 is roughly constructed from an optical system, a signal processing system, a recording system, a display system and a control system.

The optical system is constructed from a lens 2 for condensing a photo-image of a subject, a stop 3 for regulating light energy of the photo-image, and a CCD image sensor 4 for generating a wide-DR image by photo-electric conversion of the condensed photo-image at a predetermined frame rate. It is to be noted that the description below will deal with two cases where the wide-DR image generated by the CCD image sensor 4 is a monochrome image constructed from one-channel luminance signal, and is a color image constructed from multi-channel (e.g., three-channel) luminance signal.

The signal processing system is constructed from a correlated double sampling circuit (CDS) 5 for reducing noise by sampling the wide-DR image output from the CCD image sensor 4, an A/D converter 6 for effecting AD conversion of the wide-DR image removed with noise by the correlated double sampling circuit 5 to thereby obtain a value having a bit width of, for example, 14 to 16 bits or around, and a DSP (Digital Signal Processor) 7 for effecting grayscale compression processing of the wide-DR image output by the A/D converter 6.

An image signal having a large number of grayscale, just like the wide-DR image output from the A/D converter 6 and having a bit width of 14 to 16 bits, cannot fully be reproduced by general video signals including luminance Y and color difference signals Cr, Cb, but the grayscale thereof is compressed by the grayscale compression processing by the DSP 7 to a range allowing reproduction by the general video signals including luminance Y and color difference signals Cr, Cb. The DSP 7 will be detailed referring to FIG. 2 and succeeding drawings.

The recording system of the digital video camera 1 is constructed from a CODEC (Compression/Decompression) 12 which plays a part in encoding the wide-DR image or narrow-DR image received from the DSP 7 and in recording it into a memory 13, and in reading and encoding the code data stored in the memory 13 and supplying it to the DSP 7, and a memory 13 for storing the encoded wide-DR image or narrow-DR image, constructed from a magnetic disk, optical disk, magneto-optical disk, semiconductor or the like.

The display system is constructed from a D/A converter 9 which takes a part in DA conversion of the narrow-DR image supplied from the DSP 7, a video encoder for outputting the analog narrow-DR image output from the D/A converter 9 to a display 11 after converting it into a general video signals including luminance Y and color-difference signals Cr, Cb, and the display 11 typically is constructed from an LCD (Liquid Crystal Display) and so forth, which functions as a finder or video monitor by displaying an image corresponded to the video signals.

The control system is constructed from a timing generator (TG) 8 for controlling operation timing of the components from the CCD image sensor 4 to the DSP 7, an input apparatus 15 for accepting various operations by the user, and a CPU (Central Processing Unit) 14 for controlling the entire portion of the digital video camera 1.

Next, outline of the operations of the digital video camera will be explained. An optical image of a subject (incident light) comes through the lens 2 and stop 3 to the CCD image sensor 4, undergoes photo-electric conversion by the CCD image sensor 4, and the obtained electric signals expressing pixels of the wide-DR image is removed with noise by the correlated double sampling circuit 5, digitized by the A/D converter 6, and supplied to the DSP 7.

The DSP 7 takes a part in grayscale compression processing of the wide-DR image received from the A/D converter 6 to thereby generate a narrow-DR image, and outputs it to the D/A converter 9 or the CODEC 12, or to the both. The narrow- DR image supplied to the D/A converter 9 is subjected to DA conversion, and is then converted into normal video signals by the video encoder 10, and the resultant image is displayed on the display 11. On the other hand, the narrow-DR image supplied to the CODEC 12 is encoded and recorded in the memory 13.

Here is an end of description on the overall operation of the digital video camera 1.

Next, the DSP 7, which is the key for the present invention, will be described.

Figure 2:
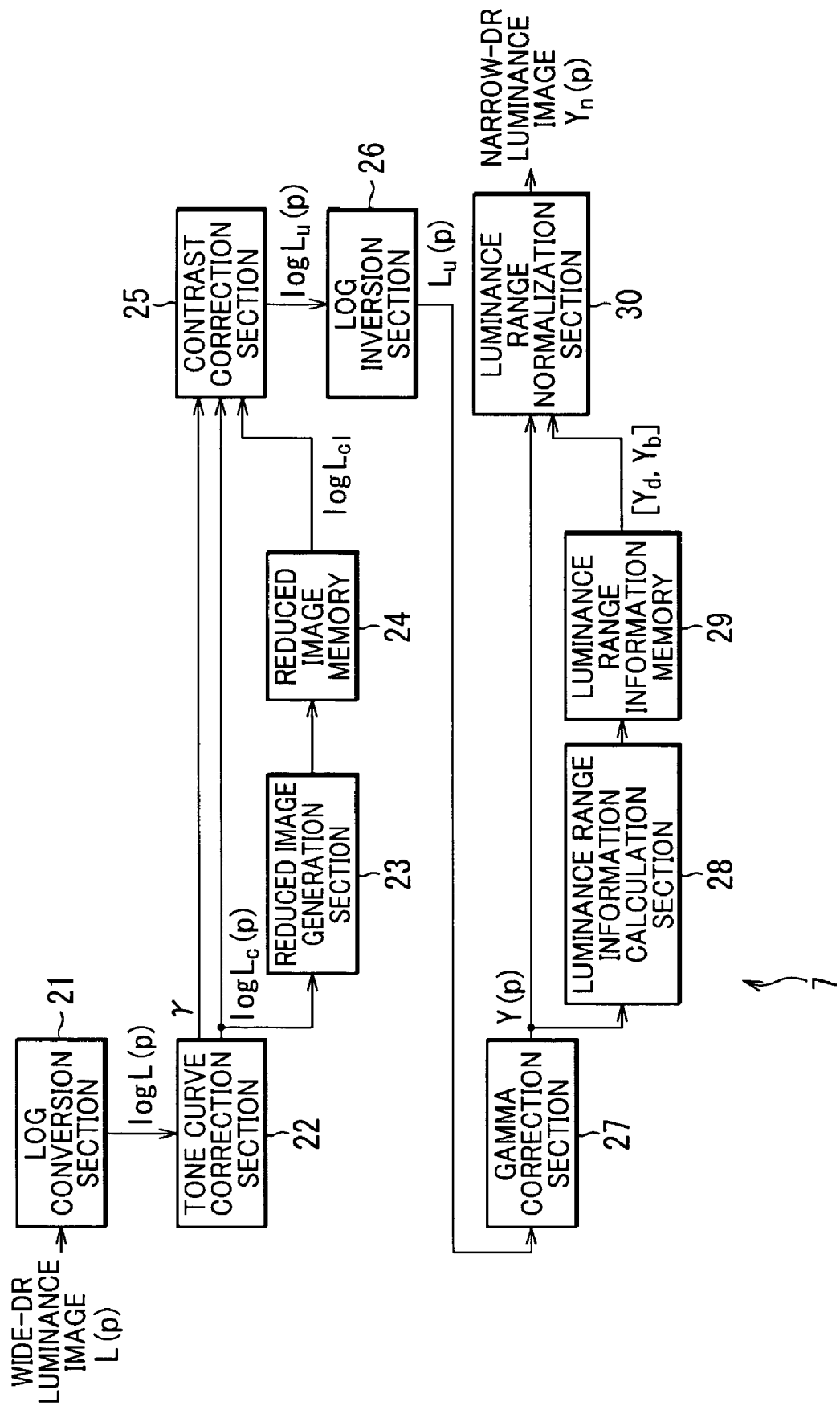
FIG. 2 is a block diagram showing a first exemplary configuration of a DSP shown in FIG. 1.

FIG. 2 shows a first exemplary configuration of the DSP 7 adapted to the wide-DR image which is a monochrome image. The monochrome wide-DR image input to the DSP 7 is referred to as wide-DR luminance image L, hereinafter. Pixel value (i.e., luminance value) of the wide-DR luminance image is expressed as L(p). In this context, p is a vector or coordinate expressing pixel position on the image, such as p=(x,y). It is, therefore, determined to use L(p), which contains both information of the pixel position and luminance value, as being discriminated from L which expresses the wide-DR luminance image. The same will apply also to other images and the pixel values thereof described later.

The DSP 7 is designed so that luminance L(p) of the wide-DR luminance image L is input thereto according to the order of raster.

In the first exemplary configuration of the DSP 1, a logarithmic conversion section 21 subjects the input luminance L(p) to logarithmic conversion, and outputs the obtained logarithmic luminance logL(p) to a tone curve correction section 22. The tone curve correction section 22 applies a preliminarily-obtained tone curve to the input logarithmic luminance logL(p) and converts it in the direction of compressing the grayscale, and outputs the obtained logarithmic luminance $logL_c(p)$ to a reduced image generation section 23 and a contrast correction section 25. The tone curve correction section 22 outputs a representative value γ which expresses a slope of the applied tone curve to the contrast correction section 25. The representative value γ which expresses a slope of the applied tone curve will simply be referred to as representative value γ, hereinafter.

The reduced image generation section 23 generates a reduced image $logL_{cl}$ based on the logarithmic luminance $logL_c(p)$, corresponded to a single frame, received from the tone curve correction section 22, and makes a reduced image memory 24 to store it.

The contrast correction section 25 corrects the contrast, which was weakened by the tone curve correction, of the logarithmic luminance $logL_c(p)$ of the current frame received from the tone curve correction section 22, based on the representative value γ and the previous frame's reduced image $logL_{cl}$ held in the reduced image memory 24, and outputs the obtained logarithmic luminance $logL_u(p)$ to a logarithmic inversion section 26. The logarithmic inversion section 26 subjects the logarithmic luminance $logL_u(p)$ having the corrected contrast to logarithmic inversion, and outputs the obtained luminance $L_u(p)$ expressed by the normal axis to a gamma correction section 27.

The gamma correction section 27 subjects the luminance $L_u(p)$ received from the logarithmic inversion section 26 to gamma correction in consideration of gamma characteristics of a reproduction apparatus (e.g., display 11), and then outputs the obtained luminance Y(p) after the gamma correction to a luminance information calculation section 28 and a luminance range normalization section 30. The luminance information calculation section 28 calculates luminance range information, which indicates a luminance distribution, for each luminance Y(p) corresponded to a single frame received from the gamma correction section 27, and allows them to be held by a luminance range information memory 29. It is to be noted herein that the luminance range information refers to information indicating a distribution range of luminance within one frame, by which luminance $Y_d$ closest to darkness and luminance $Y_b$ closest to brightness are calculated as luminance range information $[Y_d, Y_b]$.

The luminance range normalization section 30 converts the luminance Y(b) of the current frame received from the gamma correction section 27, based on the previous frame's luminance range information $[Y_d, Y_b]$ held by the luminance range information memory 29, so that the distribution range thereof coincides with a range which can be expressed by a reproduction apparatus (e.g., display 11), and outputs the obtained luminance $Y_n(p)$ to the succeeding steps as pixel values of the narrow-DR image.

As has been described in the above, in the process of the grayscale compression processing according to the first exemplary configuration of the DSP 7, the reduced image $logL_{cl}$ is generated by the reduced image generation section 23, and the luminance range information $[Y_d, Y_b]$ is calculated by the luminance range information calculation section 28. The reduced image $logL_{cl}$ and luminance range information $[Y_d, Y_b]$ are referred to as an intermediate information, hereinafter.

With DSP 7, the intermediate information is calculated for the individual frames of the input wide-DR image, and the calculated intermediate information is used for processing the wide-DR image coming one frame after.

Although it is necessary in general to use information calculated based on the luminance values for the entire portion or a wide range of the image for the purpose of carrying out an effective grayscale compression, a problem arises in the mounting in that a time lag before the information is calculated will increase. The DSP 7 therefore uses the previous frame's intermediate information to the grayscale compression for the current frame, by selecting the information extremely less likely to vary with time. This configuration makes it possible to avoid expansion of the memory consumption and circuit scale even after the mounting.

Next, details of the first exemplary configuration of the DSP 7 will be described referring to the attached drawings.

Figure 3:
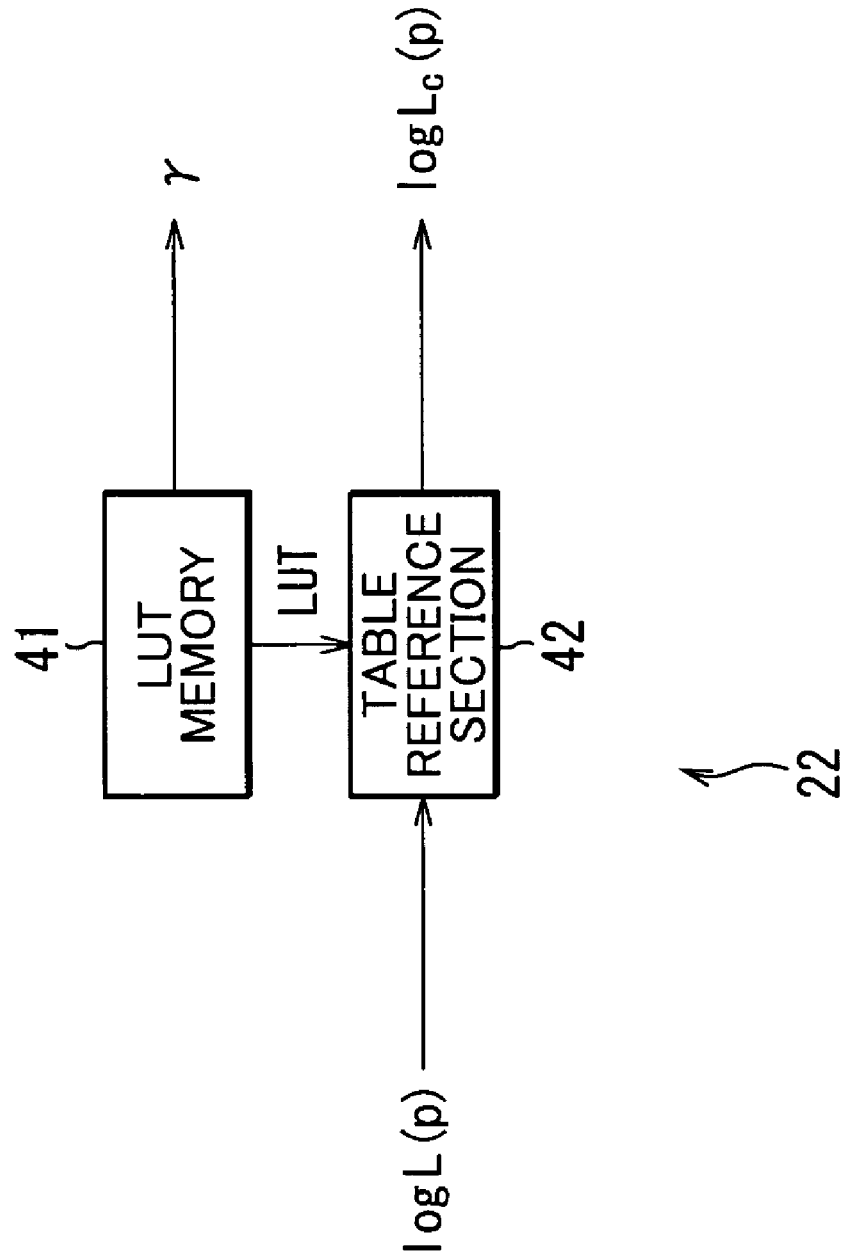
FIG. 3 is a block diagram showing a first exemplary configuration of a tone curve correction section shown in FIG. 2.
Figure 4:
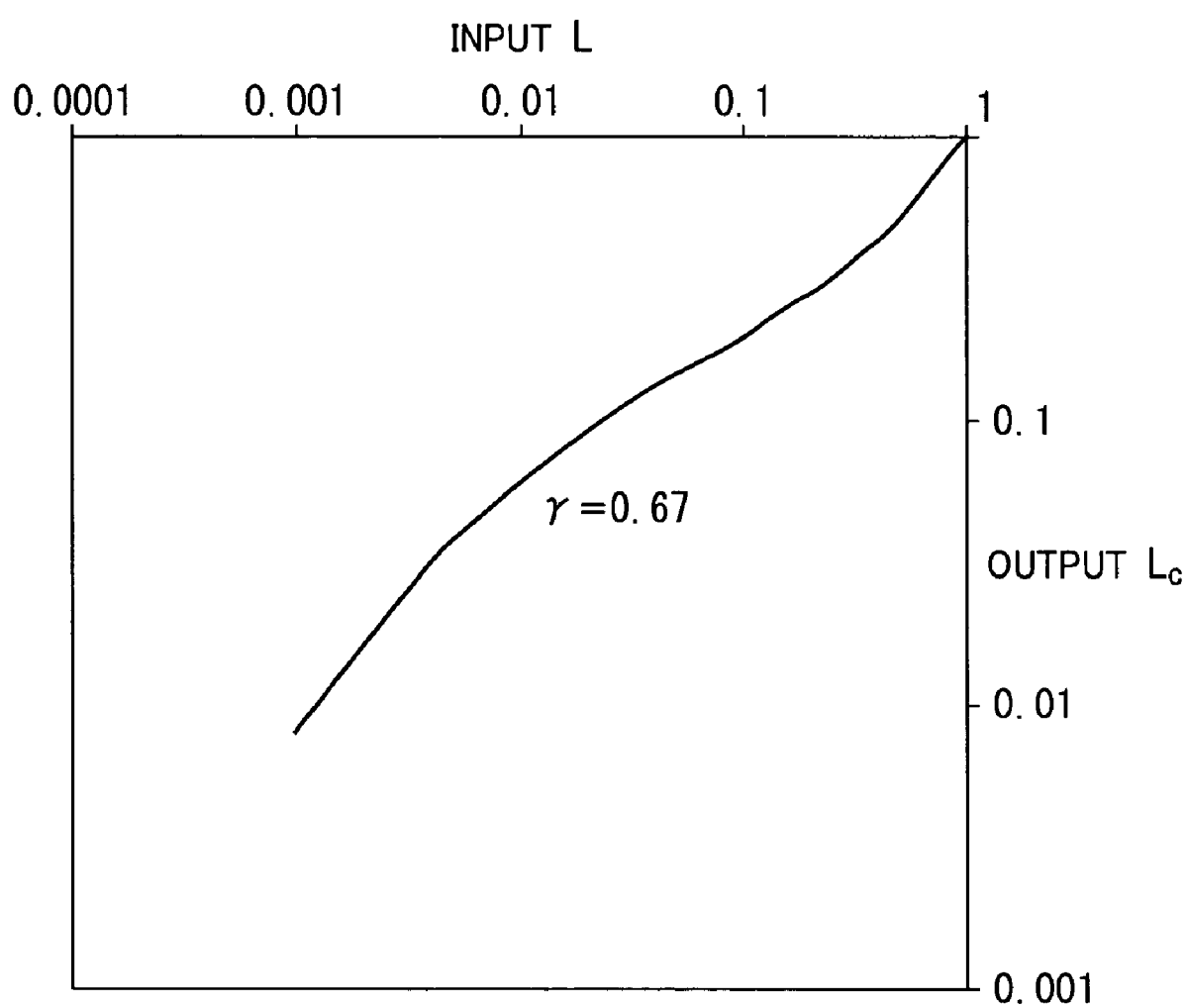
FIG. 4 is a graph showing an exemplary tone curve.

FIG. 3 shows a first exemplary configuration of the tone curve correction section 22. In the first exemplary configuration, a LUT memory 41 preliminarily holds a lookup table (referred to as LUT, hereinafter) which corresponds with a monotonously-increasing tone curve as shown in FIG. 4, and a representative value γ which expresses a slope of the tone curve. It is also allowable that a function equivalent to the tone curve may be held in place of the LUT. A table reference section 42 corrects the logarithmic luminance logL(p) into logarithmic luminance $logL_c(p)$ based on the LUT held in the LUT memory 41.

FIG. 4 shows an example of the tone curve, wherein the abscissa plots input luminance L(p), and the ordinate plots luminance $L_c(p)$ after tone curve correction, respectively on the logarithmic axes normalized over a range of [0, 1]. Application of the monotonously-increasing moderate inverse-S-shaped curve as shown in this example will not give so strong effect of grayscale compression in the high luminance region and low luminance region, so that it is possible to obtain a desirable tone with less degree of whiteout or blackout even after the grayscale compression. On the contrary, the grayscale compression will strongly affect the middle luminance region, but this means that the contrast correction described later can fully be applied with the middle luminance region, and results in a desirable narrow-DR image with a less degree of contrast correction also in the middle luminance range.

It is to be noted that the representative value γ expressing slope of the tone curve can be determined typically by finding the slope values over the entire luminance range and by determining an average of these values as the representative value γ. The tone curve shown in FIG. 4 has a representative value γ of 0.67.

Figure 5:
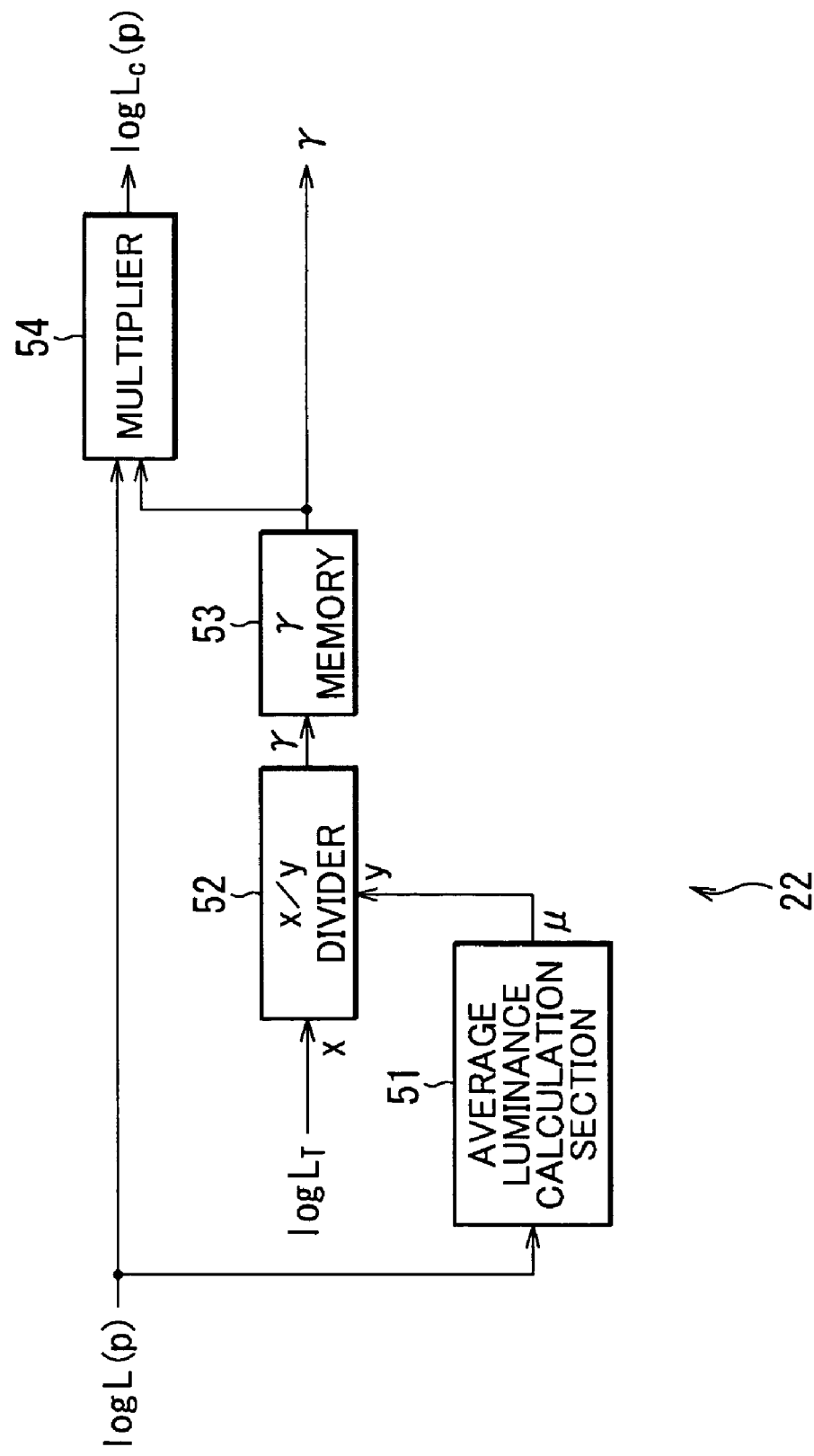
FIG. 5 is a block diagram showing a second exemplary configuration of the tone curve correction section shown in FIG. 2.

FIG. 5 shows a second exemplary configuration of the tone curve correction section 22. Unlike the first exemplary configuration, the second exemplary configuration does not use a preliminarily-obtained LUT, but calculates a representative value γ for every frame and corrects the logarithmic luminance logL(p) into logarithmic luminance $logL_c(p)$. In the second exemplary configuration, an average luminance calculation section 51 calculates an average value μ of the logarithmic luminance logL(p) of one frame. A divider 52 divides a predetermined constant $logL_T$ by the average value μ, to thereby calculate the representative value γ. A γ memory 53 holds the representative value received from the divider 52. A multiplier 54 multiplies the logarithmic luminance logL(p) of the current frame by the previous frame's representative value γ held by the γ memory 53, to thereby calculate the logarithmic luminance $logL_c(p)$ after the tone curve correction.

Assuming now that the predetermined constant $logL_T$ is defined as a moderate-level logarithmic luminance, the average value of the logarithmic luminance logL(p) for one frame is converted into the logarithmic luminance $logL_c(p)$ after the tone curve correction having the same value with the $logL_T$.

Although the representative value γ is calculated for every frame, the value is supposed to differ not largely between the preceding frame and succeeding frame, because it is practically calculated based on the average value μ of the logarithmic luminance logL(p). Hence, also for the representative value γ is designed to use the one-frame precedence for the tone curve correction for the current frame, similarly to the above-described reduced image $logL_{cl}$ and luminance range information $[Y_d, Y_b]$. It is therefore defined that also the representative value γ is included into the intermediate information.

Figure 6:
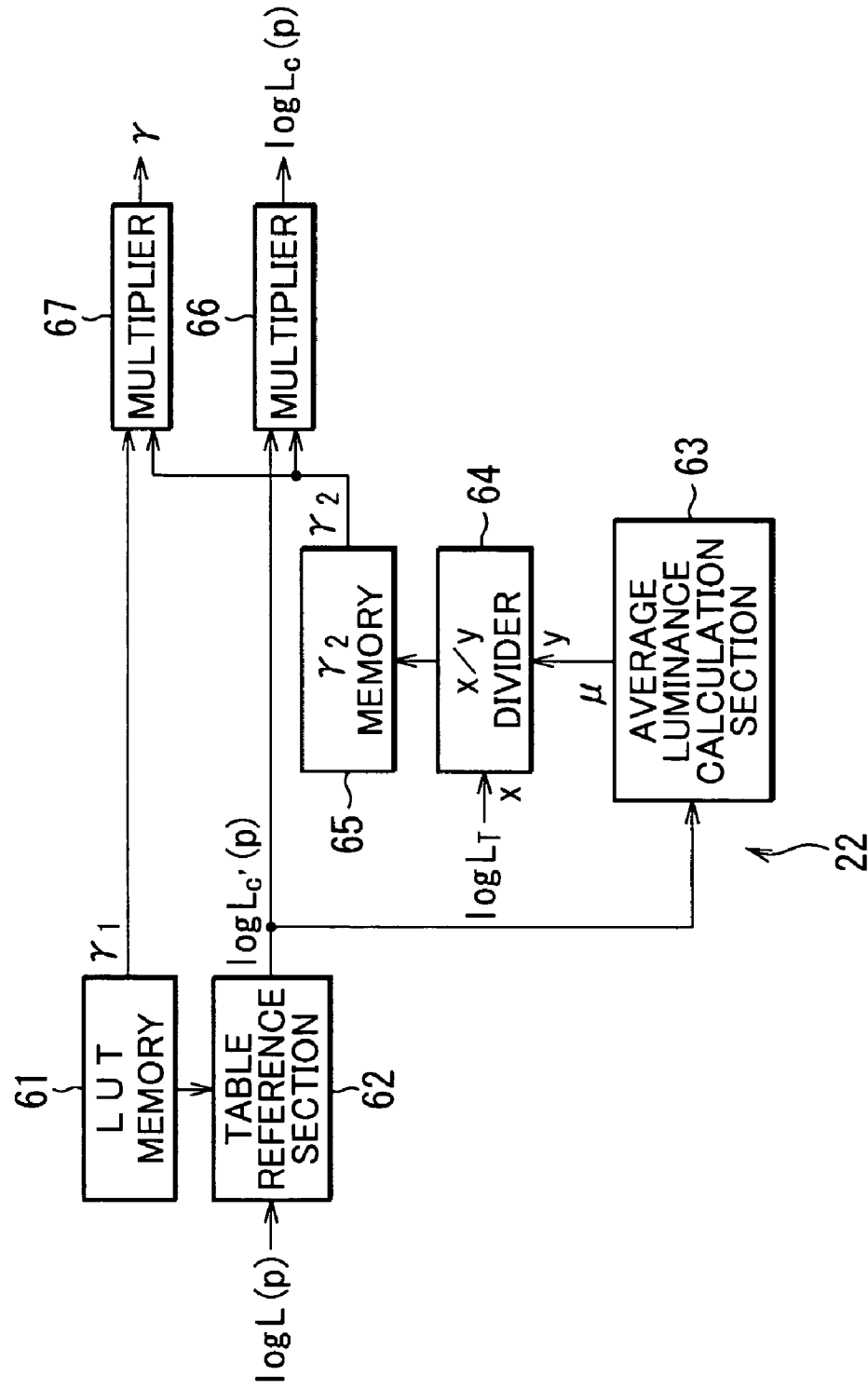
FIG. 6 is a block diagram showing a third exemplary configuration of the tone curve correction section shown in FIG. 2.

FIG. 6 is a third exemplary configuration of the tone curve correction section 22. The third exemplary configuration is, so as to say, a combination of the first exemplary configuration and the second exemplary configuration. In the third exemplary configuration, a LUT memory 61 preliminarily holds a LUT, which corresponds with the tone curve as shown in FIG. 4, and a representative value $γ_1$ which expresses a slope of the tone curve. A table reference section 62 corrects the logarithmic luminance logL(p) into logarithmic luminance $logL_c(p)$ based on the LUT held in the LUT memory 61k, and outputs it to an average luminance calculation section 63 and a multiplier 66.

The average luminance calculation section 63 calculates an average value μ of the logarithmic luminance $logL_c(p)$ for one frame, and outputs it to a divider 64. The divider 64 divides a predetermined constant $logL_T$ by the average value μ, to thereby calculate a representative value $γ_2$, and allow a $γ_2$ memory 65 to store it. A multiplier 66 multiplies the logarithmic luminance $logL_c(p)$ of the current frame by the previous frame's representative value $γ_2$ held by the γ memory 65, to thereby calculate the logarithmic luminance $logL_c(p)$ after the tone curve correction. A multiplier 67 outputs a product of the representative values $γ_1$, $γ_2$ as a representative value $γ(=γ_1 · γ_2)$ to the contrast correction section 25 in the succeeding stage.

Figure 7:
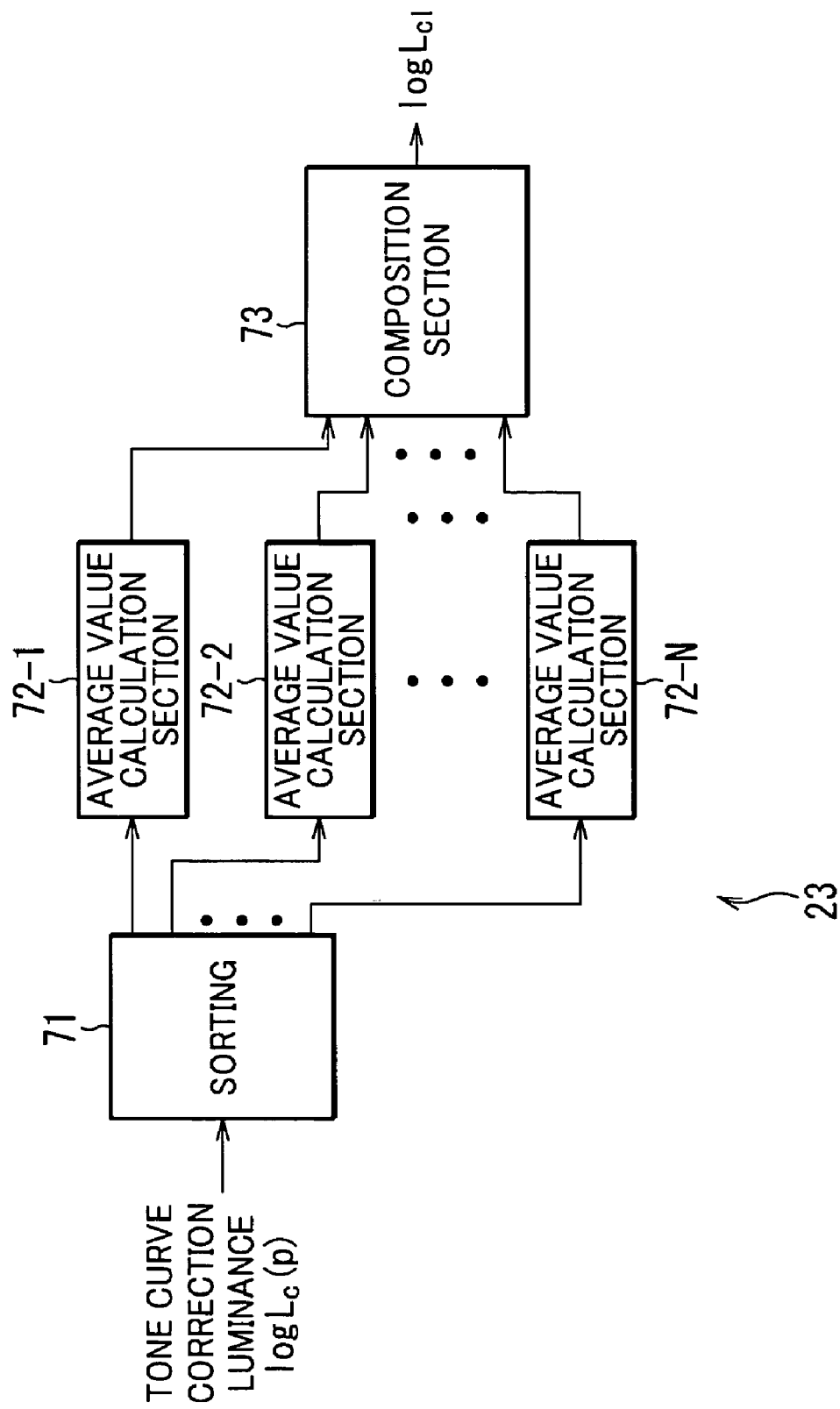
FIG. 7 is a block diagram showing an exemplary configuration of a reduced image generation section shown in FIG. 2.

FIG. 7 in the next shows an exemplary configuration of the reduced image generation section 23. A sorting section 71 of the reduced image generation section 23 sorts the logarithmic luminance $logL_c(p)$ for one frame received from the tone curve correction section 22 in the preceding stage according to blocks to which the luminance belongs when the entire image is divided into m×n blocks, and then supplied to the average value calculating sections 72-1 to 72-N (=m×n). For example, those classified into the first block are supplied to average value calculation section 72-1, and those classified into the second block are supplied to the average value calculation section 72-2. The same will apply also to the succeeding ones, and those classified into the N-th block are supplied to the average value calculation section 72-N. The following description adopts a simple notation of average value calculation section 72 when there is no need of discrimination of the individual average value calculation sections 72-1 to 72-N.

The average value calculation section 72-i (i=1,2, . . . ,N) calculates an average value of the logarithmic luminance $logL_c(p)$ classified into the i-th block, out of logarithmic luminance values $logL_c(p)$ for one frame, and outputs it to a composition section 73. The composition section 73 generates an m×n-pixel reduced image $logL_{cl}$ having, as pixel values, the average values of the logarithmic luminance $logL_c(p)$ respectively received from the average value calculation means 72-i, and makes the reduced image memory 24 in the succeeding stage to store it.

Figure 8:
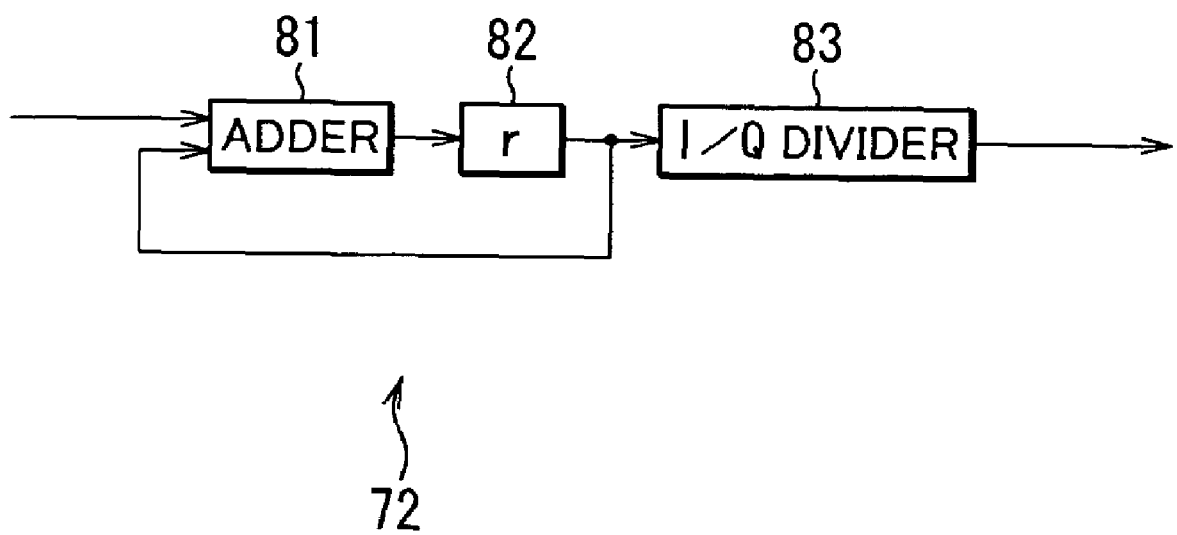
FIG. 8 is a block diagram showing an exemplary configuration of an average value calculation section shown in FIG. 7

FIG. 8 shows an exemplary configuration of the average value calculation section 72. An adder 81 of the average value calculation section 72 adds a value held by a register (r) 82 to the logarithmic luminance $logL_c(p)$ received from the sorting section 71 in the preceding stage, to thereby update the value held by the register (r) 82. A divider 83 divides a value finally held by the register 82 by the number of pixels Q composing one block, to thereby calculate an average value of Q logarithmic luminance $logL_c(p)$ values classified into one block.

Figure 9:
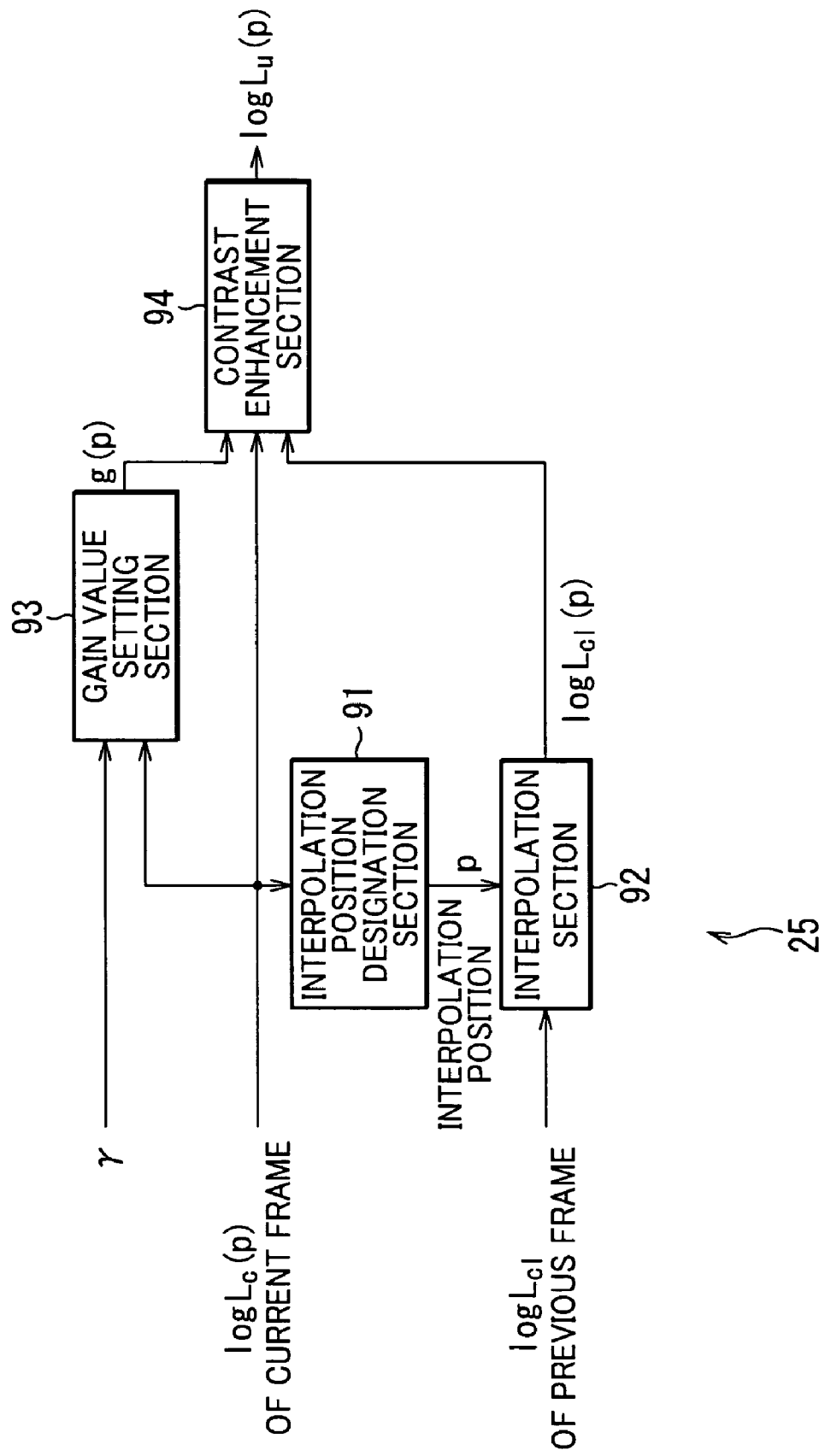
FIG. 9 is a block diagram showing an exemplary configuration of a contrast correction section shown in FIG. 2.

FIG. 9 in the next shows an exemplary configuration of the contrast correction section 25. An interpolation position designation section 91 acquires a pixel position p of the logarithmic luminance $logL_c(p)$ received from the tone curve correction section 22 in the preceding stage (also referred to as position of interpolation p, hereinafter), and outputs it to an interpolation section 92. The interpolation section 92 calculates, by interpolation, the pixel $logL_{cl}(p)$ corresponded to the position of interpolation p, using the previous frame's reduced image $logL_{cl}$ held by the reduced image memory 24, and outputs it to a contrast enhancement section 94.

A gain value setting section 93 calculates a gain value g (p), which determines the amount of contrast enhancement of the logarithmic luminance $logL_c(p)$ of the current frame, based on the previous frame's representative value γ received from the tone curve correction section 22 and based on the logarithmic luminance $logL_c(p)$ of the current frame. The contrast enhancement section 94 calculates the logarithmic luminance $logL_u(p)$ having an enhanced contrast in the frequency components other than low-frequency ones, based on the logarithmic luminance $logL_c(p)$ of the current frame, the gain value g(p) and the interpolation value $logL_{cl}(p)$ of the reduced image.

Figure 10:
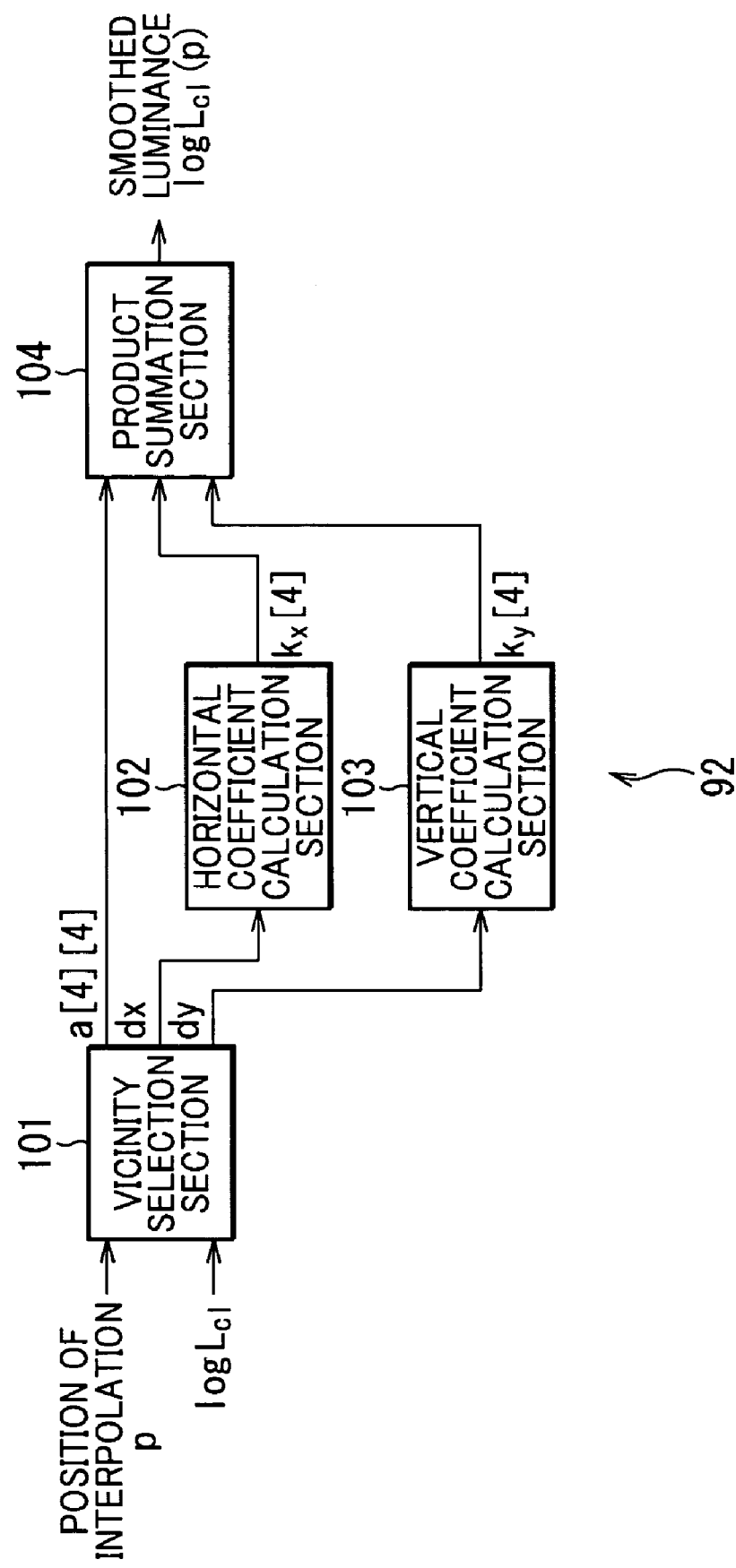
FIG. 10 is a block diagram showing an exemplary configuration of an interpolation section shown in FIG. 9

FIG. 10 shows an exemplary configuration of the interpolation section 92. The interpolation section 92 interpolates the pixel $logL_{cl}(p)$ corresponded to the position of interpolation p based on bicubic interpolation using 4×4 pixels in the vicinity of the position of interpolation p of the previous frame's reduced image $logL_{cl}$.

A vicinity selection section 101 acquires, upon reception of the position of interpolation p, 4×4-pixel pixel value a[4] [4] in the vicinity of the position of interpolation p, based on the previous frame's m×n-pixel reduced image $\log L_{cl}$ held by the reduced image memory 24, and outputs it to the products summation section 104. A notation of a[i][j] herein means that pixel value a is an i×j two-dimensional arrangement data. The vicinity selection section 101 outputs horizontal displacement dx and vertical displacement dy between the acquired pixel value a[4][4] and position of interpolation p to a horizontal coefficient calculation section 102 or a vertical coefficient calculation section 103, respectively.

Relations of the position of interpolation p, neighboring pixel value a[4][4] and displacements dx, dy herein will be described referring to FIG. 11.

Figure 11:
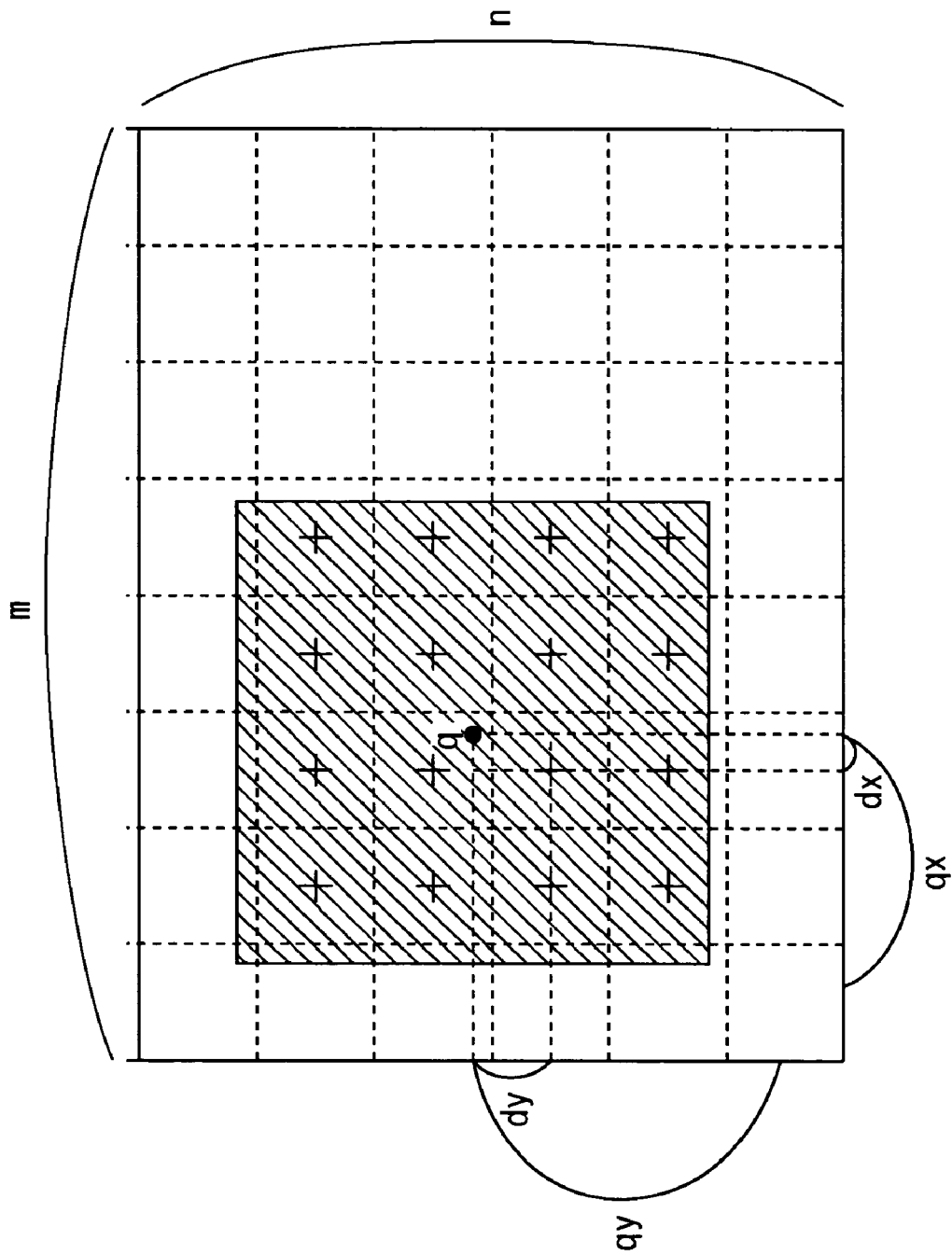
FIG. 11 is a drawing for explaining processing of the interpolation section shown in FIG. 9.

An m×n grid shown in FIG. 11 expresses an m×n-pixel reduced image $\log L_{cl}$. Assuming now that the position of interpolation p=(px, py) is given, a position q on the reduced image $\log L_{cl}$ corresponded to the position of interpolation p will be given as q=(qx, qy)=(px/bx−0.5, py/by−0.5), where (bx, by)=(the number of horizontal pixel of image $\log L_c$/m, the number of vertical pixel of image/n).

To acquire neighboring pixels around the position q on the reduced image corresponded to the position of interpolation p, it is recommended to acquire pixels of the reduced image $\log L_{cl}$ which fall within a range of qx−2<x<qx+2 and qy−2<y<qy+2 as indicated by hatching in FIG. 11. In the area indicated by the hatching, 4×4 positions marked with "+" are positions of the pixels to be acquired. Displacement (dx, dy) between the neighboring pixel and position of interpolation p is defined as a difference with respect to a nearest pixel in the left downward direction. That is, displacement can be given as (dx, dy)=(decimal portion of qx, decimal portion of qy).

Now referring back to FIG. 10, the horizontal coefficient calculation section 102 calculates a horizontal tertiary interpolation coefficient $k_x[4]$ based on the horizontal displacement dx received from the vicinity selection section 101. Similarly, the vertical coefficient calculation section 103 calculates a vertical tertiary interpolation coefficient $k_y[4]$ based on the vertical coefficient based on the vertical displacement dy received from the vicinity selection section 101.

For example, the horizontal tertiary interpolation coefficient $k_x[4]$ can be calculated using the equation (1) below:

$$z = |dx - i + 2| \qquad (1)$$
$$k_x[i] = \begin{cases} (3z^3 - 6z^2 + 4)/6 & (z < 1) \\ (-z^3 + 6z^2 - 12z + 8)/6 & (1 <= z < 2) \\ 0 & \text{Otherwise} \end{cases}$$

Also the vertical tertiary interpolation coefficient $k_y[4]$ can typically be calculated using the equation (2) below:

$$z = |dy - j + 2| \qquad (2)$$
$$k_y[j] = \begin{cases} (3z^3 - 6z^2 + 4)/6 & (z < 1) \\ (-z^3 + 6z^2 - 12z + 8)/6 & (1 <= z < 2) \\ 0 & \text{Otherwise} \end{cases}$$

It is to be noted that any arbitrary calculation formula other than the equations (1), (2) shown in the above may be used for the calculation of the tertiary interpolation coefficients $k_x[4]$ and $k_y[4]$ so far as a sufficiently smooth interpolation can be obtained.

The products summation section 104 calculates an interpolation value $L_{cl}(p)$ of the position of interpolation p of the reduced image $\log L_{cl}$ by sum-of-products calculation using the neighboring pixel value a[4][4], horizontal interpolation coefficient $k_x[4]$ and vertical interpolation coefficient $k_y[4]$, using the equation (3) below:

$$\log L_{cl}(p) = \sum_{i=1}^{4} \sum_{j=1}^{4} a[i][j] \cdot k_x[i] \cdot k_y[j] \qquad (3)$$

Next, the gain value setting section 93 will be explained. The gain value setting section 93 is, as described in the above, used for setting the gain value g(p) which is used for adjusting a degree of enhancement of regions other than the low-frequency region by the contrast enhancement section 94 in the succeeding stage. For a gain value of g(p)=1, contrast is not enhanced nor suppressed by the contrast enhancement section 94. For a gain value of g(p)>1, contrast is enhanced corresponding to the value. For a gain value of g(p)<1, contrast is suppressed corresponding to the value.

Setting of the gain value will be described. The contrast of the image has already been suppressed by the grayscale compression, wherein the amount of suppression depends on slope of the tone curve. For example, application of the tone curve having a small slope in view of effecting a strong grayscale compression means that contrast is strongly suppressed. On the other hand, application of a straight line having a slope of 1 as the tone curve means that the image does not change, or contrast is not suppressed.

The gain value setting section 93 therefore adopts an inverse $1/\gamma$ of the representative value $\gamma$ of the tone curve, for the case where the representative value $\gamma$ of the tone curve is smaller than 1, so that the gain value exceeds 1.

In another case where the input logarithmic luminance $\log L_c(p)$ is close to the white level or black level, any contrast enhancement similar to that applied to the middle luminance region may undesirably result in loss of detail of the image due to clipping, therefore the gain value is adjusted so as to come closer to 1 as the input logarithmic luminance $\log L_c(p)$ comes closer to the white level or black level.

That is, the gain value g(p) is calculated, assuming an inverse of the representative $\gamma$ as $1/\gamma=g_0$, using the equation (4) below:

$$g(p) = 1 + (g_0 - 1) \times attn(p) \qquad (4)$$

where, attn(p) is an attenuating coefficient, and is calculated by the equation (5) below:

$$attn(p) = attn(\log L_{gray}, \log L_{white}, \log L_c(p)) = \qquad (5)$$
$$\begin{cases} \left|\dfrac{\log L_c(p) - \log L_{gray}}{\log L_{white} - \log L_{gray}}\right| & \left(\begin{array}{c} 2\log L_{gray} - \log L_{white} \leq \\ \log L_c(p) \leq \log L_{white} \end{array}\right) \\ 1 & \text{Otherwise} \end{cases}$$

It is to be noted that, in the equation (5), $\log L_{gray}$ represents a logarithmic luminance expressing a moderate gray level, and $\log L_{white}$ represents a logarithmic luminance expressing the white clipping level (maximum white level), wherein both of which are preliminarily-set constants.

Figure 12:
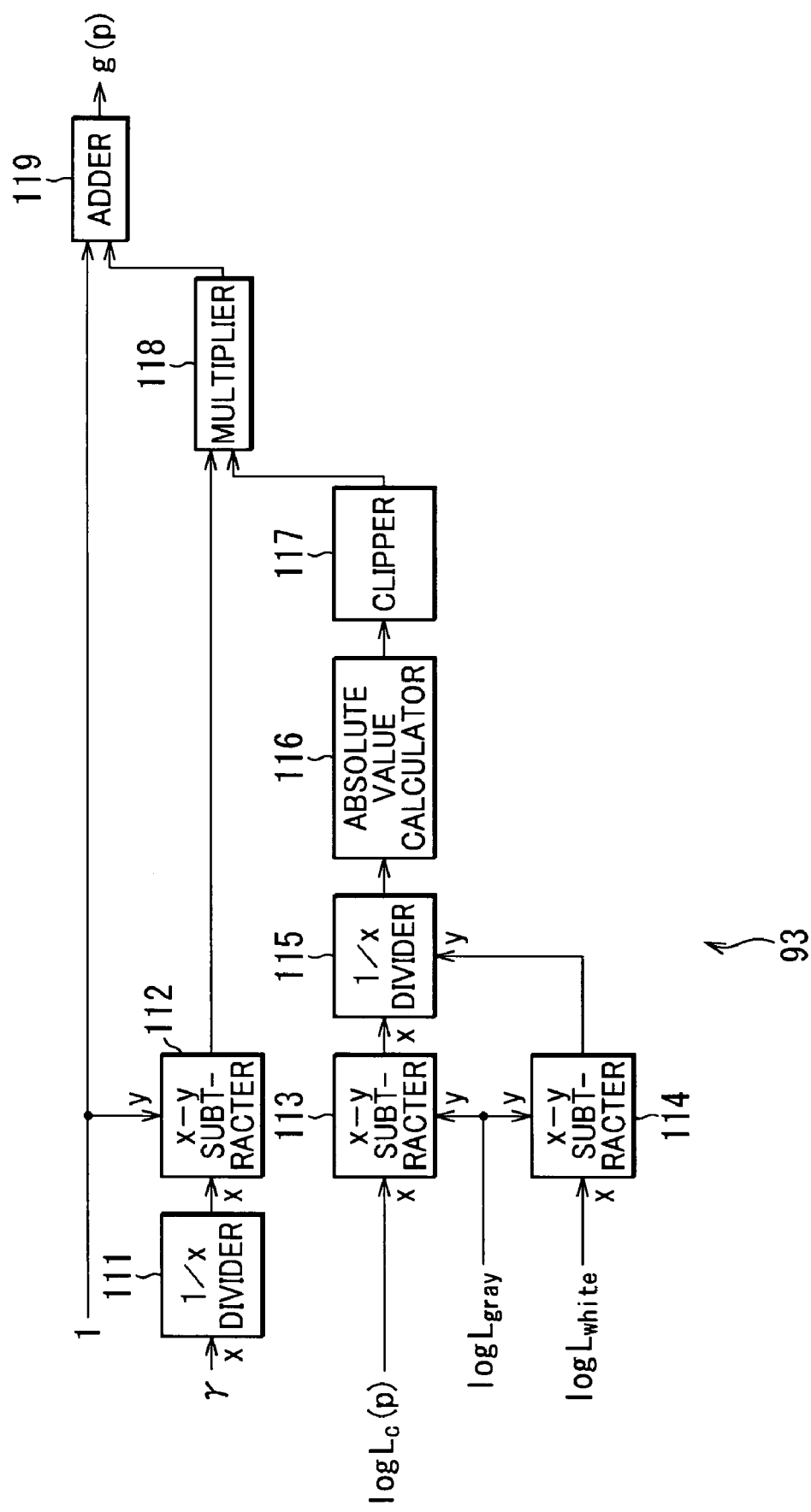
FIG. 12 is a block diagram showing an exemplary configuration of a gain value setting section shown in FIG. 9.

FIG. 12 shows an exemplary configuration of the gain value setting section 93. A divider 111 calculates the inverse $1/\gamma=g_0$ of the representative value $\gamma$ received from the preceding stage, and outputs it to a subtracter 112. The subtracter 112 calculates ($g_0-1$) and output it to a multiplier 118.

A subtracter 113 calculates difference ($\log L_c(p) - \log L_{gray}$) between the logarithmic luminance $\log L_c(p)$ and the logarithmic luminance $\log L_{gray}$ having a moderate gray level, and outputs it to a divider 115. The subtracter 114 calculates difference ($\log L_{white} - \log L_{gray}$) between the logarithmic luminance $\log L_{white}$ having a white clipping level and logarithmic luminance $\log L_{gray}$, and outputs it to a divider 115. The divider 115 divides the output ($\log L_c(p) - \log L_{gray}$) from the subtracter 113 by the output ($\log L_{white} - \log L_{gray}$) from the subtracter 114, and outputs the quotient to an absolute value calculator 116. The absolute value calculator 116 calculates an absolute value of the output from the divider 115, and outputs it to a clipper 117. The clipper 117 clips the output from the absolute value calculator 116 so as to adjust it to 1 when the output exceeds 1, but leaves it unchanged when the output does not exceed 1, and outputs the result as attn(p) to a multiplier 118.

The multiplier 118 multiplies the output from the subtracter 112 by the output from the clipper 117, and outputs the product to an adder 119. The adder 119 add 1 to the output from the multiplier 118, and outputs the result as the gain value g(p) to the succeeding stage.

Figure 13:
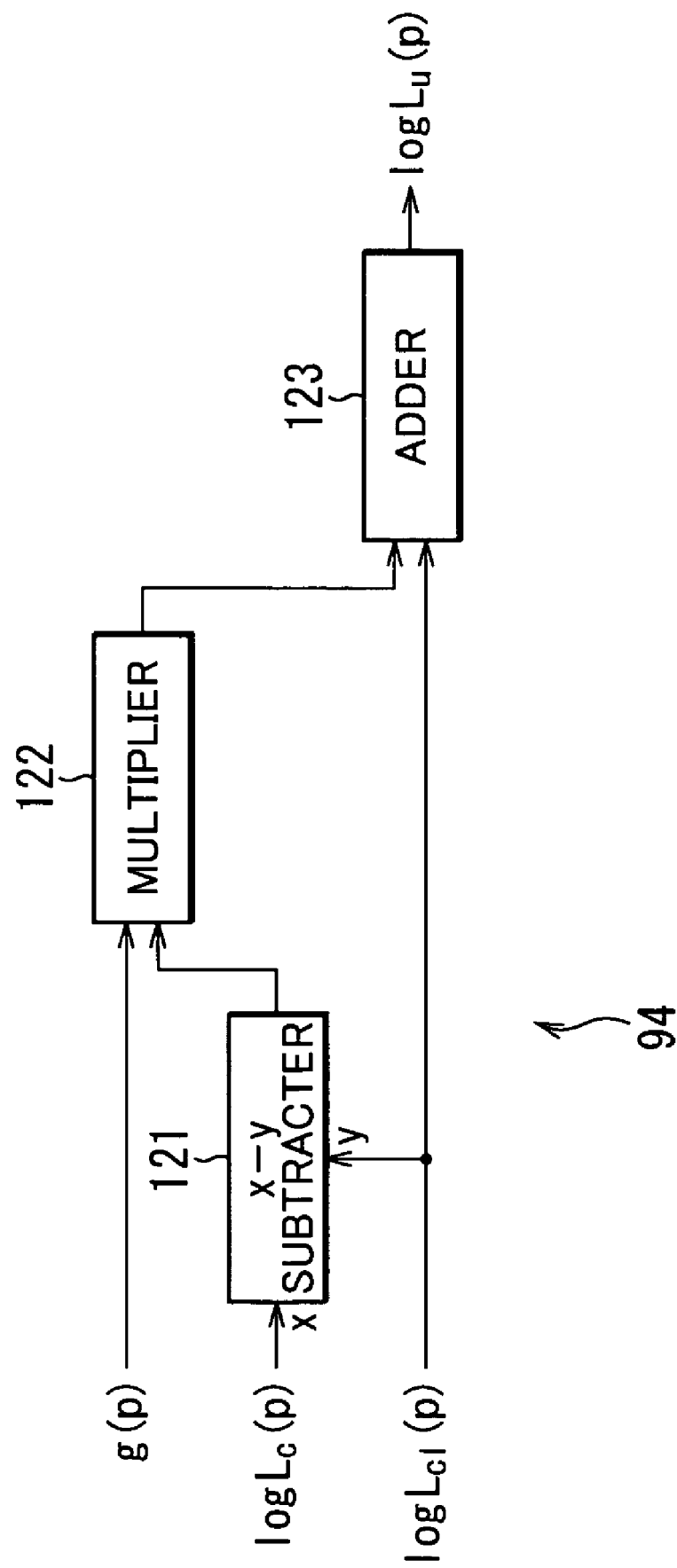
FIG. 13 is a block diagram showing an exemplary configuration of a contrast emphasizing section shown in FIG. 9.

FIG. 13 in the next shows an exemplary configuration of the contrast enhancement section 94. A subtracter 121 calculates difference between the logarithmic luminance $\log L_c(p)$ and the interpolation value $\log L_{cl}(p)$ of the reduced image, and outputs it to a multiplier 122. The multiplier 122 calculates a product of the output from the subtracter 121 and gain value g(p), and outputs it to an adder 123. The adder 123 adds the interpolation value $\log L_{cl}(p)$ of the reduced image to the output of the multiplier 122, and outputs thus contrast-corrected logarithmic luminance $\log L_u(p)$ to the succeeding stage.

It is to be noted now that the interpolation value $\log L_{cl}(p)$ of the reduced image is an interpolated value based on the m×n-pixel reduced image, and therefore has only an extremely-low-frequency component of the image $\log L_c$ before being reduced.

That is, the output ($\log L_c(p) - \log L_{cl}(p)$) from the subtracter 121 is equivalent to that obtained by subtracting only the extremely-low-frequency component from the original logarithmic luminance $\log L_c(p)$. The contrast-corrected logarithmic luminance $\log L_u(p)$ is such as being obtained, as described in the above, by dividing the luminance signal into two categories of extremely-low-frequency component and other components, and of these, the components other than the low-frequency components are enhanced by being multiplied by the gain value g(p), and by again synthesizing the both using the adder 123.

As is known from the above, the contrast enhancement section 94 is designed so as to enhance the components ranging from the low-to-middle-frequency region to high-frequency region, while excluding the extremely-low-frequency region, using the same gain value g(p). The contrast-corrected logarithmic luminance $\log L_u(p)$ is therefore free from local overshoot at the edge portion which may otherwise be distinct when only the high-frequency region is enhanced, and is designed to obtain an image having a contrast enhanced very naturally to the eyes.

Next, the luminance range information calculation section 28 and luminance range normalization section 30 will be explained.

First, outline of the luminance range normalization processing will be explained. A purpose of the grayscale compression by the DSP 7 resides in converting a wide-DR luminance image into a narrow-DR image adapted to a dynamic range of a reproduction apparatus such as the display 11, and for this purpose, a tone curve adapted to the dynamic range of the reproduction apparatus is preliminarily prepared in the tone curve correction section 22. This makes it possible to subject most of the photographed wide-DR luminance image appropriately to the grayscale compression.

The dynamic range of incident light may, however, be not intrinsically so large depending on the subject to be photographed, and grayscale compression processing of such image may result in an excessive grayscale compression and consequently in confinement of the luminance in a range narrower than the dynamic range reproducible by the reproduction apparatus.

To avoid this, the luminance range normalization section 30 normalizes, as a processing in the final stage of the grayscale compression processing, the luminance signal Y(p) after the gamma correction, so that the dynamic range of the luminance signal Y(p) after the gamma correction coincides with the dynamic range reproducible by the reproduction apparatus.

Figure 14:
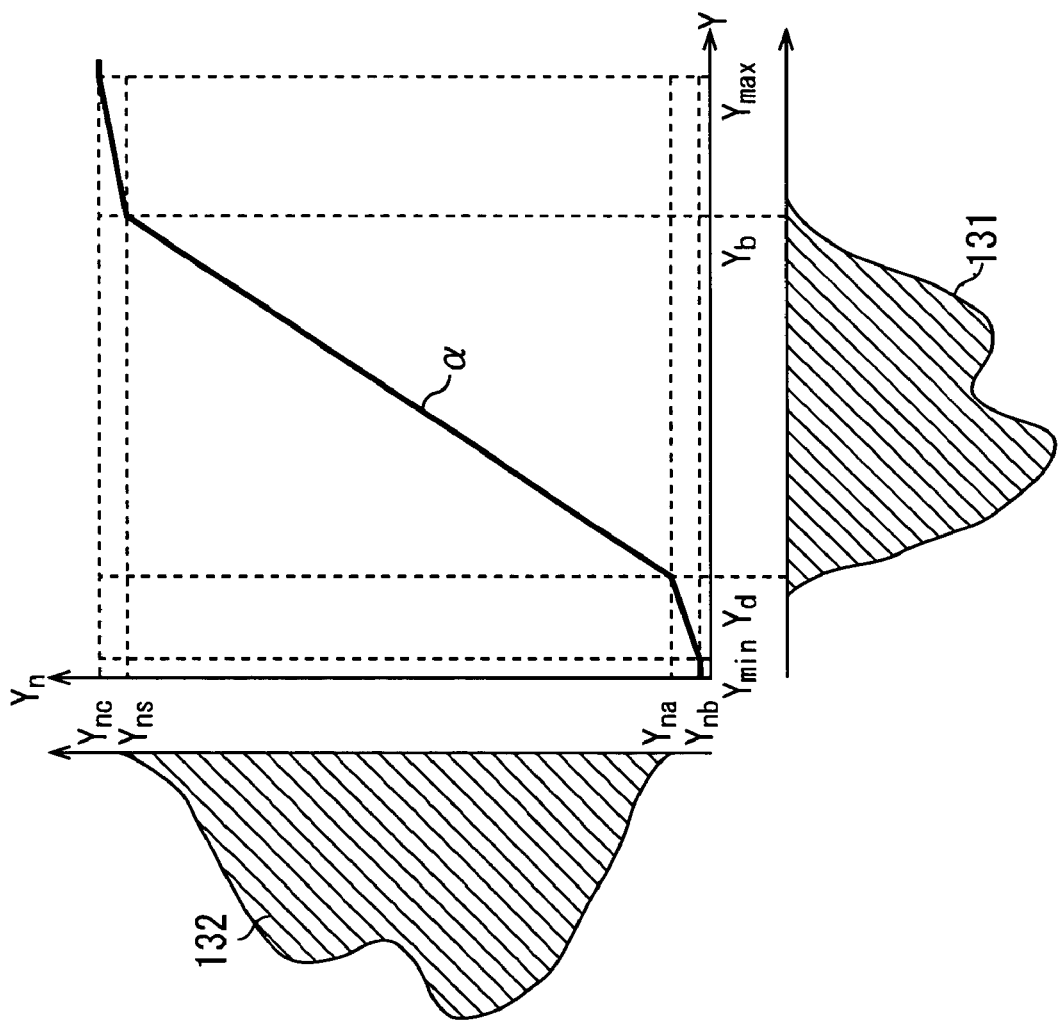
FIG. 14 is a drawing for explaining processing in a luminance range normalization section shown in FIG. 2.

FIG. 14 shows a pattern of the luminance range normalization processing by the luminance range normalization section 30. In the line graph of this drawing, the abscissa plots gamma-corrected luminance Y before the luminance range normalization, the ordinate plots luminance $Y_n$ after the luminance range normalization, and the grayscale conversion curve α expresses a conversion table used for converting the luminance Y into $Y_n$.

A method of determining the grayscale conversion curve α will be described. The hatched graphic 131 shown under the line graph is an exemplary histogram of the luminance image Y before the luminance range normalization. In this example, in the stage after the gamma correction but before the luminance range normalization, a luminance image is obtained, of which grayscale being already compressed so as to have a dynamic range narrower than a dynamic range ranging from a minimum luminance $Y_{min}$ to a maximum luminance $Y_{max}$ possibly generated by the digital video camera 1.

Because output of the luminance image, while leaving the dynamic range thereof unchanged, to the reproduction apparatus results in only an inefficient use of the dynamic range reproducible by the reproduction apparatus, the normalization is then carried out so that the luminance distribution of the luminance image Y before the luminance range normalization extends over the entire portion of the dynamic range of the reproduction apparatus.

For this purpose, first a range [$Y_a$, $Y_b$] over which the histogram graphic 131 of the luminance image Y before the luminance range normalization distributes, is calculated as a luminance range information of the luminance image Y before the luminance range normalization. Then luminance values $Y_{na}$ and $Y_{ns}$ which fall slightly inward from the top and bottom ends of the luminance range [$Y_{nb}$, $Y_{nc}$] of the reproduction apparatus are set, and the grayscale conversion curve α is determined so as to correspond luminances {$Y_{min}$, $Y_a$, $Y_b$, $Y_{max}$} on the abscissa with luminance values {$Y_{nb}$, $Y_{na}$, $Y_{ns}$, $Y_{nc}$} on the ordinate.

Grayscale conversion using this grayscale conversion curve α is successful in obtaining the luminance image $Y_n$ having a histogram form such as a hatched graphic 132 shown on the left hand side of the line graph.

A reason why the grayscale conversion curve α is determined so that the luminance range [$Y_a$, $Y_b$] before the luminance range normalization is mapped to the luminance range [$Y_{na}$, $Y_{ns}$] slightly narrower than the luminance range [$Y_{nb}$, $Y_{nc}$] of the reproduction apparatus is that sharp luminance clipping at around the luminance values $Y_{nb}$ and $Y_{nc}$ is prevented from appearing on the image.

It is to be noted herein that the luminance values $Y_{na}$ and $Y_{ns}$ are preliminarily set with appropriate values based on the luminance values $Y_{nb}$ and $Y_{nc}$.

Acquisition of the luminance range $[Y_d, Y_b]$ before the luminance range normalization is carried out by the luminance range information calculation section 28, and calculation of the grayscale conversion curve a and luminance $Y_n(p)$ is executed by the luminance range normalization section 30.

Figure 15:
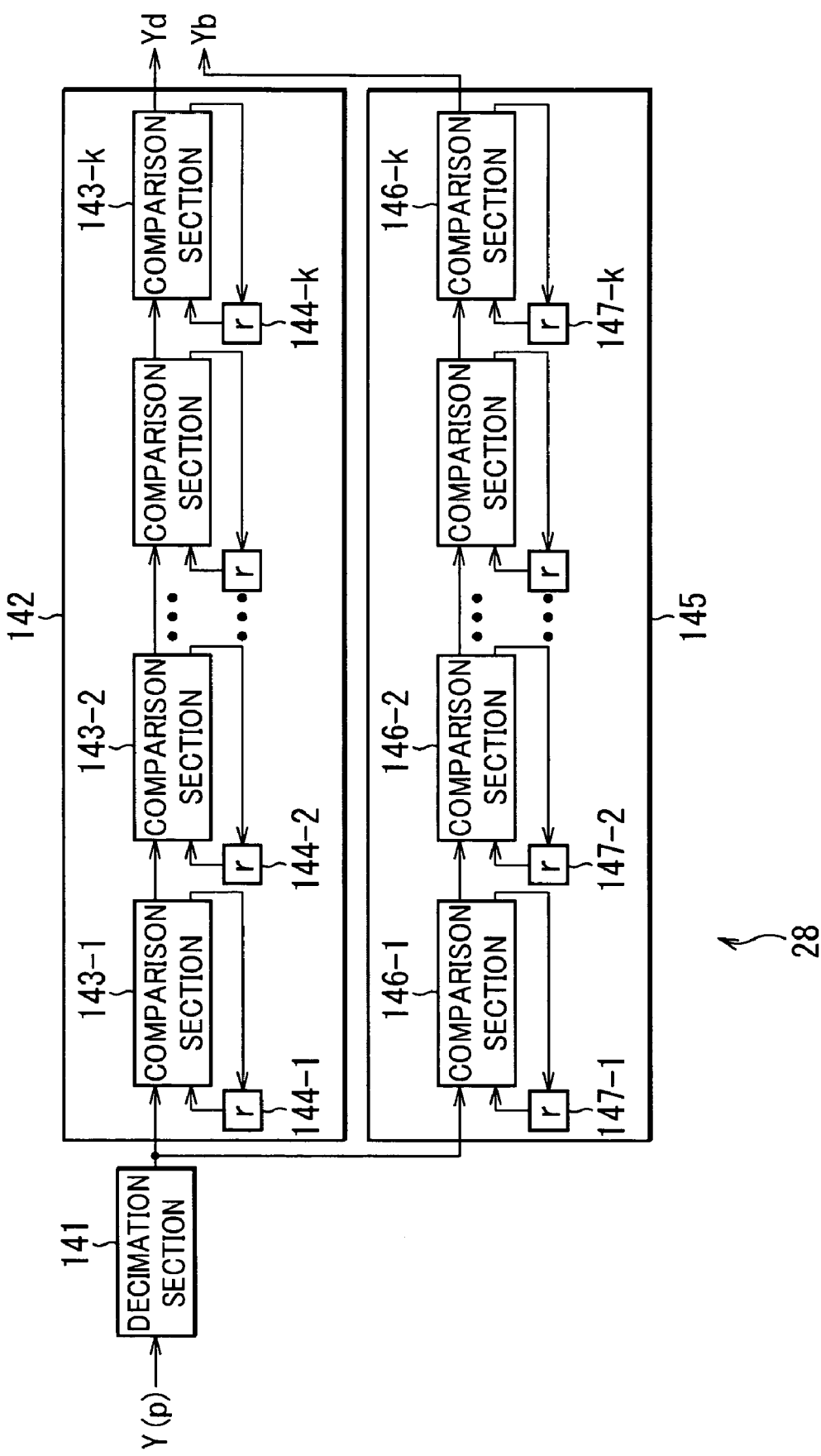
FIG. 15 is a block diagram showing an exemplary configuration of a luminance range information calculation section shown in FIG. 2.

FIG. 15 shows an exemplary configuration of the luminance range information calculation section 28. In the luminance range information calculation section 28, a decimation section 141 chooses the luminance $Y(p)$ received from the gamma correction section 27 based on the pixel position p. That is, only luminance values of images at preliminarily-set pixel positions are supplied to a MIN sorting section 142 and a MAX sorting section 145 in the succeeding stage.

The MIN sorting section 142 is configured so that k pairs of a combination of a comparison section 143 and a register 144 are arranged in series, and so that the input luminance $Y(p)$ values are held by registers 144-1 to 144-$k$ in an increasing order.

For example, the comparison section 143-1 compares the luminance $Y(p)$ from the decimation section 141 and a value in the register 144-1, and updates, when the luminance $Y(p)$ from the decimation section 141 is smaller than the value in the register 144-1, the value in the register 144-1 using the luminance $Y(p)$ from the decimation section 141. On the contrary, when the luminance $Y(p)$ from the decimation section 141 is not smaller than the value in the register 144-1, the luminance $Y(p)$ from the decimation section 141 is supplied to the comparison section 143-2 in the succeeding stage.

The comparison section 143-2 compares the luminance $Y(p)$ from the comparison section 143-1 and a value in the register 144-2, and updates, when the luminance $Y(p)$ from the comparison section 143-1 is smaller than the value in the register 144-2, the value in the register 144-2 using the luminance $Y(p)$ from the comparison section 143-1. On the contrary, when the luminance $Y(p)$ from the comparison section 143-1 is not smaller than the value in the register 144-2, the luminance $Y(p)$ from the comparison section 143-1 is supplied to the comparison section 143-3 in the succeeding stage.

The same will apply also to the comparison sections 143-3 and thereafter, wherein after completion of input of the luminance $Y(p)$ for one frame, the register 144-1 will have the minimum value $Y_{min}$ of the luminance $Y(p)$ held therein, and the registers 144-2 to 144-$k$ will have the luminance $Y(p)$ values held therein in an increasing order, and the luminance $Y(p)$ held in the register 144-$k$ is output as the luminance Yd of the luminance range information to the succeeding stage.

The MAX sorting section 145 is configured so that k pairs of a combination of a comparison section 146 and a register 147 are arranged in series, and so that the input luminance $Y(p)$ values are held by registers 147-1 to 147-$k$ in a decreasing order.

For example, the comparison section 146-1 compares the luminance $Y(p)$ from the decimation section 141 and a value in the register 147-1, and updates, when the luminance $Y(p)$ from the decimation section 141 is larger than the value in the register 144-1, the value in the register 147-1 using the luminance $Y(p)$ from the decimation section 141. On the contrary, when the luminance $Y(p)$ from the decimation section 141 is not larger than the value in the register 147-1, the luminance $Y(p)$ from the decimation section 141 is supplied to the comparison section 146-2 in the succeeding stage.

The comparison section 146-2 compares the luminance $Y(p)$ from the comparison section 146-1 and a value in the register 147-2, and updates, when the luminance $Y(p)$ from the comparison section 146-1 is larger than the value in the register 147-2, the value in the register 147-2 using the luminance $Y(p)$ from the comparison section 146-1. On the contrary, when the luminance $Y(p)$ from the comparison section 146-1 is not larger than the value in the register 147-2, the luminance $Y(p)$ from the comparison section 146-1 is supplied to the comparison section 146-3 in the succeeding stage.

The same will apply also to the comparison sections 146-3 and thereafter, wherein after completion of input of the luminance Y (p) for one frame, the register 147-1 will have the maximum value $Y_{max}$ of the luminance Y (p) held therein, and the registers 147-2 to 147-$k$ will have the luminance $Y(p)$ values held therein in a decreasing order, and the luminance $Y(p)$ held in the register 147-$k$ is output as the luminance $Y_b$ of the luminance range information to the succeeding stage.

Because the luminance $Y(p)$ input to the MIN sorting section 142 and MAX sorting section 145 are decimated by the decimation section 141, appropriate adjustment of intervals of the decimating and the number of steps k of the MIN sorting section 142 and MAX sorting section 145 makes it possible to obtain luminance values $Y_d, Y_b$ which respectively correspond with 1%, for example, of the upper and lower ends of the entire pixels in one frame.

Figure 16:
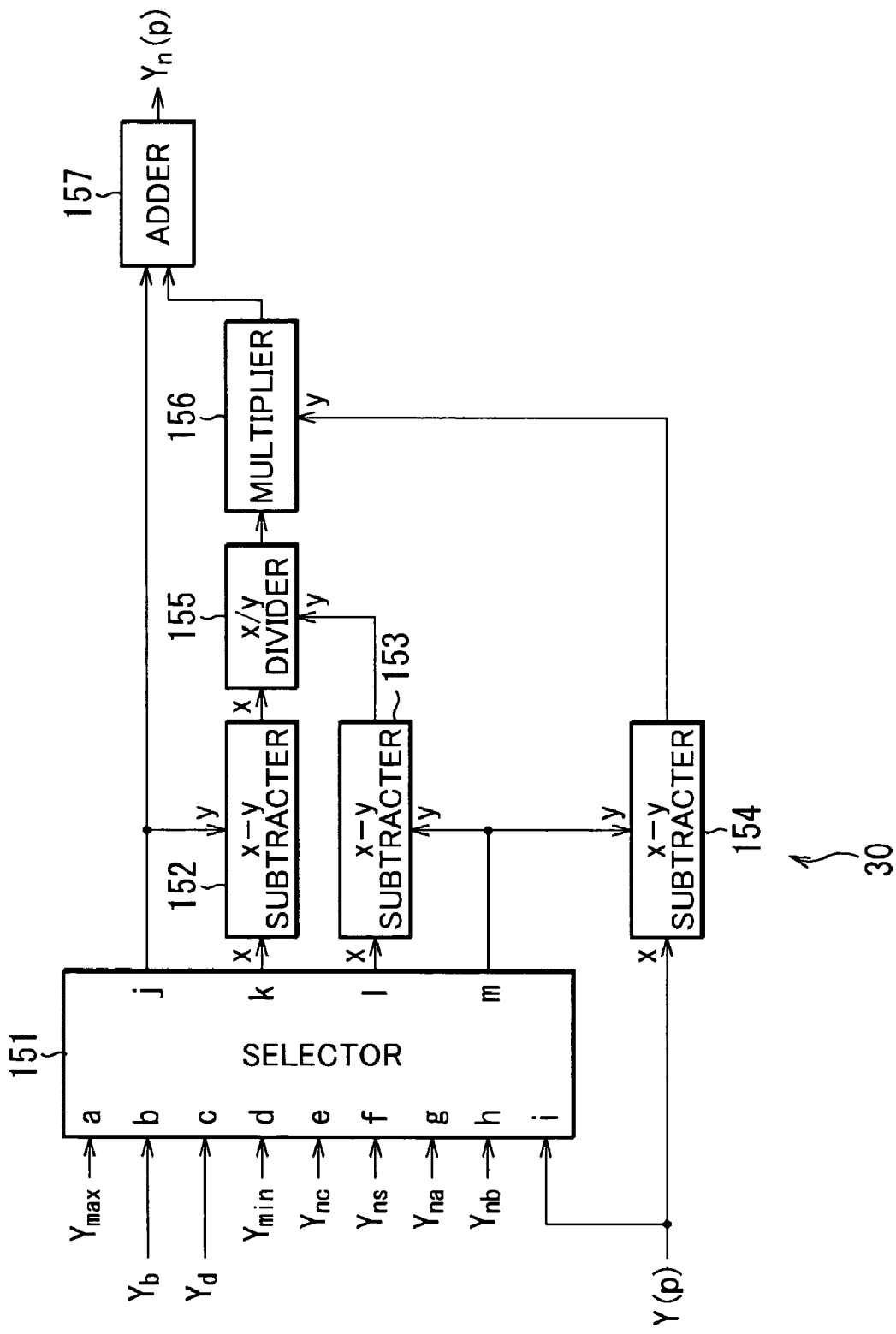
FIG. 16 is a block diagram showing an exemplary configuration of a luminance range normalization section shown in FIG. 2.

FIG. 16 shows an exemplary configuration of the luminance range normalization section 30. The luminance range normalization section 30 determines, as described in the above, the grayscale conversion curve α, and converts the gamma-corrected luminance $Y(p)$ into the luminance $Y_n(p)$ after the luminance range normalization using the grayscale conversion curve α.

Because the grayscale conversion curve α is constructed from five line segments as shown in FIG. 14, the luminance range normalization section 30 discriminates to which segments the input luminance $Y(p)$ belongs, and applies one of five line segments composing the grayscale conversion curve α to the input luminance $Y(p)$ to there by convert it into the luminance $Y_n(p)$ after the luminance range normalization.

A selector 151 of the luminance range normalization section 30 outputs, based on the luminance $Y(p)$ input to an input terminal i, four luminance values out of the luminance values $Y_{max}, Y_b, Y_d, Y_{min}, Y_{nc}, Y_{ns}, Y_{na}$ and $Y_{nb}$ respectively input to input terminals a to h from the output terminals j to m. Correlations there among are expressed by the equation (6) below:

$$[j, k, l, m] = \begin{cases} [h, h, c, d] & i < d \\ [h, g, c, d] & d \leq i < c \\ [g, f, b, c] & c \leq i < b \\ [f, e, a, b] & b \leq i < a \\ [e, e, a, b] & a \leq i \end{cases} \tag{6}$$

A subtracter 152 calculates difference between an output from the output terminal k and an output from the output terminal j, and outputs the result to a divider 155. A subtracter 153 calculates difference between an output from the output terminal 1 and an output from a subtracter 154, and outputs the result to the divider 155. The subtracter 154 calculates difference between the luminance Y (p) and an output from the output terminal m, and outputs the result to a multiplier 156. The divider 155 calculates ratio of an output from the subtracter 152 and an output from the subtracter 153, and outputs the result to the multiplier 156. The multiplier 156 calculates product of an output from the divider 155 and an output from the subtracter 154, and outputs the result to an adder 157. The adder 157 adds an output from the output terminal j and an output from the multiplier 156, and outputs the result.

The output $Y_n(p)$ from the adder 157 is expressed by the equation (7) below, which indicates the line segment of the grayscale conversion curve α discriminated based on the gamma-corrected luminance Y(p).

$$Y_n(p) = \frac{k-j}{l-m}(Y(p) - m) + j \qquad (7)$$

Here is an end of description on the individual portions composing the DSP 7 shown in FIG. 2.

Figure 17:
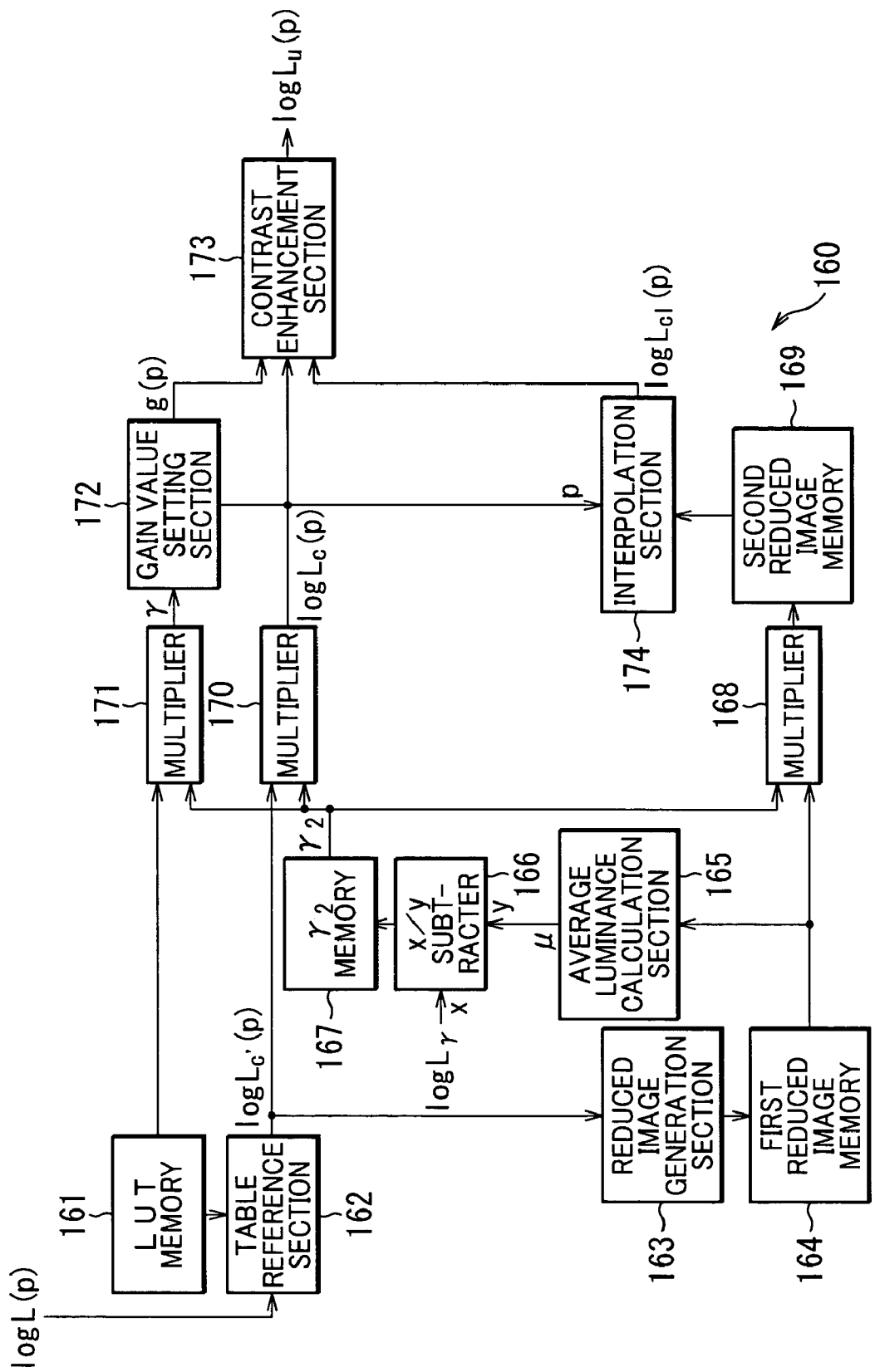
FIG. 17 is a block diagram showing an exemplary configuration of a composite section substitutable to a portion ranging from the tone curve correction section to the contrast correction section shown in FIG. 2.

Meanwhile, it is also possible to reduce the amount of calculation by a simpler circuit configuration, paying attention to that the average luminance calculation section 63 of the tone curve correction section 22 shown in FIG. 6 and the average luminance calculation section 72 of the reduced image generation section 23 execute the similar calculation. More specifically, the tone curve correction section 22, reduced image generation section 23, reduced image memory 24 and contrast correction section 25, all of which shown in FIG. 2, can be combined to be provided as a composite section as shown in FIG. 17.

The composite section 160 can be a substitute for the tone curve correction section 22, reduced image generation section 23, reduced image memory 24 and contrast correction section 25 shown in FIG. 2.

A LUT memory 161 of the composite section 160 has a LUT corresponded to the tone curve as shown in FIG. 4 and a representative value $\gamma_1$ which expresses a slope of the tone curve preliminarily held therein. A table reference section 162 corrects the logarithmic luminance logL(p) received from the preceding stage based on the LUT held by the LUT memory 161 to thereby give a logarithmic luminance $logL_{c'}$(p), and outputs it to a reduced image generation section 163 and a multiplier 172.

The reduced image generation section 163 divides the logarithmic luminance image $logL_{c'}$ into m×n blocks, calculates an average value of the logarithmic luminance $logL_{c'}$(p) of the pixels which belong to the individual blocks to thereby generate an m×n-pixel first reduced image, and makes a first reduced image memory 164 to store it.

The average luminance calculation section 63 calculates an average value μ of pixel values of the previous frame's first reduced image held by the first reduced image memory 164, and outputs it to a divider 166. The divider 166 divides a predetermined constant $logL_T$ by the average value μ to thereby calculate the representative value $\gamma_2$, and makes a $\gamma_2$ memory 167 to store it. A multiplier 168 multiplies the individual pixels of the first reduced image held by the first reduced image memory 164 by the representative value $\gamma_2$ held by the $\gamma_2$ memory 65 to thereby generate a second reduced image $logL_{cl}$, and makes a second reduced image memory 169 to store it.

A multiplier 170 multiplies the logarithmic luminance $logL_{c'}$(p) of the current frame received from the table reference section 162 by the previous frame's representative value $\gamma_2$ held by the $\gamma_2$ memory 167, to thereby calculates the logarithmic luminance $logL_c$(p) after the tone curve correction. A multiplier 171 outputs a product of the representative values $\gamma_1$ and $\gamma_2$, as a representative value $\gamma(=\gamma_1 \cdot \gamma_2)$, to a gain value setting section 172.

The gain value setting section 172 calculates a gain value g(p), which determines an amount of contrast enhancement of the logarithmic luminance $logL_c$(p) of the current frame, based on the representative value γ for the preceding frame received from the multiplier 171, and the logarithmic luminance $logL_c$(p) for the current frame received from the multiplier 170.

An interpolation position designation section 173 acquires a pixel position p of the logarithmic luminance $logL_c$(p) of the current frame received from the multiplier 170 in the preceding stage (also referred to as position of interpolation p, hereinafter), and outputs it to an interpolation section 174. The interpolation section 174 calculates, by interpolation, the pixel $logL_{cl}$(p) corresponded to the position of interpolation p, using the previous frame's second reduced image $logL_{cl}$ held by the second reduced image memory 169, and outputs it to a contrast enhancement section 175.

The contrast enhancement section 175 calculates the logarithmic luminance $logL_u$(p) having an enhanced contrast in the components other than the low-frequency ones, with respect to the logarithmic luminance $logL_c$(p) of the current frame received from the multiplier 170, based on the gain value g(p) and the interpolation value $logL_{cl}$(p) of the reduced image.

Use of the composite section 160 allows the average luminance calculation section 165 to calculate an average value of the m×n-pixel first reduced image, and this is successful in reducing the volume of calculation as compared with the average luminance calculation section 63 shown in FIG. 6 by which the average value is calculated for the pixels of the logarithmic luminance image of the original size. It is therefore possible to reduce the delay time ascribable to the calculation.

Figure 18:
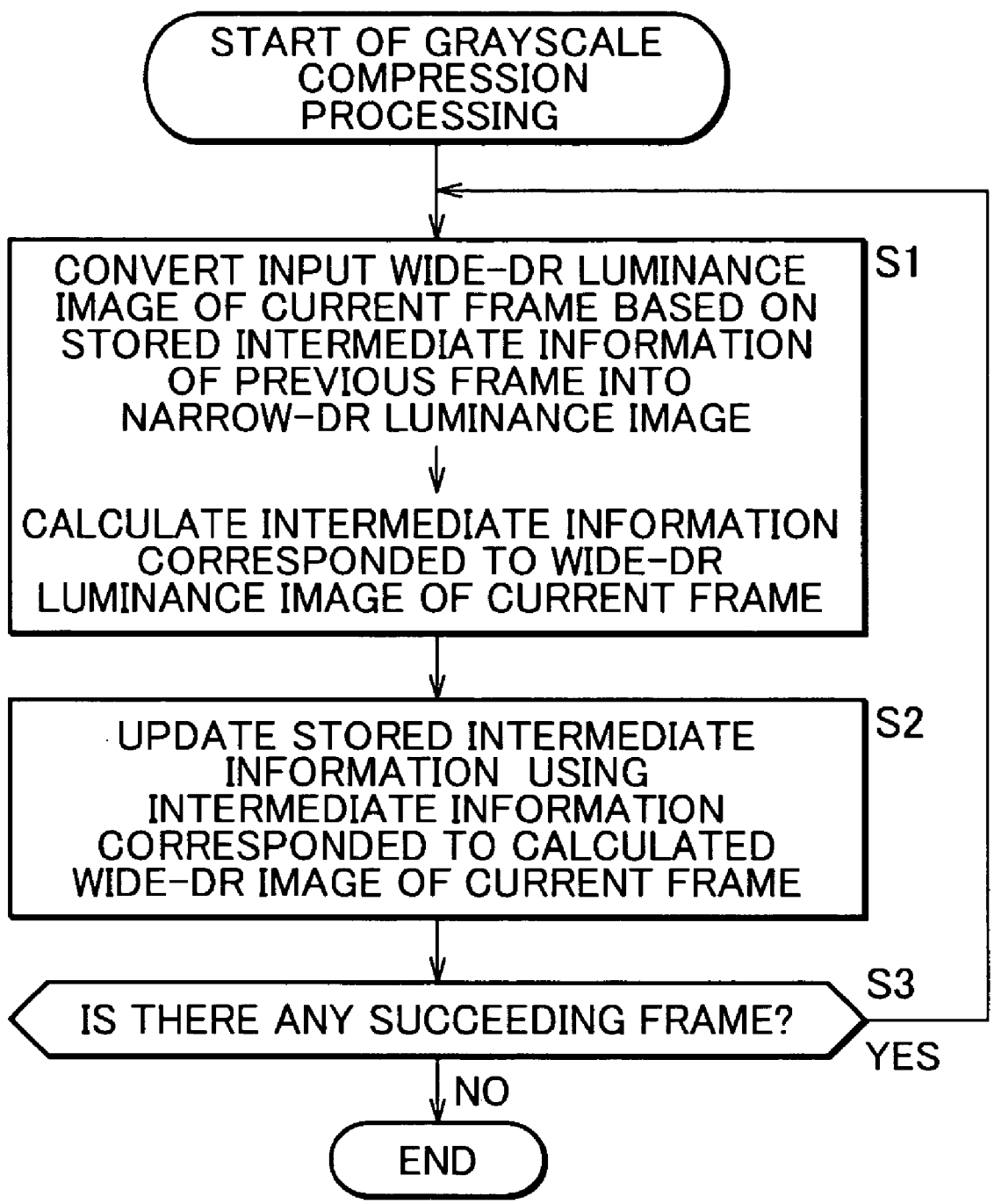
FIG. 18 is a flow chart for explaining grayscale compression processing by the first exemplary configuration of the DSP.

Next, a general grayscale compression processing using the first exemplary configuration of the DSP 7 applied with the composite section 160 shown in FIG. 17 will be described referring to the flow chart of FIG. 18.

In step S1, the DSP 7 converts the input wide-DR luminance image L of the current frame into the narrow-DR luminance image $Y_n$, based on the intermediate information (second reduced image $logL_c$(p), representative value γ, luminance range information $[Y_d, Y_b]$) already calculated and held with respect to the previous frame's, wide-DR luminance image. The DSP 7 also calculates the intermediate information with respect to the wide-DR luminance image L of the current frame.

In step S2, the DSP 7 updates the intermediate information with respect to the stored previous frame's wide-DR luminance image, using the intermediate information with respect to the calculated wide-DR luminance image L of the current frame.

In step S3, the DSP 7 discriminates whether any succeeding frame after the input wide-DR luminance image of the current frame is present or not, and upon judgment of the presence, the process returns to step S1 and processes thereafter are repeated. On the contrary, upon judgment of the absence of any succeeding frame, the grayscale compression processing comes to the end.

Figure 19:
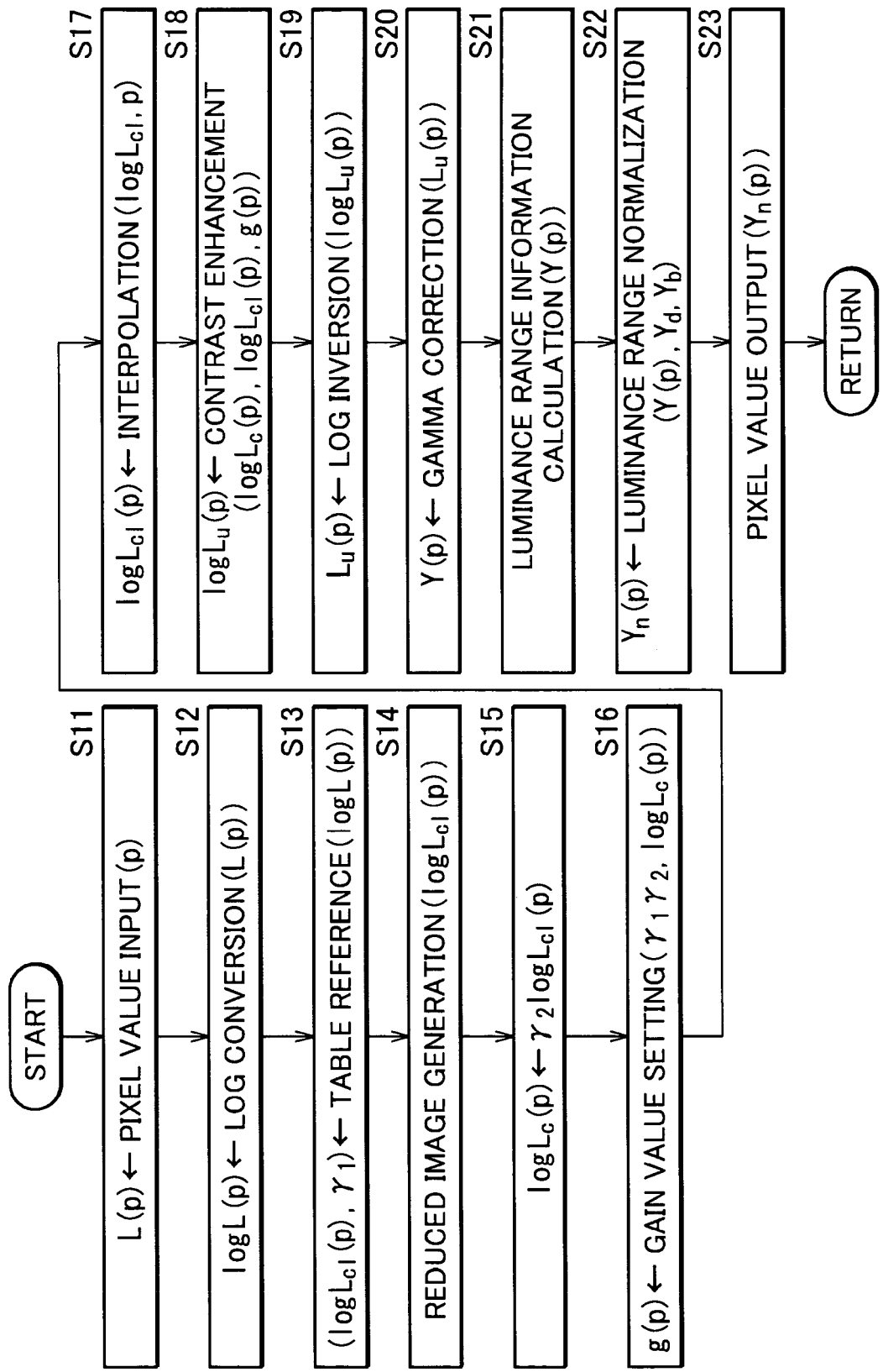
FIG. 19 is a flow chart for explaining details of the processing in step S1 shown in FIG. 18.

Details of the processing on the pixel basis in step S1 will be explained referring to the flow chart in FIG. 19. Processing of the individual steps described below are executed with respect to a target pixel (pixel position p) input according to order of raster.

In step S1, luminance L(p) of a target pixel (pixel position p) is input to the DSP 7. In step S12, the logarithmic conversion section 21 subjects the input luminance L(p) to the logarithmic conversion, and outputs the obtained logarithmic luminance logL(p) to the composite section 160. In step S13, the table reference section 162 of the composite section 160 corrects the logarithmic luminance logL(p) received from the logarithmic conversion section 21 to thereby obtain the logarithmic luminance $logL_{c'}(p)$ based on the LUT held by the LUT memory 161, and outputs it to the reduced image generation section 163 and multiplier 172. At the same time, the LUT memory 161 outputs the representative value $\gamma_1$ of the tone curve to the multiplier 171. The multiplier 171 outputs a product of the representative values $\gamma_1$ and $\gamma_2$ calculated based on the previous frame's first reduced image held by the $\gamma_2$ memory 167, as the representative value $\gamma$, to the gain value setting section 172.

In step S14, the reduced image generation section 163 generates the first reduced image based on the logarithmic luminance logLc'(p) for one frame after the tone curve correction. Based on the first reduced image generated herein, the representative value $\gamma_2$ is calculated. The generated first reduced image is also multiplied by the calculated representative value $\gamma_2$, and thereby the second reduced image $logL_{cl}$ is generated.

In step S15, the multiplier 170 multiplies the logarithmic luminance $logL_{c'}(p)$ of the current frame received from the table reference section 162 by the previous frame's representative value $\gamma_2$ held by the $\gamma_2$ memory 167, to thereby calculate the logarithmic luminance $logL_c(p)$ after the tone curve correction.

In step S16, the gain value setting section 172 calculates the gain value g(p), which determines the amount of contrast enhancement of the logarithmic luminance $logL_c(p)$ of the current frame, based on the representative value $\gamma$ with respect to the preceding frame received from the multiplier 171 and the logarithmic luminance $logL_c(p)$ of the current frame received from the multiplier 170.

In step S17, the interpolation section 174 calculates, by interpolation, the pixel $logL_{cl}(p)$ corresponded to the position of interpolation p, using the previous frame's second reduced image $logL_{cl}$ held by the second reduced image memory 169, and outputs it to the contrast enhancement section 175. In step S18, the contrast enhancement section 175 enhances the components other than low-frequency ones of the logarithmic luminance $logL_c(p)$ after the tone curve correction, based on the interpolation value $logL_{cl}(p)$ and gain value g(p) of the second reduced image, and outputs the obtained contrast-corrected logarithmic luminance $logL_u(p)$ to the logarithmic inversion section 26 in the succeeding stage.

In step S19, the logarithmic inversion section 26 converts the contrast-corrected logarithmic luminance $logL_u(P)$ into the luminance $L_u(P)$ expressed by the normal axis, and outputs it to the gamma correction section 27. In step S20, the gamma correction section carries out a predetermined gamma correction, and outputs the obtained luminance Y(p) to the luminance range information calculation section 28 and luminance range normalization section 30.

In step S21, the luminance range information calculation section 28 generates the luminance range information $[Y_d, Y_b]$ based on the luminance Y(p) for one frame. In step S22, the luminance range normalization section 30 normalizes the luminance Y(p) received from the gamma correction section 27, based on the previous frame's luminance range information $[Y_d, Y_b]$ held by the luminance range information memory 29, to thereby calculate the luminance $Y_n(p)$ In step S23, the luminance range normalization section 30 outputs the luminance $Y_n(p)$ as a pixel value of the grayscale-compressed, narrow-DR luminance image. Here is an end of the detailed explanation of the processing in step S1 shown in FIG. 18.

Figure 20:
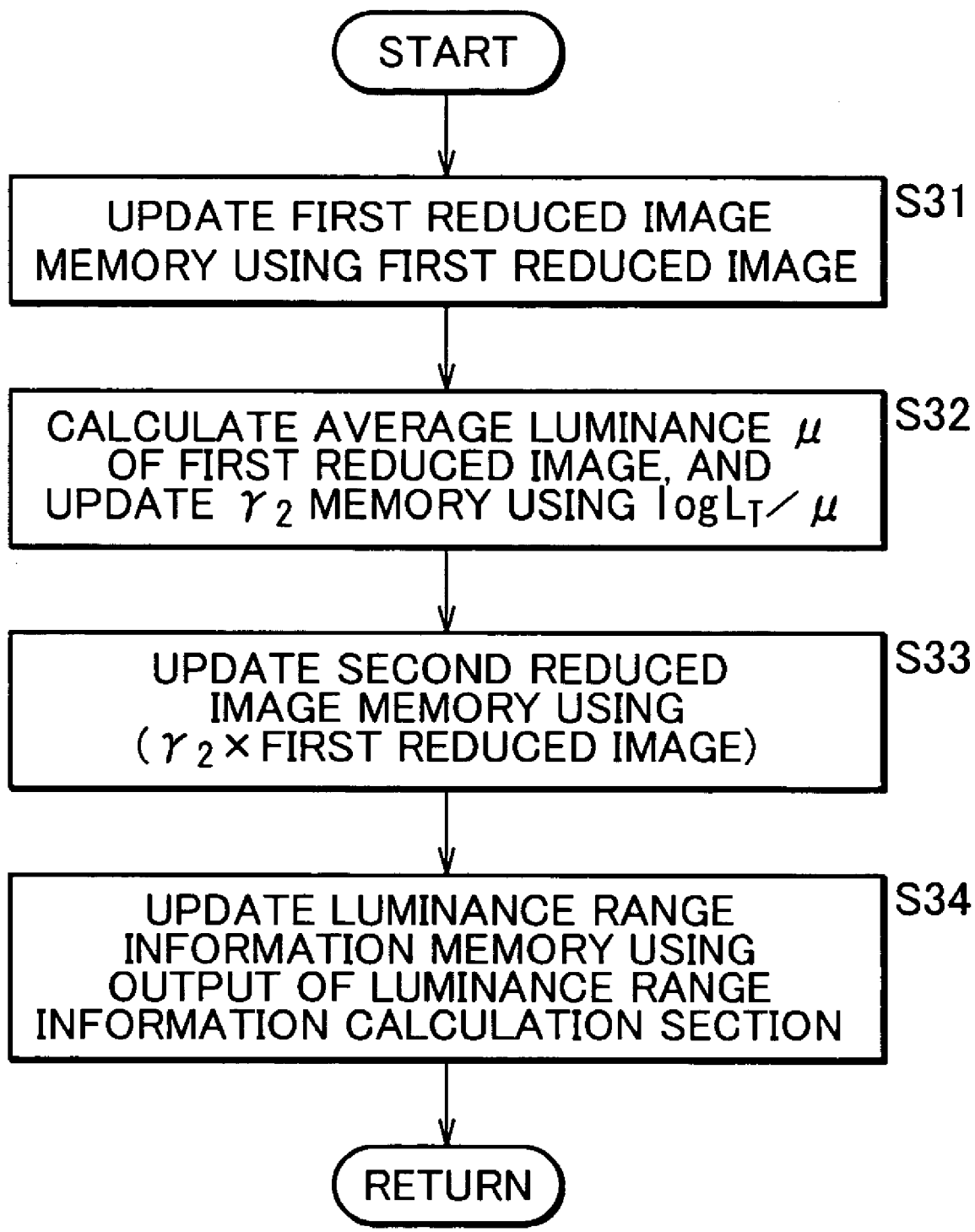
FIG. 20 is a flow chart for explaining details of the processing in step S2 shown in FIG. 18.

Next, details of the processing in step S2 in FIG. 18 will be explained referring to the flow chart in FIG. 20. In step S31, the reduced image generation section 163 updates the first reduced image held by the first reduced image memory 164, using the first reduced image generated based on the logarithmic luminance $logL_{c'}(p)$ for one frame after the tone curve correction.

In step S32, the divider 166 divides a predetermined constant $logL_T$ by the average value μ received from the average luminance calculation section 165 to thereby calculate the representative value $\gamma_2$, and updates the representative value $\gamma_2$ held by the $\gamma_2$ memory 167 using the calculated representative value $\gamma_2$.

In step S33, the multiplier 168 multiplies the individual pixels of the first reduced image updated by the processing in step S31 and held by the first reduced image memory 164, by the representative value $\gamma_2$ updated by the processing in step S32 and held by the $\gamma_2$ memory 65, to thereby generate the second reduced image $logL_{cl}$, and updates the second reduced image $logL_{cl}$ held by the first reduced image memory 169.

In step S34, the luminance range information calculation section 28 updates the previous frame's luminance range information $[Y_d, Y_b]$ held by the luminance range information memory 29 using the luminance range information $[Y_d, Y_b]$ calculated based on the luminance Y(p) for one frame. Here is the end of the detailed explanation of the processing of step S2 in FIG. 18.

Figure 21:
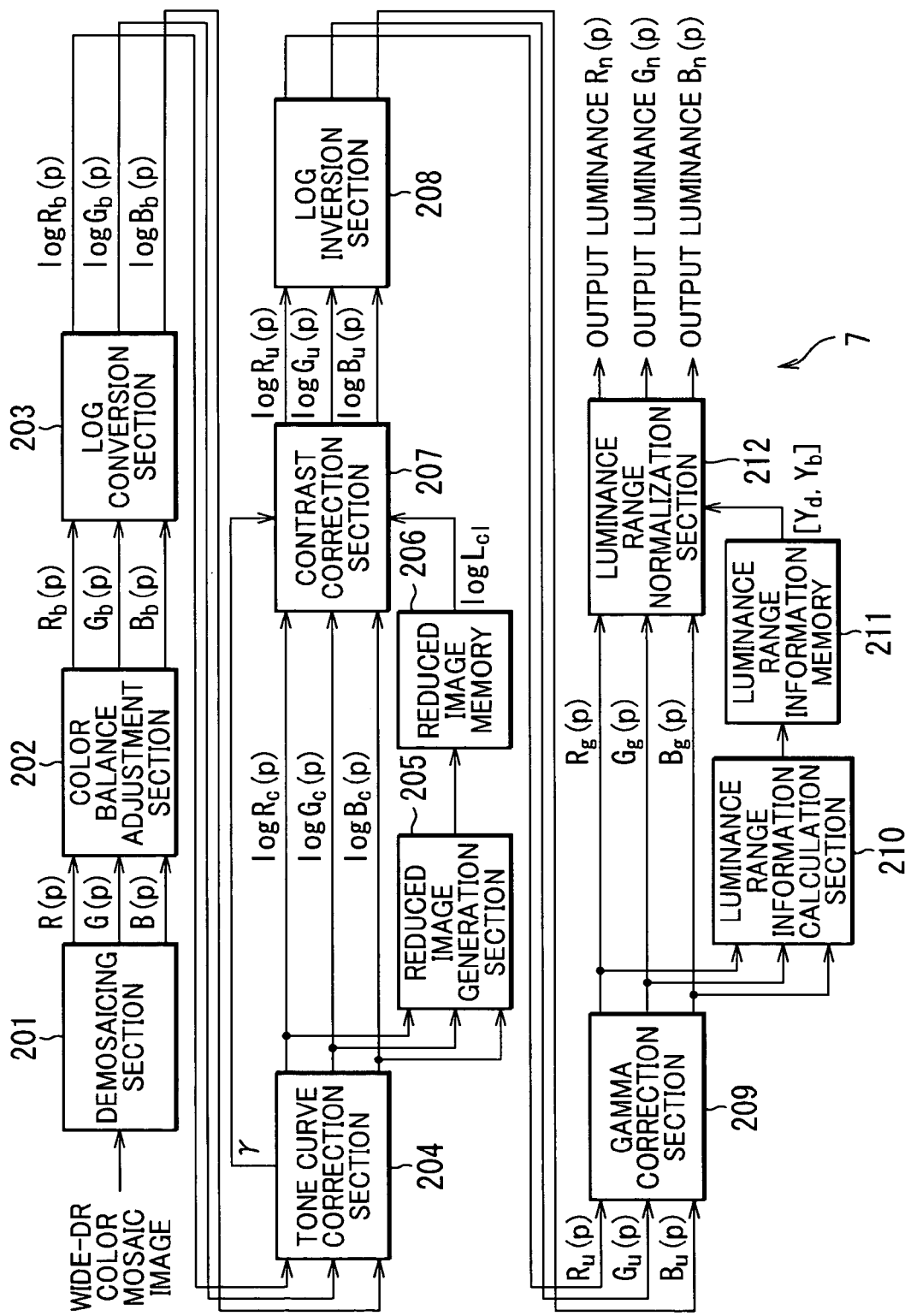
FIG. 21 is a block diagram showing a second exemplary configuration of the DSP shown in FIG. 1.

Next, FIG. 21 shows an exemplary configuration of the DSP 7 adapted to the wide-DR image, which is a color image. It is to be noted that the wide-DR image input to the DSP 7 according to the order of raster is not configured so that all of the pixels thereof individually have all components of the R, G and B components, but is configured so as to have either one of the R, G and B components. The wide-DR image which is a color image input to the second exemplary configuration of the DSP 7 is referred to as a wide-DR color mosaic image, hereinafter. Which one of the R, G and B components do the individual pixels of the wide-DR color mosaic image have is determined by the position of the pixels.

It is defied now to denote a pixel value of the wide-DR color mosaic image input to the DSP 7 in the order of raster as L(p).

In the second exemplary configuration of the DSP 7, a demosaicing section 201 demosaics the pixel value L(p) for one frame in which each pixel has a different color, so as to make all of the pixels have all of R, G and B components, to thereby generate a color signal [R(p), G(p), B(p)], and outputs it to the color balance adjustment section 202. An image constructed from the color signals output from the demosaicing section 201 will be referred to as a wide-DR color image, hereinafter.

The color balance adjustment section 202 adjusts each of the R, G and B components so as to make the color balance of the entire image appropriate, to thereby generate the color signal $[R_b(P), G_b(P), B_b(P)]$. It is to be noted that the demosaicing section 201 and color balance adjustment section 202 are such as those mounted on general digital video recorder equipped with a single-plate-type CCD image sensor.

The logarithmic conversion section 203 subjects the color signal $[R_b(P), G_b(P), B_b(P)]$ received from the color balance adjustment section 202 to the logarithmic conversion, and outputs the obtained logarithmic color signal $[logR_b(p), logG_b(p), logB_b(p)]$ to the tone curve correction section 204. The tone curve correction section 204 applies a preliminarily-obtained tone curve to the input logarithmic color signal $[logR_b(p), logG_b(p), logB_b(p)]$ and converts it in the direction of compressing the grayscale, and outputs the obtained logarithmic color signal $[logR_b(p), logG_b(p), logB_b(p)]$ to a reduced image generation section 205 and a contrast correction section 207. The tone curve correction section 204 also outputs the representative value γ which expresses a slope of the applied tone curve to the contrast correction section 207.

The reduced image generation section 205 generates the reduced image $logL_{cl}$ based on the logarithmic color signal $[logR_c(p), logG_c(p), logB_c(p)]$ for one frame received from the tone curve correction section 204, and make the reduced image memory 206 to store it.

The contrast correction section 207 corrects the contrast, weakened by the tone curve correction, of the logarithmic color signal $[logR_c(p), logG_c(p), logB_c(p)]$ of the current frame received from the tone curve correction section 204, based on the representative value γ and the previous frame s reduced image $logL_{cl}$ held by the reduced image memory 206, and outputs the obtained logarithmic color signal $[logR_u(p), logG_u(p), logB_u(p)]$ to the logarithmic inversion section 208. The logarithmic inversion section 208 subjects the contrast-corrected logarithmic color signal $[logR_u(p), logG_u(p), logB_u(p)]$ to the logarithmic inversion, and outputs the obtained color signal $[R_u(p), G_u(p), B_u(p)]$ expressed by the normal axis to the gamma correction section 209.

The gamma correction section 209 subjects the color signal $[R_u(p), G_u(p), B_u(p)]$ received from the logarithmic inversion section 208 to the gamma correction in consideration of the gamma characteristic of a reproduction apparatus (e.g., display 11), and outputs the obtained gamma-corrected color signal $[R_g(p), G_g(p), B_g(p)]$ to the luminance information calculation section 210 and luminance range normalization section 212. The luminance information calculation section 210 converts the $[R_g(p), G_u(p), B_g(p)]$ for one frame, received from the gamma correction section 209, into the luminance Y(p), calculates the luminance range information for indicating the distribution of the luminance Y (p), and makes the luminance range information memory 211 to store it. The luminance range information described herein refers to an information indicating a range of distribution of the luminance Y(p) for one frame, and is typically calculated as the luminance range information $[Y_d, Y_b]$ using the luminance $Y_d$ closest to the darkness and the luminance $Y_b$ closest to the brightness.

The luminance range normalization section 212 converts the color signal $[R_g(p), G_u(p), B_g(p)]$ of the current frame received from the gamma correction section 209 so that the distribution range thereof can coincide with a range expressible by the reproduction apparatus (e.g., display 11), based on the previous frame's luminance range information $[Y_d, Y_b]$ held by the luminance range information memory 211, and outputs the obtained color signal $[R_n(p), G_n(p) B_n(p)]$ as the narrow-DR image, which is a color image, to the succeeding stage.

As will be described below, the second exemplary configuration of the DSP 7 adapted to color image is almost similar to the first exemplary configuration adapted to monochrome image shown in FIG. 2 except that the demosaicing section 201 and the color balance section 202 are added, but is slightly modified in the internal configurations of the individual sections so as to be adapted to the color image.

Figure 22:
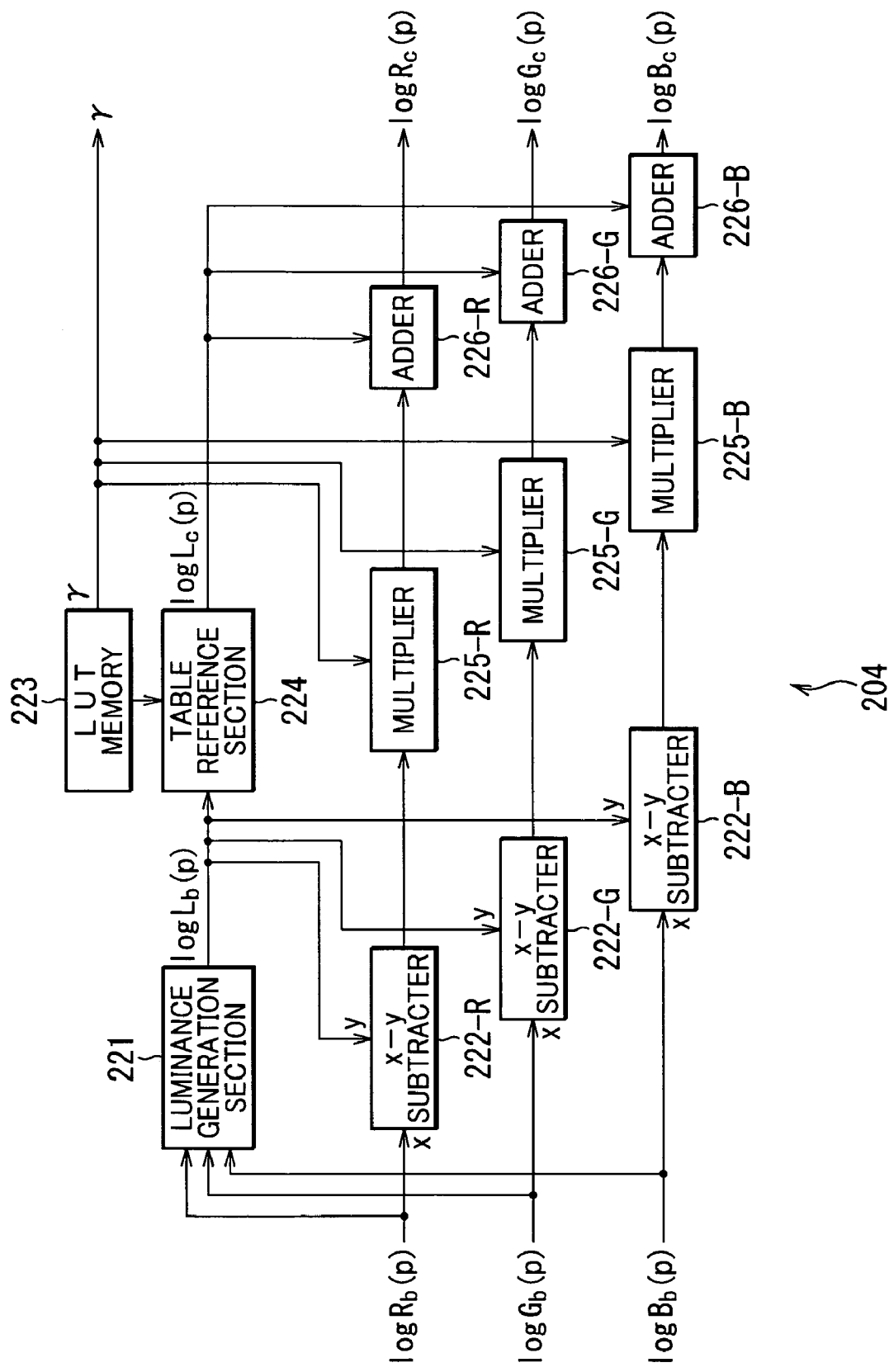
FIG. 22 is a block diagram showing a first exemplary configuration of a tone curve correction section shown in FIG. 21.

FIG. 22 shows a first exemplary configuration of the tone curve correction section 204. In the first exemplary configuration, a luminance generation section 221 generates the logarithmic luminance $logL_b(p)$ by calculating a linear sum of the input logarithmic color signal $[logR_b(p), logG_b(p), logB_b(p)]$, and outputs it to the subtracters 222-R to 222-B, and to the table reference section 224.

The subtracter 222-R subtracts the logarithmic luminance $logL_b(p)$ from the logarithmic color signal $logR_b(p)$, and outputs the result to a multiplier 225-R. A LUT memory 223 has a LUT which corresponds to the tone curve as shown in FIG. 4 and a representative value γ indicating a slope of the tone curve previously held therein. The table reference section 224 corrects the logarithmic luminance logL(p) into the logarithmic luminance $logL_c(p)$ using the LUT held by the LUT memory 223, and output it to adders 226-R to 226-B.

The multiplier 225-R multiplies the output of the subtracter 222-R by the representative value γ received from the LUT memory 223, and outputs it to the adder 226-R. The adder 226-R calculates a sum of the output of the multiplier 225-R and the logarithmic luminance $logL_c(p)$, and outputs the results as the logarithmic color signal $logR_c(p)$ after the tone curve correction to the succeeding stage.

It is to be noted now that any constituents for processing the G and B components are similar to those for processing the above-described R component, so that explanations therefor will be omitted.

Figure 23:
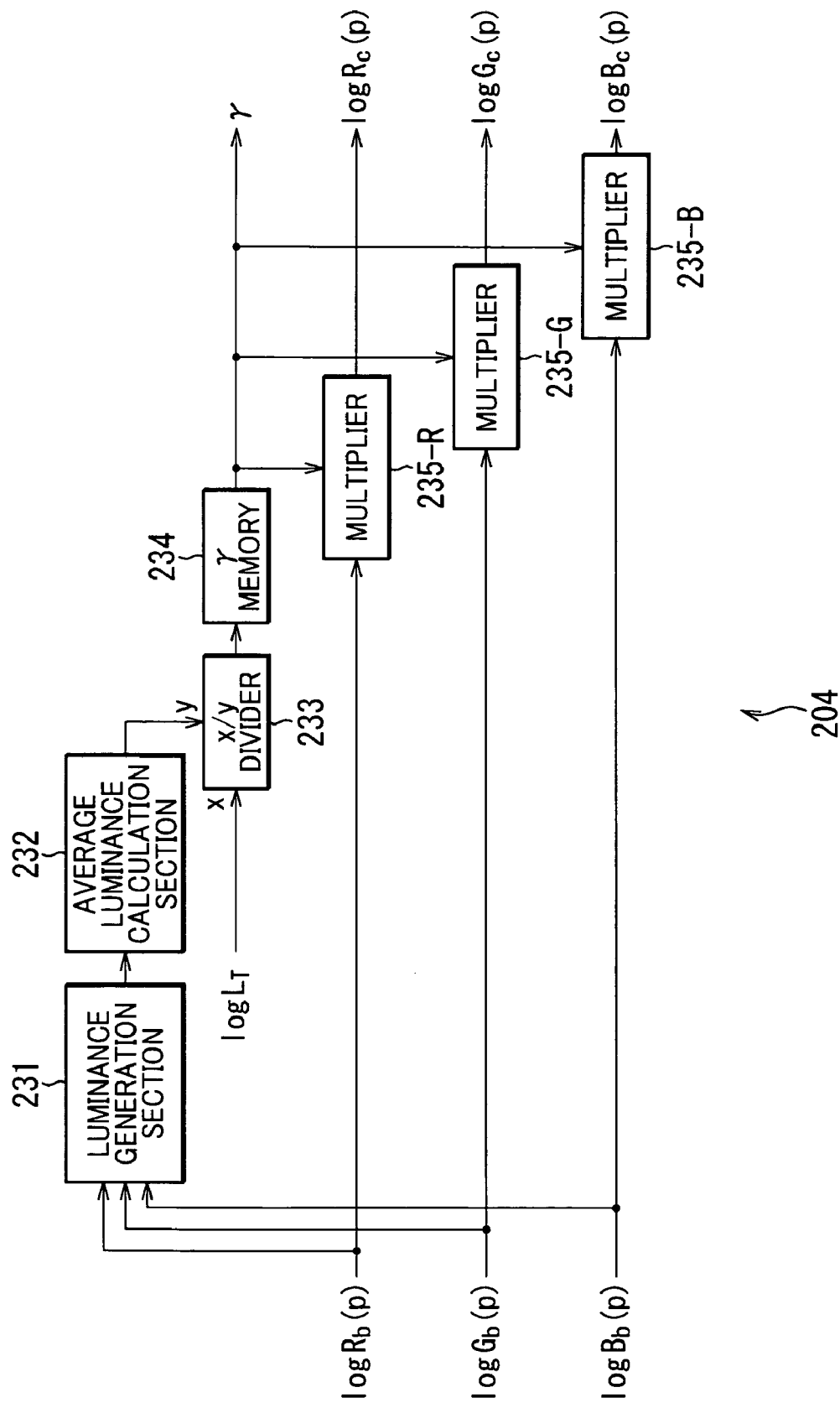
FIG. 23 is a block diagram showing a second exemplary configuration of the tone curve correction section shown in FIG. 21.

FIG. 23 shows a second exemplary configuration of the tone curve correction section 204. In the second exemplary configuration, a luminance generation section 231 calculates a linear sum of the input logarithmic color signal $[logR_b(p), logG_b(p), logB_b(p)]$ to thereby generate the logarithmic luminance $logL_b(p)$, and outputs it to an average luminance calculation section 232. The average luminance calculation section 232 calculates an average value μ of the logarithmic luminance logL(p) for one frame, and outputs it to a divider 233. The divider 233 divides a predetermined constant by the average value μ to thereby calculates the representative value γ, and makes a γ memory 234 to store it.

A multiplier 235-R multiplies the logarithmic color signal $logR_b(p)$ of the current frame by the previous frame's representative value γ held by the γ memory 234, to thereby calculates the logarithmic color signal $logR_c(p)$ after the tone curve correction.

It is to be noted now that any constituents for processing the G and B components are similar to those for processing the above-described R component, so that explanations therefor will be omitted.

Figure 24:
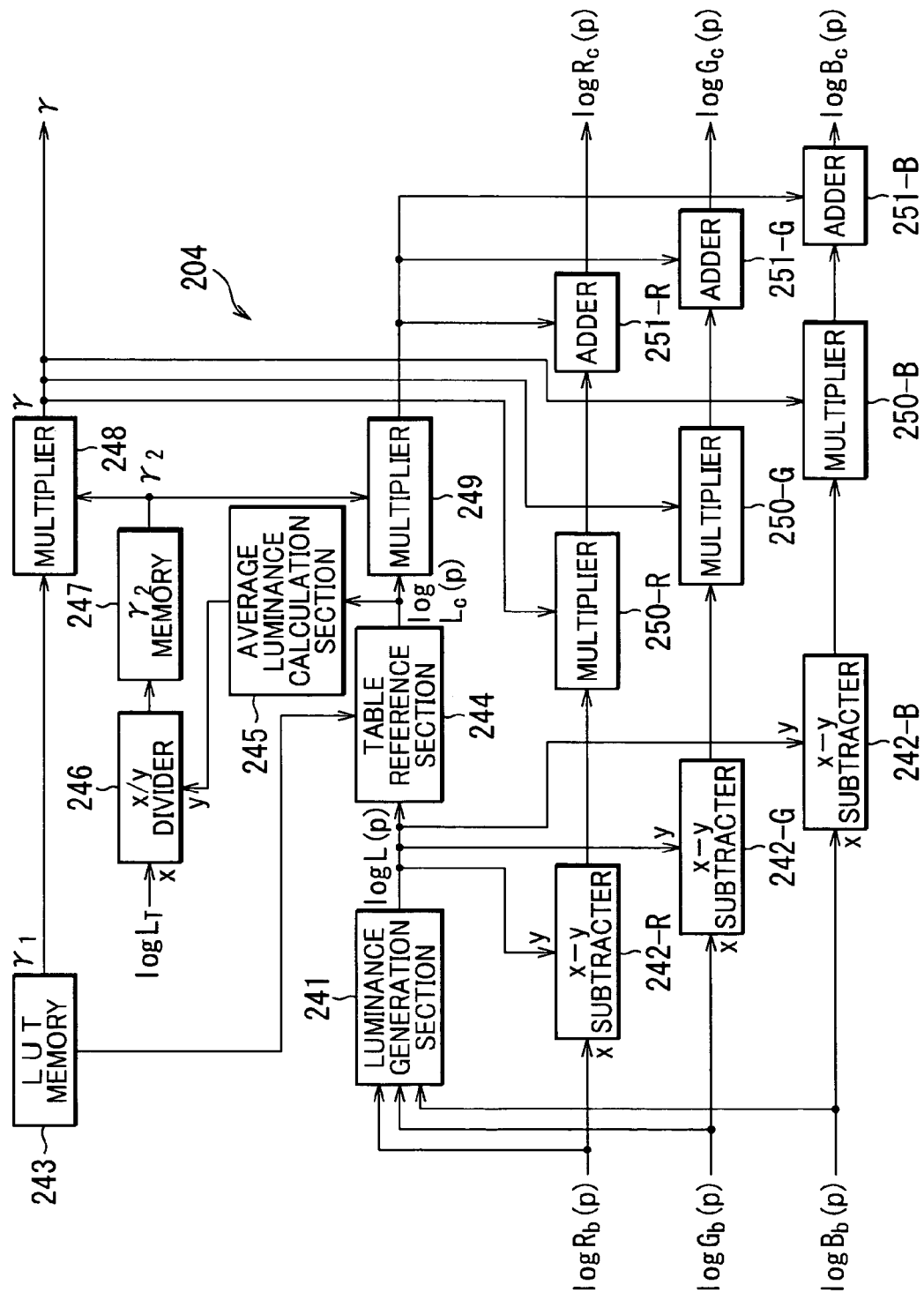
FIG. 24 is a block diagram showing a third exemplary configuration of the tone curve correction section shown in FIG. 21.

FIG. 24 shows a third exemplary configuration of the tone curve correction section 204. The third exemplary configuration is, so as to say, a combination of the first exemplary configuration and second exemplary configuration. In the third exemplary configuration, a luminance generation section 241 calculates a linear sum of the logarithmic color signal $[logR_b(p), logG_b(p), logB_b(p)]$ to thereby generate the logarithmic luminance $logL_b(p)$, and outputs it to subtracters 242-R to 242-B, and to a table reference section 244.

The subtracter 242-R subtracts the logarithmic luminance $logL_b(p)$ from the logarithmic color signal $logR_b(p)$, and outputs the result to a multiplier 250-R. A LUT memory 243 has a LUT which corresponds to the tone curve as shown in FIG. 4 and the representative value γ indicating a slope of the tone curve previously held therein. The table reference section 244 corrects the logarithmic luminance logL(p) into the logarithmic luminance $logL_{c'}(p)$ using the LUT held by the LUT memory 243, and outputs it to an average luminance calculation section 245 and to a multiplier 249.

The average luminance calculation section 245 calculates an average value μ of the logarithmic luminance $logL_{c'}(p)$ for one frame, and outputs it to a divider 246. The divider 246 divides a predetermined constant $logL_T$ by the average value μ to thereby calculate the representative value $γ_2$, and makes the $γ_2$ memory 247 to store it. The multiplier 248 outputs a product of the representative values $γ_1$ and $γ_2$ as the representative value γ $(=γ_1·γ_2)$ to the contrast correction section 207 in the succeeding stage.

The multiplier 249 multiplies the logarithmic luminance $logL_{c'}(p)$ of the current frame by the previous frame's representative value $\gamma_2$ held by the $\gamma_2$ memory 247 to thereby calculate the logarithmic luminance $logL_c(p)$ after the tone curve correction, and outputs it to adders 251-R to 251-B.

The multiplier 250-R multiplies the output of the subtracter 242-R by the representative value $\gamma$ received from the multiplier 248, and outputs the result to the adder 251-R. The adder 251-R calculates a product of an output of the multiplier 250-R and an output of the multiplier 249, and outputs the result as the logarithmic color signal $logR_c(p)$ after the tone curve correction to the succeeding stage.

It is to be noted now that any constituents for processing the G and B components are similar to those for processing the above-described R component, so that explanations therefor will be omitted.

Figure 25:
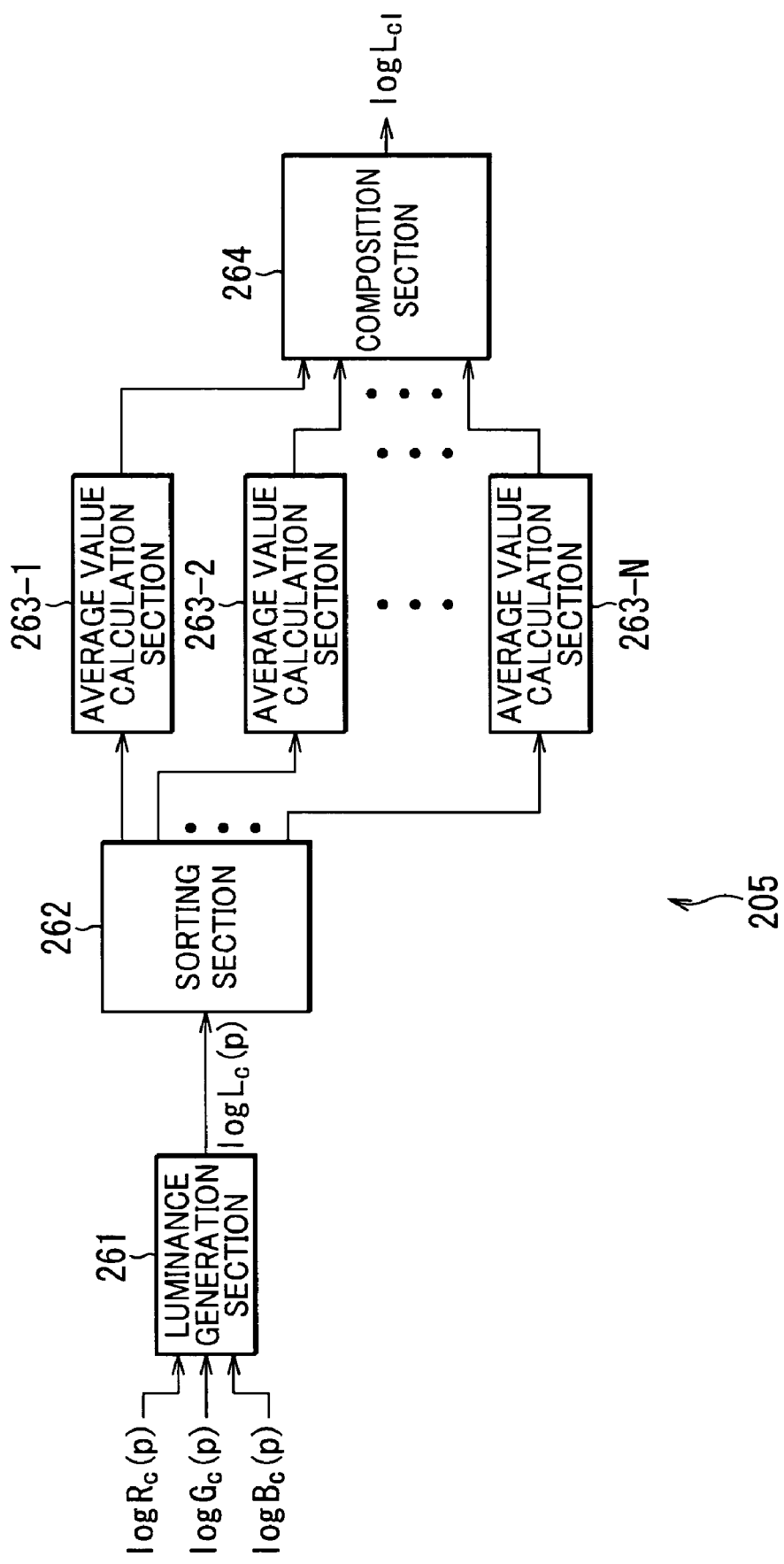
FIG. 25 is a block diagram showing an exemplary configuration of a reduced image generation section shown in FIG. 21.

FIG. 25 in the next shows an exemplary configuration of the reduced image generation section 205. A luminance generation section 261 of the reduced image generation section 205 calculates a linear sum of the input logarithmic color signal [$logR_c(p)$, $logG_c(p)$, $logB_c(p)$] after the tone curve correction to thereby generate the logarithmic luminance $logL_c(p)$, and outputs it to a sorting section 262.

A sorting section 262 sorts the logarithmic luminance $logL_c(p)$ values according to blocks to which the luminance belongs when the entire image is divided into m×n blocks, and then supplies them to the average value calculating sections 263-1 to 263-N (=m×n). For example, those classified into the first block are supplied to the average value calculation section 263-1, and those classified into the second block are supplied to the average value calculation section 263-2. The same will apply also to the succeeding ones, and those classified into the N-th block are supplied to the average value calculation section 263-N.

The average value calculation means 263-$i$ ($i$=1,2, . . . ,N) calculates an average value of the logarithmic luminance $logL_c(p)$ classified into the i-th block, out of logarithmic luminance values $logL_c(p)$ for one frame, and outputs it to a composition section 264. The composition section 264 generates an m×n-pixel reduced image $logL_{cl}$ having, as pixel values, the average values of the logarithmic luminance $logL_c(p)$ respectively received from the average value calculation section 263-$i$, and makes the reduced image memory 206 in the succeeding stage to store it.

Figure 26:
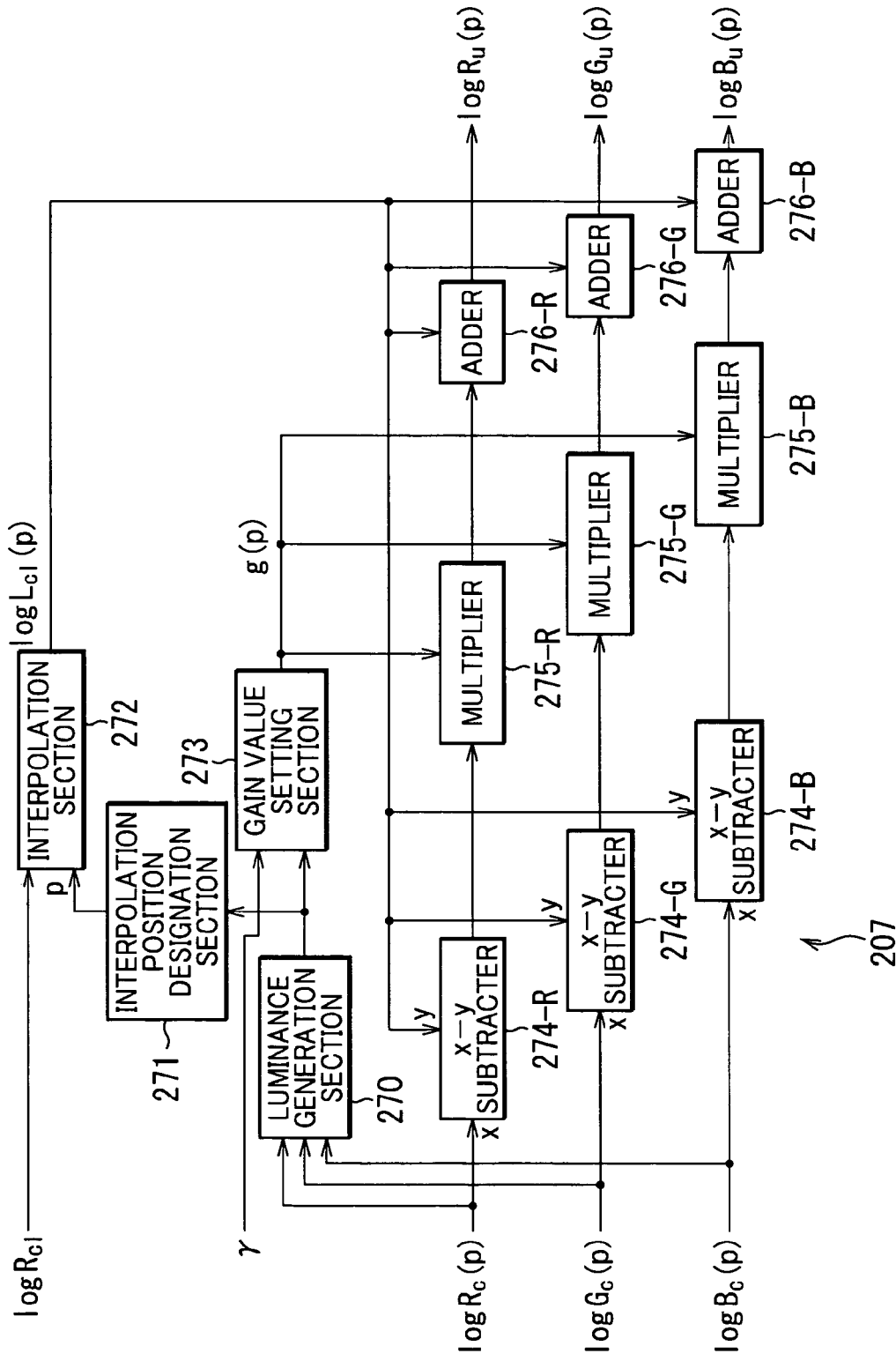
FIG. 26 is a block diagram showing an exemplary configuration of a contrast correction section shown in FIG. 21.

FIG. 26 in the next shows an exemplary configuration of the contrast correction section 207. The luminance generation section 270 of the contrast correction section 25 calculates a linear sum of the input logarithmic color signal [$logR_c(p)$, $logG_c(p)$, $logB_c(p)$] after the tone curve correction to thereby generate the logarithmic luminance $logL_c(p)$, and outputs it to an interpolation position designation section 271 and a gain value setting section 273.

The interpolation position designation section 271 acquires a pixel position p of the logarithmic luminance $logL_c(p)$ (also referred to as position of interpolation p, hereinafter), and outputs it to an interpolation section 272. The interpolation section 272 calculates, by interpolation, the pixel $logL_{cl}(p)$ corresponded to the position of interpolation p, using the previous frame's second reduced image $logL_{cl}$ held by the reduced image memory 206, and outputs it to subtracters 274-R to 274-B, and to adders 276-R to 276-B.

The gain value setting section 273 calculates the gain value g(p), which determines the amount of contrast enhancement of the logarithmic luminance $logL_c(p)$ of the current frame, based on the representative value $\gamma$ with respect to the preceding frame received from the tone curve correction section 22 and the logarithmic luminance $logL_c(p)$ of the current frame, and outputs it to multipliers 275-R to 275-B.

The subtracter 274-R subtracts the interpolation value $logL_{cl}(p)$ from the logarithmic color signal $logR_c(p)$ and outputs the result to the multiplier 275-R. The multiplier 275-R multiplies the output of the subtracter 274-R by the gain value g(p), and outputs the result to the adder 276-R. The adder 276-R adds the interpolation value $logL_{cl}(p)$ to the output of the multiplier 275-R, and outputs the obtained logarithmic color signal $logR_u(p)$ after the contrast correction to the succeeding stage.

It is to be noted now that any constituents for processing the G and B components are similar to those for processing the above-described R component, so that explanations therefor will be omitted.

Figure 27:
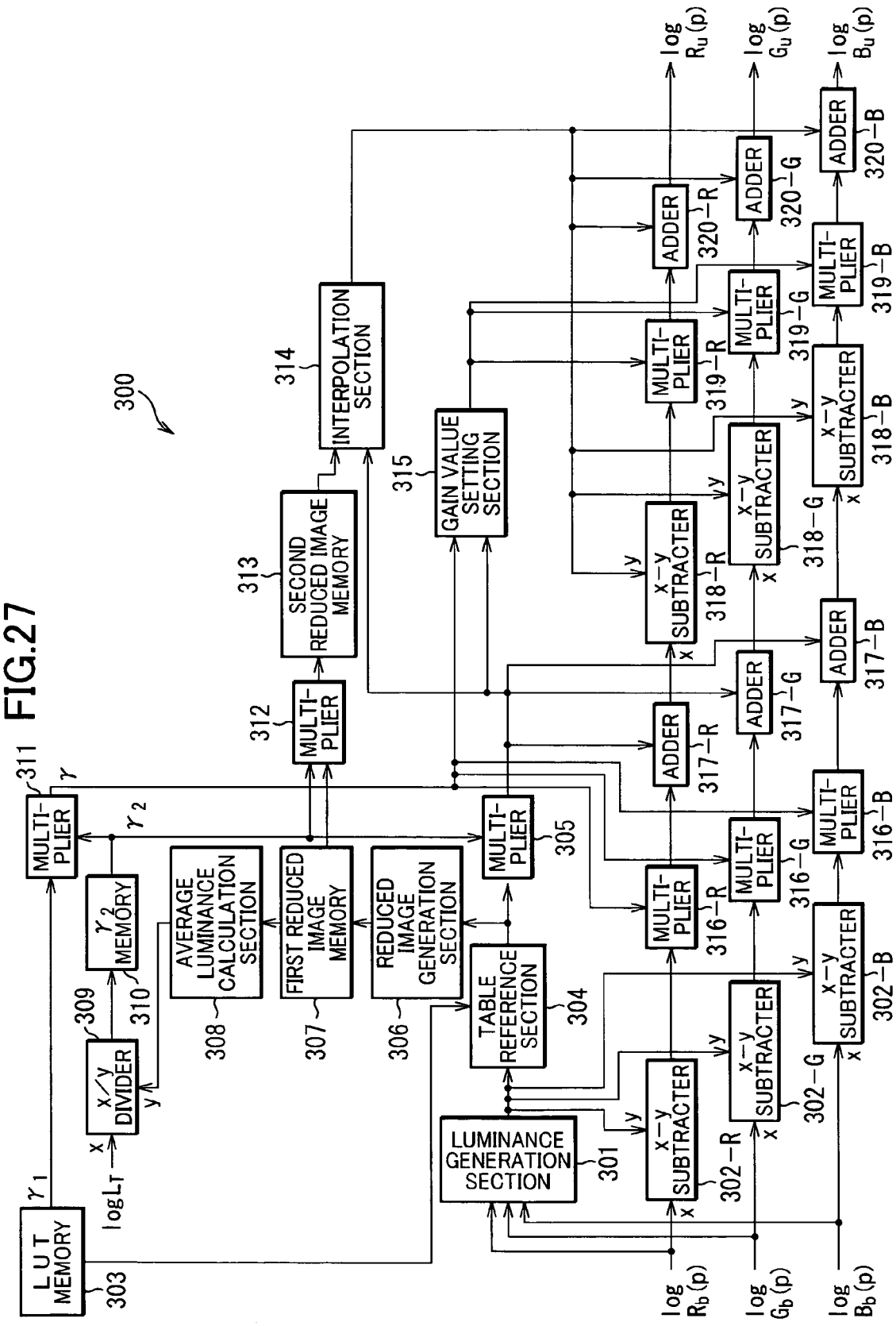
FIG. 27 is a block diagram showing an exemplary configuration of a composite section substitutable to a portion ranging from the tone curve correction section to the contrast correction section shown in FIG. 21.

FIG. 27 in the next shows an exemplary configuration of a composite section 300 which can be a substitute for the tone curve correction section 204, reduced image generation section 205, reduced image memory 206 and contrast correction section 207 shown in FIG. 21.

The luminance generation section 301 of the composite section 300 calculates a linear sum of the input logarithmic color signal [$logR_b(p)$, $logG_b(p)$, $logB_b(p)$] to thereby generate the logarithmic luminance $logL_b(p)$, and outputs it to subtracter 302-R to 302-B, and to a table reference section 304. The subtracter 302-R subtracts the logarithmic luminance $logL_b(p)$ from the logarithmic color signal $logR_b(p)$, and outputs the result to a multiplier 316-R.

A LUT memory 303 of the composite section 300 has a LUT corresponded to the tone curve as shown in FIG. 4 and the representative value $\gamma_1$ which expresses a slope of the tone curve preliminarily held therein. A table reference section 304 corrects the logarithmic luminance logL(p) received from the luminance generation section 301 based on the LUT held by the LUT memory 303 to thereby give the logarithmic luminance $logL_{c'}(p)$, and outputs it to a multiplier 305 and a reduced image generation section 306.

The multiplier 305 multiplies the logarithmic luminance $logL_{c'}(p)$ of the current frame received from the table reference section 304 by the previous frame's representative value $\gamma_2$ held by a $\gamma_2$ memory 167, to thereby calculate the logarithmic luminance $logL_c(p)$ after the tone curve correction, and outputs it to adders 317-R to 317-B.

The reduced image generation section 306 divides the logarithmic luminance image $logL_{c'}$ into m×n blocks, calculates average values of the logarithmic luminance $logL_{c'}(p)$ values of the pixels which belong to the individual blocks to thereby generate an m×n-pixel first reduced image, and makes a first reduced image memory 307 to store it.

An average luminance calculation section 308 calculates an average value $\mu$ of pixel values of the previous frame's first reduced image held by the first reduced image memory 307, and outputs it to a divider 309. The divider 309 divides a predetermined constant $logL_T$ by the average value $\mu$ to thereby calculate the representative value $\gamma_2$, and makes a $\gamma_2$ memory 310 to store it. A multiplier 311 calculates a product of the representative values $\gamma_1$ and $\gamma_2$ as the representative value $\gamma(=\gamma_1 \cdot \gamma_2)$, and outputs it to a gain value setting section 315 and the multipliers 316-R to 316-B.

The multiplier 312 multiplies the individual pixels of the first reduced image held by the first reduced image memory 164 by the representative value $\gamma_2$ held by the $\gamma_2$ memory 310 to thereby generate the second reduced image $logL_{cl}$, and makes the second reduced image memory 313 to store it.

An interpolation section 314 calculates, by interpolation, the pixel $logL_{cl}(p)$ corresponded to the position of interpolation p (also referred to as position of interpolation p, hereinafter) of the logarithmic luminance $logL_c(p)$ of the current frame received from the multiplier 170, using the previous frame's second reduced image $logL_{cl}$ held by the reduced image memory 169, and outputs it to subtracters 318-R to 318-B, and to adders 320-R to 320-B.

The gain value setting section 315 calculates the gain value g(p), which determines the amount of contrast enhancement of the logarithmic luminance $logL_c(p)$ of the current frame, based on the representative value γ with respect to the preceding frame received from the multiplier 311 and the logarithmic luminance $logL_c(p)$ of the current frame received from the multiplier 305, and outputs it to multipliers 319-R to 319-B.

The multiplier 316-R calculates a product of an output of the subtracter 302-R and the representative value γ, and outputs it to the adder 317-R. The adder 317-R calculates a sum of the output of the multiplier 316-R and the output of the multiplier 305, and outputs it to the subtracter 318-R. The subtracter 318-R subtracts the interpolation value $logL_{cl}(p)$ from the output of the adder 317-R, and outputs the result to the multiplier 319-R. The multiplier 319-R multiplies the output of the subtracter 318-R by the gain value g(p), and outputs the result to the adder 320-R. The adder 320-R calculates a sum of the output of the multiplier 319-R and the interpolation value $logL_{cl}(p)$, and outputs the obtained contrast-corrected logarithmic color signal $logR_u(p)$ to the succeeding stage.

It is to be noted now that any constituents for processing the G and B components are similar to those for processing the above-described R component, so that explanations therefor will be omitted.

Use of the composite section 300 allows the average luminance calculation section 308 to calculate an average value of the m×n-pixel first reduced image, and this is successful in reducing the volume of calculation as compared with the average luminance calculation section 245 shown in FIG. 24 by which the average value is calculated for the pixels of the logarithmic luminance image $logL_c$ of the original size. It is therefore possible to reduce the delay time ascribable to the calculation.

Figure 28:
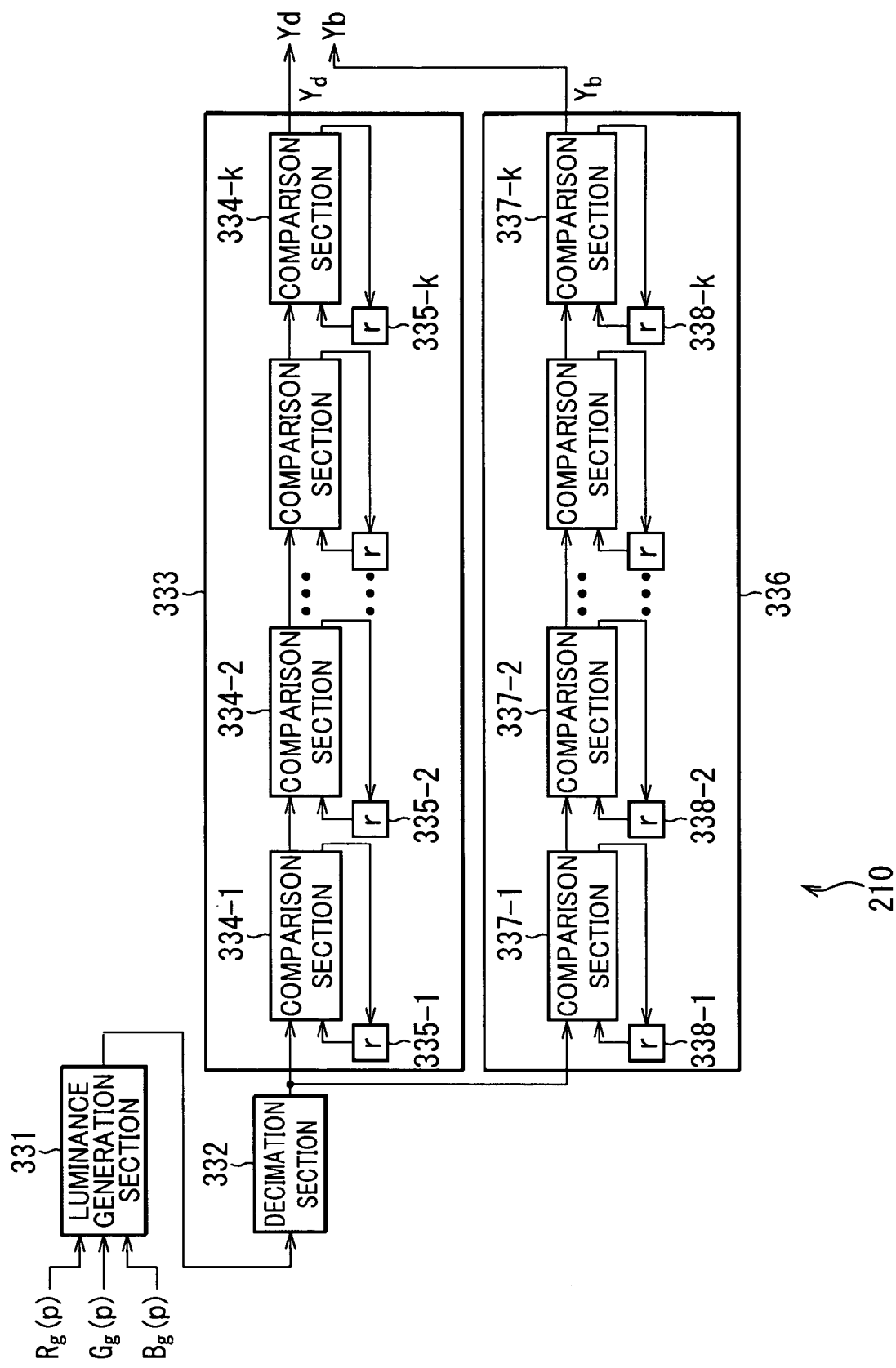
FIG. 28 is a block diagram showing an exemplary configuration of a luminance range information calculation section shown in FIG. 21.

FIG. 28 in the next shows an exemplary configuration of the luminance range information calculation section 210. In the luminance range information calculation section 210, a luminance generation section 331 calculates a linear sum of the gamma-corrected color signal $[R_g(p), G_g(p), B_g(p)]$ to thereby generate the luminance Y(p), and outputs it to a decimation section 332. The decimation section 332 chooses the luminance Y(p) received from the luminance generation section 331 based on the pixel position p. That is, only luminance values of the pixels at preliminarily-set pixel positions are supplied to a MIN sorting section 333 and a MAX sorting section 336 in the succeeding stage.

The MIN sorting section 333 is configured so that k pairs of a combination of a comparison section 334 and a register 335 are arranged in series, and so that the input luminance Y(p) values are held by registers 335-1 to 335-*k* in an increasing order.

For example, the comparison section 334-1 compares the luminance Y(p) from the decimation section 332 and a value in the register 335-1, and updates, when the luminance Y(p) from the decimation section 332 is smaller than the value in the register 335-1, the value in the register 335-1 using the luminance Y(p) from the decimation section 332. On the contrary, when the luminance Y(p) from the decimation section 332 is not smaller than the value in the register 335-1, the luminance Y(p) from the decimation section 332 is supplied to the comparison section 334-2 in the succeeding stage.

The same will apply also to the comparison sections 334-2 and thereafter, wherein after completion of input of the luminance Y(p) for one frame, the register 335-1 will have the maximum value $Y_{min}$ of the luminance Y(p) held therein, and the registers 335-2 to 335-*k* will have the luminance Y(p) values held therein in an increasing order, and the luminance Y(p) held in the register 335-*k* is output as the luminance $Y_d$ of the luminance range information to the succeeding stage.

The MAX sorting section 336 is configured so that k pairs of a combination of a comparison section 337 and a register 338 are arranged in series, and so that the input luminance Y(p) values are held by registers 338-1 to 338-*k* in a decreasing order.

For example, the comparison section 337-1 compares the luminance Y(p) from the decimation section 332 and a value in the register 338-1, and updates, when the luminance Y(p) from the decimation section 332 is larger than the value in the register 338-1, the value in the register 338-1 using the luminance Y(p) from the decimation section 332. On the contrary, when the luminance Y(p) from the decimation section 332 is not larger than the value in the register 338-1, the luminance Y(p) from the decimation section 332 is supplied to the comparison section 337-2 in the succeeding stage.

The same will apply also to the comparison sections 337-2 and thereafter, wherein after completion of input of the luminance Y(p) for one frame, the register 338-1 will have the maximum value $Y_{max}$ of the luminance Y(p) held therein, and the registers 338-2 to 338-*k* will have the luminance Y(p) values held therein in a decreasing order, and the luminance Y(p) held in the register 338-*k* is output as the luminance $Y_b$ of the luminance range information to the succeeding stage.

Because the luminance Y(p) values input to the MIN sorting section 333 and MAX sorting section 336 are decimated by the decimation section 332, appropriate adjustment of intervals of the decimating and the number of steps k of the MIN sorting section 333 and MAX sorting section 336 makes it possible to obtain luminance $Y_d$, $Y_b$ values which correspond with 1% or 0.1%, for example, of the upper and lower ends of the whole pixels in one frame.

Figure 29:
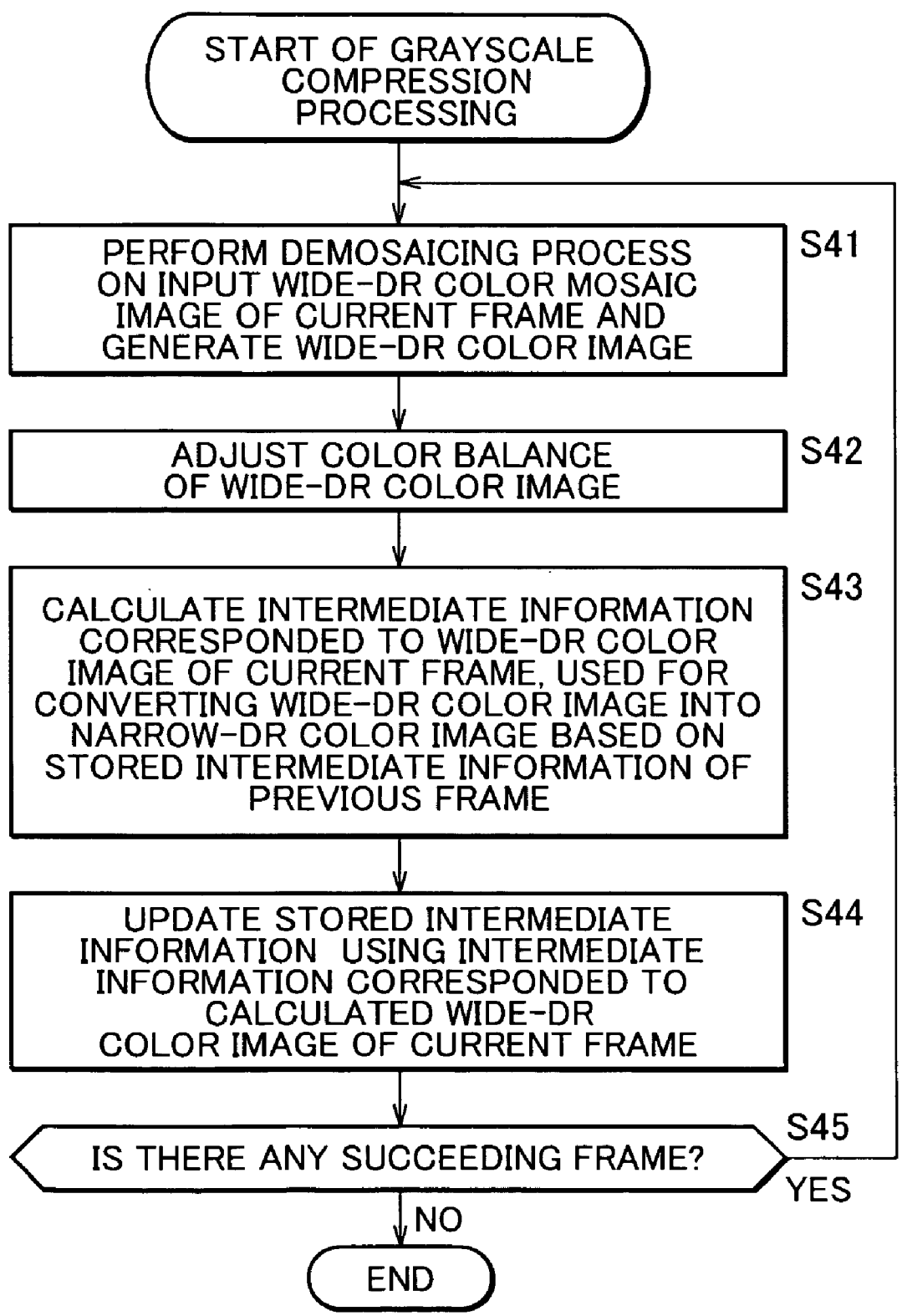
FIG. 29 is a flow chart for explaining grayscale compression processing by the second exemplary configuration of the DSP.

Next, a general grayscale compression processing using the second exemplary configuration of the DSP 7 applied with the composite section 300 shown in FIG. 27 will be described referring to the flow chart of FIG. 29.

In step S41, the DSP 7 (demosaicing section 201) demosaics a wide-DR color mosaic image to thereby generate a wide-DR color image, and outputs the pixel value thereof, that is, a color signal [R(p), G(p), B(p)] to the color balance adjustment section 202 in the order of raster. In step S42, the DSP 7 (color balance adjustment section 202) respectively adjust the R, G and B components so that a color balance of the entire image will become appropriate, to thereby generate the color signal $[R_b(P), G_b(P), B_b(P)]$.

In step S43, the DSP 7 converts the color signal of the input wide-DR color image L of the current frame into the narrow-DR color image $Y_n$, based on the intermediate information (second reduced image $logL_c(p)$, representative value γ, and luminance range information $[Y_d, Y_b]$) already calculated and held with respect to the previous frame's, wide-DR color image. The DSP 7 also calculates the intermediate information with respect to the wide-DR color image L of the current frame.

In step S44, the DSP 7 updates the intermediate information with respect to the stored previous frame's wide-DR color image, using the intermediate information with respect to the calculated wide-DR color image L of the current frame.

In step S45, the DSP 7 discriminates whether any succeeding frame after the input wide-DR color image of the current frame is present or not, and upon judgment of the presence, the process returns to step S41 and processes thereafter are repeated. On the contrary, upon judgment of the absence of any succeeding frame, the grayscale compression processing comes to the end.

Figure 30:
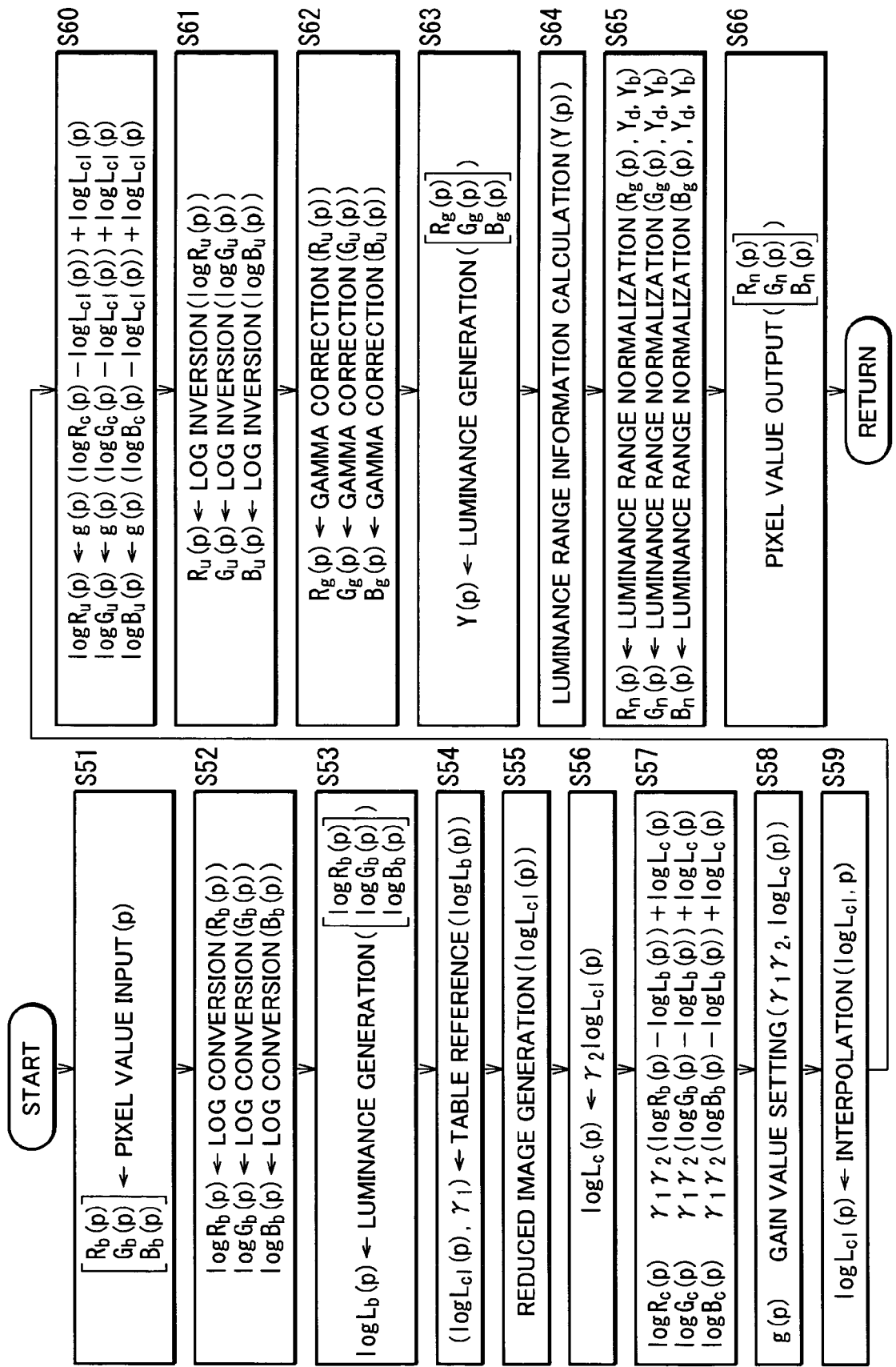
FIG. 30 is a flow chart for explaining details of the processing in step S43 shown in FIG. 29.

Details of the processing on the pixel basis in step S42 will be explained referring to the flow chart in FIG. 30. Processing of the individual steps described below are executed with respect to a target pixel (pixel position p) input according to order of raster.

In step S51, the color balance adjustment section 202 outputs the generated color signal [$R_b(P)$, $G_b(P)$, $B_b(P)$] to the logarithmic conversion section 203. In step S52, the logarithmic conversion section 203 subjects the color signal [$R_b(P)$, $G_b(P)$, $B_b(P)$] to the logarithmic conversion, and outputs the obtained logarithmic color signal [$\log R_b(p)$, $\log G_b(p)$, $\log B_b(p)$] to the composite section 300.

In step S53, the luminance generation section 301 of the composite section 300 calculates a linear sum of the input logarithmic color signal [$\log R_b(p)$, $\log G_b(p)$, $\log B_b(p)$] to thereby generate the logarithmic luminance $\log L_b(p)$, and outputs it to the subtracters 302-R to 302-B, and to the table reference section 304. In step S54, table reference section 304 corrects the input logarithmic luminance $\log L(p)$ into the logarithmic luminance $\log L_{c'}(p)$ based on the LUT held by the LUT memory 303, and outputs it to the multiplier 305 and reduced image generation section 306.

In step S55, the reduced image generation section 306 generates the first reduced image based on the logarithmic luminance $\log Lc'$ (p) for one frame after the tone curve correction. Herein the representative value $\gamma_2$ is calculated based on the generated first reduced image. The second reduced image $\log L_{cl}$ is also generated herein by multiplying the generated first reduced image by thus calculated representative value $\gamma_2$.

In step S56, the multiplier 305 multiplies the logarithmic luminance $\log L_{c'}(p)$ of the present image received from the table reference section 304 by the previous frame's representative value $\gamma_2$ held in the $\gamma_2$ memory 310, to thereby calculate the logarithmic luminance $\log L_c(p)$ after the tone curve correction.

In step S57, calculations are carried out for the R component by the subtracter 302-R, multiplier 316-R and adder 317-R, to generate the logarithmic color signal $\log R_c(p)$ after the tone curve correction. For G component, calculations are carried out by the subtracter 302-G, multiplier 316-G and adder 317-G, to generate the logarithmic color signal $\log G_c$ (p) after the tone curve correction. For B component, calculations are carried out by the subtracter 302-B, multiplier 316-B and adder 317-B, to generate the logarithmic color signal $\log B_c(p)$ after the tone curve correction.

In step S58, the gain value setting section 315 calculates the gain value g(p), which determines the amount of contrast enhancement of the logarithmic luminance $\log L_c(p)$ of the current frame, based on the representative value $\gamma$ with respect to the preceding frame received from the multiplier 311 and the logarithmic luminance $\log L_c(p)$ of the current frame received from the multiplier 305. In step S59, the interpolation section 314 calculates, by interpolation, the pixel $\log L_{cl}$ (p) corresponded to the position of interpolation p, using the previous frame's second reduced image $\log L_{cl}$ held by the second reduced image memory 313.

In step S60, calculations are carried out for the R component by the subtracter 318-R, multiplier 319-R and adder 320-R, to generate the logarithmic color signal $\log R_u(p)$ after the tone curve correction. For G component, calculations are carried out by the subtracter 318-G, multiplier 319-G and adder 320-G, to generate the logarithmic color signal $\log G_u$ (p) after the tone curve correction. For B component, calculations are carried out by the subtracter 318-B, multiplier 319-B and adder 320-B, to generate the logarithmic color signal $\log B_u(p)$ after the tone curve correction.

In step S61, the logarithmic inversion section 208 subjects the logarithmic color signal [$\log R_u(p)$, $\log G_u(p)$, $\log B_u(p)$] after the contrast correction to the logarithmic inversion to thereby generate the color signal [$R_u(p)$, $G_u(p)$, $B_u(p)$] expressed by the normal axis, and outputs it to the gamma correction section 209. In step S62, the gamma correction section 209 carries out a predetermined gamma correction, and outputs the obtained gamma-corrected color signal [$R_g$(p), $G_g(p)$, $B_g(p)$] to the luminance information calculation section 210 and luminance range normalization section 212.

In step S63, the luminance generation section 331 of the luminance range information calculation section 210 generates the luminance Y(p) based on the gamma-corrected color signal [$R_g(p)$, $G_g(p)$, $B_g(p)$]. In step S64, the MIN sorting section 333 and MAX sorting section 336 of the luminance range information calculation section 210 calculate the luminance range information [$Y_d$, $Y_b$] based on the luminance Y(p) for one frame.

In step S65, the luminance range normalization section 212 normalizes the color signal [$R_g(p)$, $G_g(p)$, $B_g(p)$] received from the gamma correction section 209 based on the previous frame's luminance range information [$Y_d$, $Y_b$] held by the luminance range information memory 211, to thereby calculate the color signal [$R_n(p)$, $G_n(p)$, $B_n(p)$]. In step S66, luminance range normalization section 212 outputs thus calculated color signal [$R_n(p)$, $G_n(p)$, $B_n(p)$] as a pixel value of the grayscale-compressed, narrow-DR color image. Here is the end of the detailed explanation of the processing of step S43 in FIG. 29.

Figure 31:
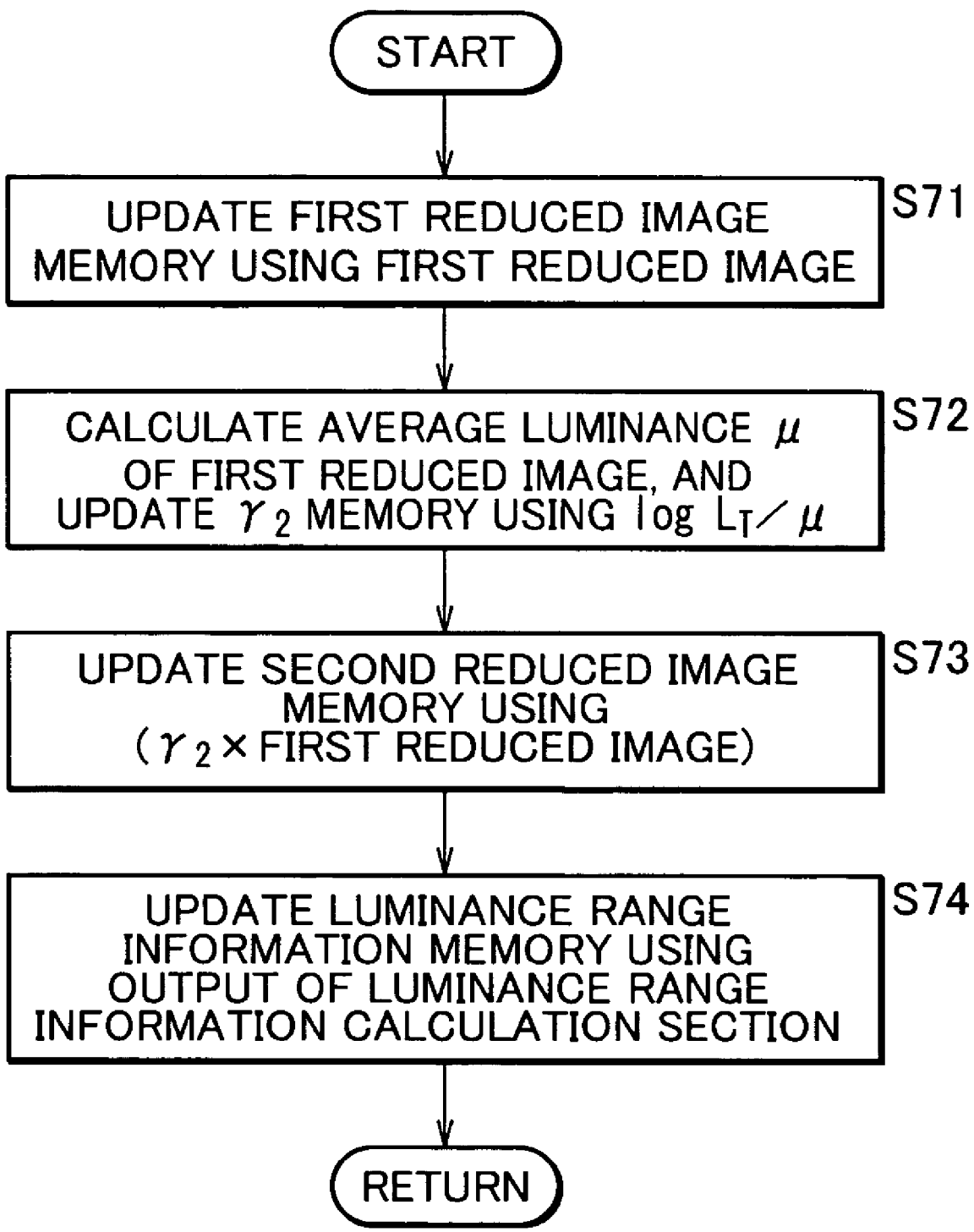
FIG. 31 is a flow chart for explaining details of the processing in step S44 shown in FIG. 29.

Next, details of the processing in step S44 in FIG. 29 will be explained referring to the flow chart in FIG. 31. In step S71, the reduced image generation section 306 updates the first reduced image held by the first reduced image memory 307, using the first reduced image generated based on the logarithmic luminance $\log L_{c'}(p)$ for one frame after the tone curve correction.

In step S72, the divider 309 divides a predetermined constant $\log L_T$ by the average value μ received from the average luminance calculation section 165 to thereby calculate the representative value $\gamma_2$, and updates the representative value $\gamma_2$ held by the $\gamma_2$ memory 310 using thus calculated representative value $\gamma_2$.

In step S73, the multiplier 312 multiplies the individual pixels of the first reduced image held by the first reduced image memory 307 updated by the processing of step S71 by the representative value $\gamma_2$ held by the $\gamma_2$ memory 310 updated by the processing of step S72, to thereby generate the second reduced image $\log L_{cl}$, and updates the second reduced image $\log L_{cl}$ held by the first reduced image memory 313.

In step S74, the luminance range information calculation section 210 updates the previous frame's luminance range information [$Y_d$, $Y_b$] held by the luminance range information memory 211, using the luminance range information [$Y_d$, $Y_b$] generated based on the [$R_g(p)$, $G_g(p)$, $B_g(p)$] for one frame. Here is the end of the detailed explanation of the processing of step S44 in FIG. 29.

Here is the end of the detailed explanation of the second exemplary configuration of the DSP 7.

It is to be noted, for example, that each of the average luminance calculation section 51 shown in FIG. 5, average luminance calculation section 63 shown in FIG. 6, average luminance calculation section 165 shown in FIG. 17, average luminance calculation section 232 shown in FIG. 23 and average luminance calculation section 245 shown in FIG. 24 was configured so that an average value of the luminance value was calculated, wherein the calculation for finding the average value may adopt weighted average. For example, a larger weight given to the central portion of an image rather than to the peripheral portion enables brightness correction while placing a stress on reflectance of a subject which resides in the central portion of the image.

The composite section 160 shown in FIG. 17 and the composite section 300 shown in FIG. 27 have the memory for holding the generated first reduced image and the memory for holding the second reduced image generated by multiplying thus generated first reduced image by the representative value $\gamma_2$, wherein these two memories may be combined into one because the first reduced image is no more necessary to be held once the second reduced image is generated.

If the present invention is applied to a digital video camera which takes a picture of a wide-DR image, compresses the grayscale and outputs it as an image displayable on a display having a narrow dynamic-range as in the present embodiment, it is made possible to realize the grayscale compression processing by a configuration having only a largely reduced capacity of memory (used for frame memory or delay line of the pixel series data), which has otherwise been indispensable for the conventional grayscale compression technique, and it is also made possible to obtain an output image which is by no means inferior to that obtained by the grayscale compression processing conventionally been realized using a large-scale filtering.

This makes it possible to realize a high-quality and inexpensive digital video camera which has never been realized.

The wide-DR image in the present embodiment was subjected to the grayscale compression processing assuming the display 11 as a reproduction apparatus, wherein it is also possible, for example, to carry out the grayscale compression processing so as to be adapted to dynamic ranges expressible by a monitor or a printed externally connected to the digital video camera 1.

Figure 32:
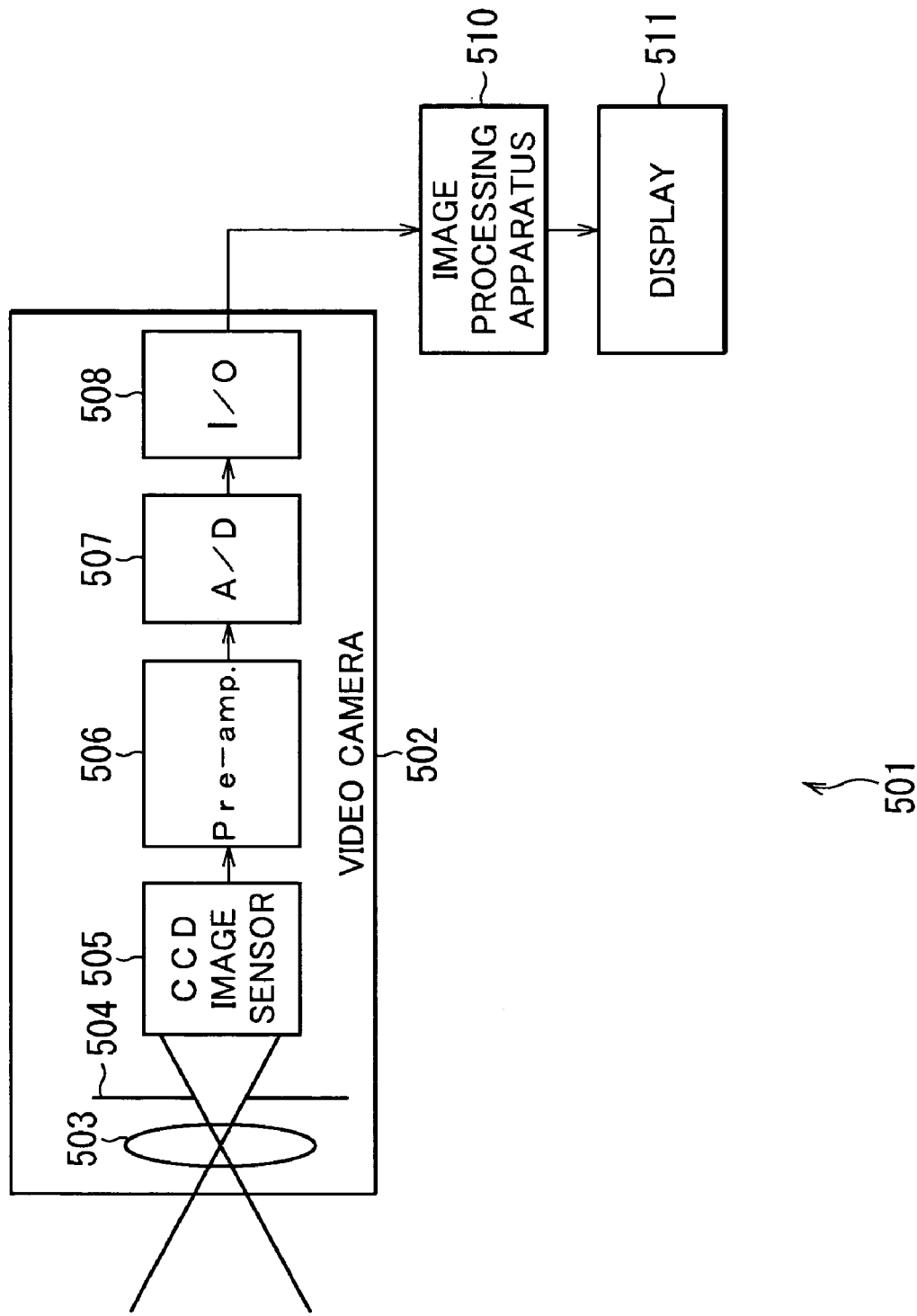
FIG. 32 is a block diagram showing an exemplary configuration of an image processing system applied with the present invention.

FIG. 32 in the next shows an exemplary configuration of an image processing system applied with the present invention. The image processing system 501 is constructed from a video camera 502 for taking a picture of a subject and producing a wide-DR image L constructed from pixels having pixel values (luminance) having a dynamic range wider than ordinary ones, an image processing apparatus 510 for compressing the grayscale of the wide-DR image L generated by the video camera 502 into a grayscale range displayable by a display 511, and the display 11 for displaying a grayscale-compressed image $L_u$ generated by the image processing apparatus 510.

The video camera 502 is constructed from a lens 503 for condensing a photo-image of a subject, a stop for adjusting an amount of light energy of the photo-image, a CCD image sensor for generating luminance signals by photo-electric conversion of the condensed photo-image, a pre-amplifier (Pre-amp.) 506 for removing noise component from the generated luminance signals, an AD converter (A/D) 507 for converting the luminance signals, removed with the noise component, typically into digital data having a bit width of 14 to 16 bits or around, and an I/O interface (I/O) 508 for outputting the wide-DR image, constructed from pixels having digitized luminance, to the image processing apparatus 510.

FIG. 32 shows overall operations of the image processing system 1. In step S101, the video camera 502 takes a picture of the subject, generates a correspondent wide-DR image L, and outputs it to the image processing apparatus 510. In step S102, the image processing apparatus 510 subjects the wide-DR image L to the grayscale compression processing to thereby generate the grayscale-compressed image $L_u$, and outputs it to the display 511. In step S103, the display 511 displays the grayscale-compressed image $L_u$.

Figure 34:
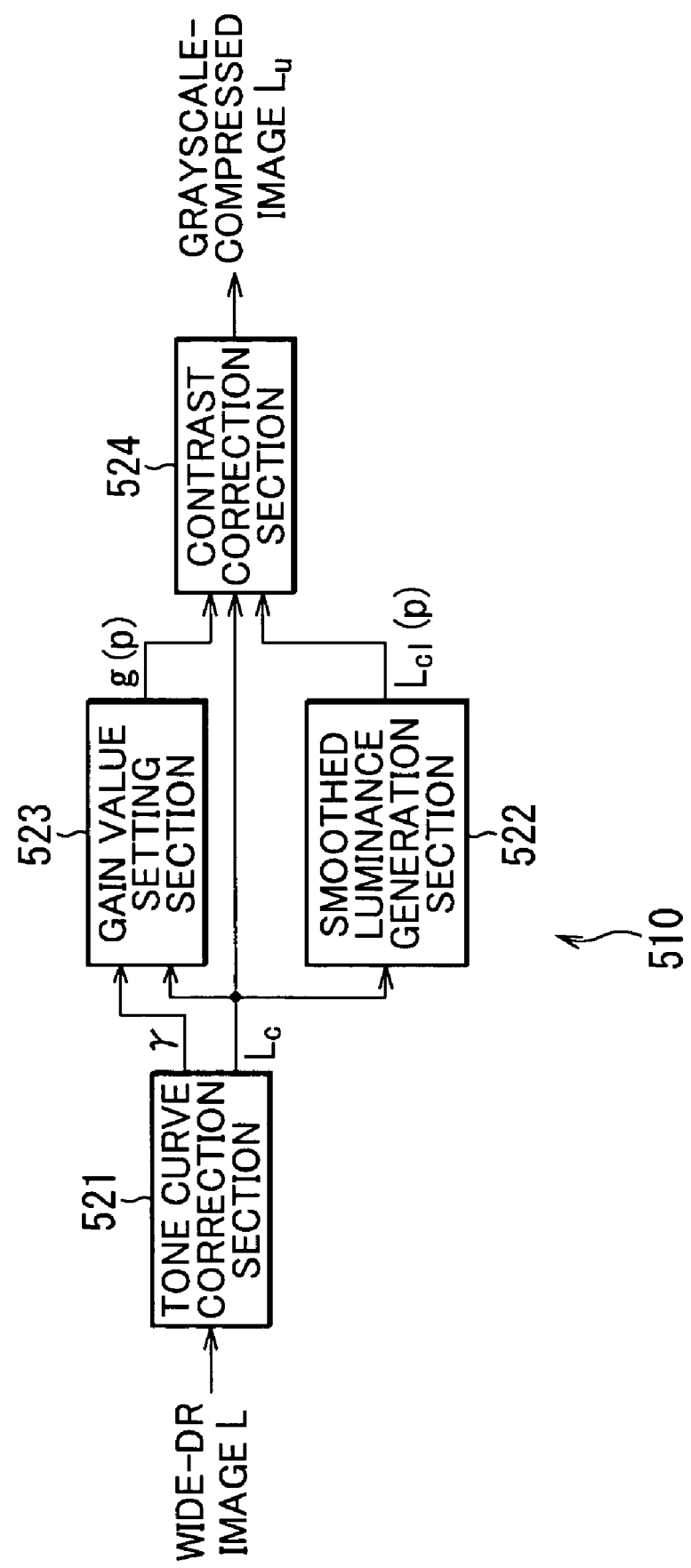
FIG. 34 is a block diagram showing a first exemplary configuration of the image processing apparatus shown in FIG. 32.

FIG. 34 in the next shows a first exemplary configuration of the image processing apparatus 510. A tone curve correction section 521 of the image processing apparatus 510 corrects the wide-DR image L received form the video camera 502 in the direction of compressing the grayscale based on a preliminarily-obtained tone curve, and outputs the resultant tone-curve-corrected image $L_c$ to a smoothed luminance generation section 522, a gain value setting section 523, and a contrast correction section 524. It is to be noted that the tone-curve-corrected image $L_c$ has a compressed grayscale, and a weakened contrast ascribable to the compressed grayscale. The tone curve correction section 521 also outputs the representative value $\gamma$, which expresses a slope of the tone curve used for the correction, to the gain value setting section 523.

Figure 35:
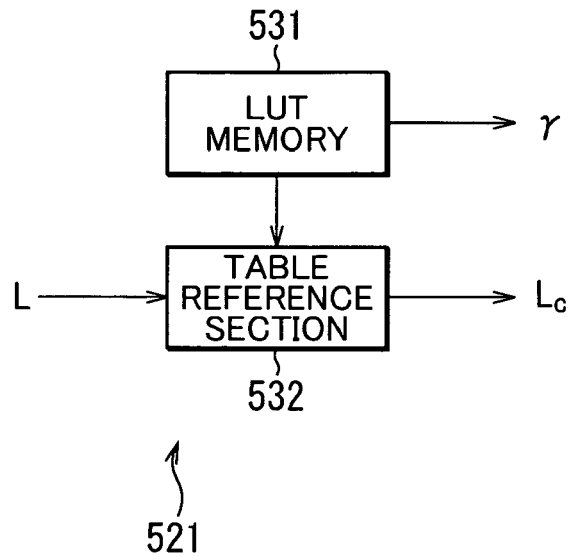
FIG. 35 is a block diagram showing an exemplary configuration of a tone curve correction section shown in FIG. 34.
Figure 36:
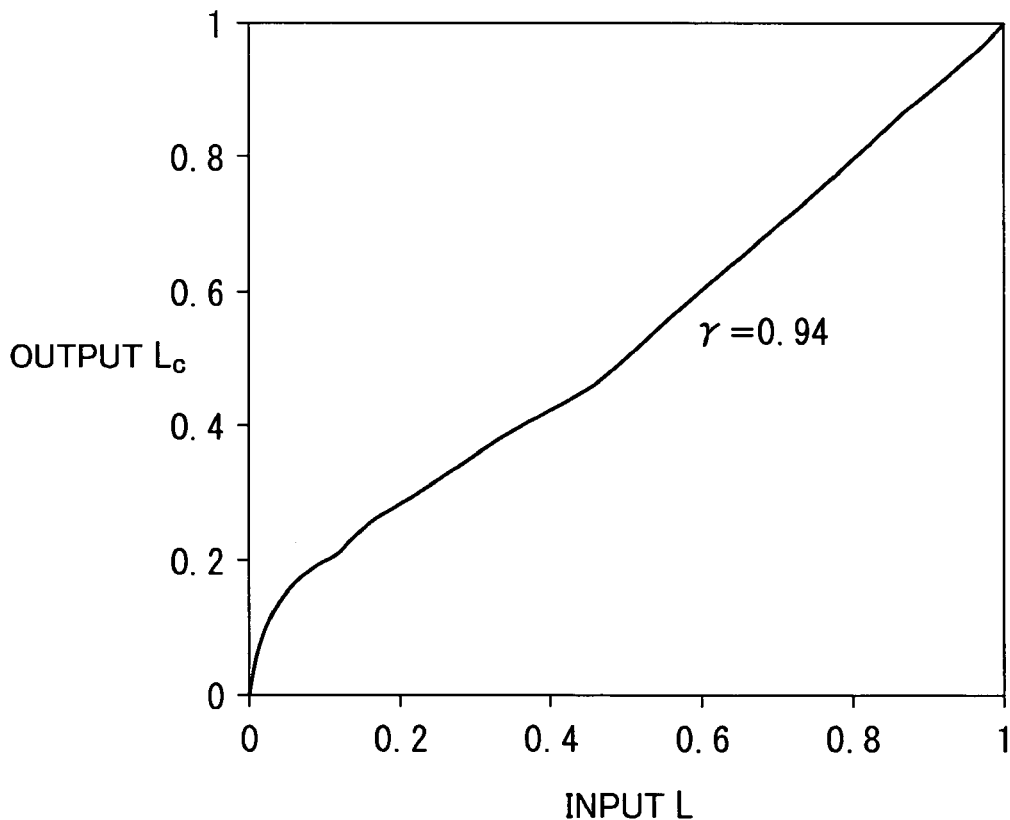
FIG. 36 is a drawing showing an exemplary tone curve used in the first exemplary configuration of the image processing apparatus.

FIG. 35 shows an exemplary configuration of the tone curve correction section 521. A LUT memory 531 of the tone curve correction section 521 preliminarily holds a lookup table (referred to as LUT, hereinafter) which corresponds with a monotonously-increasing tone curve as shown in FIG. 36, and a representative value $\gamma$ which expresses a slope of the tone curve. It is also allowable that a function corresponded to the tone curve is held in place of the LUT. A table reference section 532 corrects the wide-DR image L based on the LUT held by the LUT memory 531 to thereby obtain the tone-curve-corrected image $L_c$.

FIG. 36 shows an example of the tone curve, wherein the abscissa plots luminance of the wide-DR image L, and the ordinate plots luminance of the tone-curve-corrected image $L_c$ after the correction, respectively on the logarithmic axes normalized over a range of [0, 1]. The tone curve shown in FIG. 36 does not correct the luminance value of the normalized wide-DR image when the value exceeds 0.5, but corrects the luminance value of the normalized wide-DR image value when the value is smaller than 0.5 so that a smaller value is corrected by a larger amount of correction. That is, the correction is carried out so as to avoid maximum shadowing of the dark area in the image when appeared on the display 511. The representative value $\gamma$ which expresses a slope of the tone curve can be defined by an average value of slopes respectively found over the entire regions of the luminance. For example, the representative value of the tone curve shown in FIG. 36 is $\gamma$=0.94.

Figure 37:
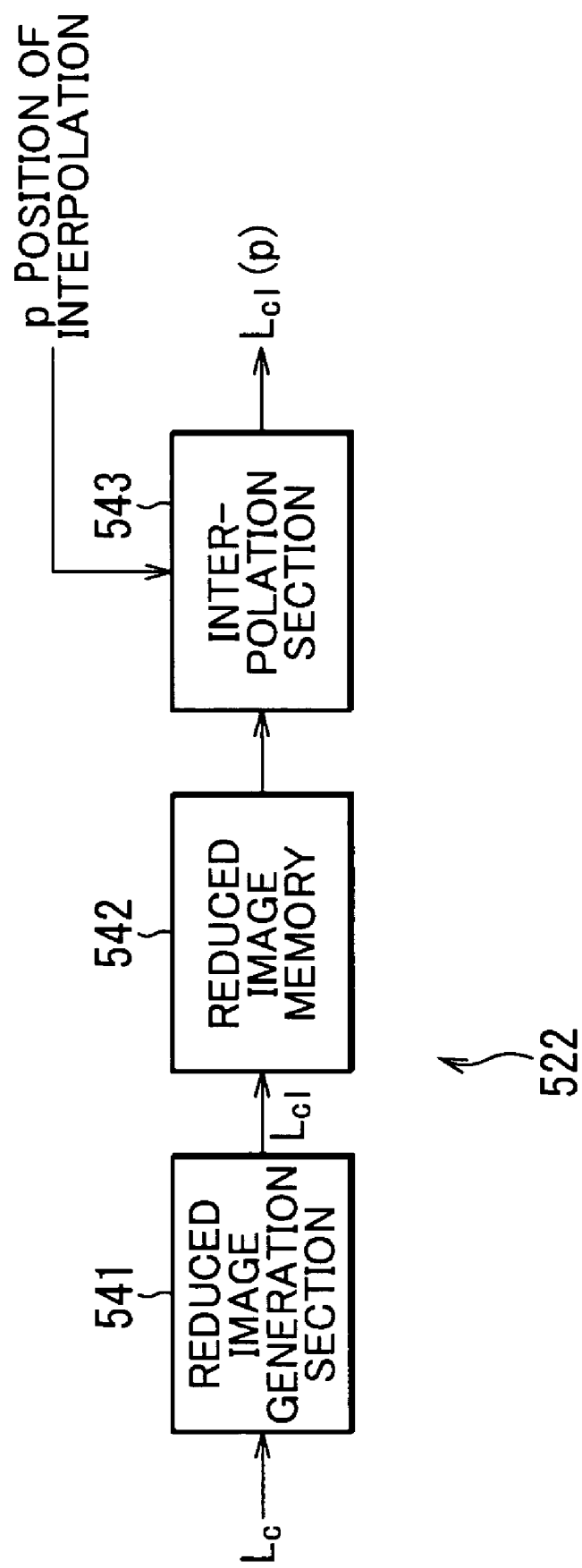
FIG. 37 is a block diagram showing an exemplary configuration of a smoothed luminance generation section shown in FIG. 34.

Referring now back to FIG. 34, the smoothed luminance generation section 522 smoothes the luminance of the tone-curve-corrected image $L_c$, and outputs the luminance $L_{cl}(p)$ of the obtained smoothed image to the contrast correction section 24. FIG. 37 shows an exemplary configuration of the smoothed luminance generation section 22.

A reduced image generation section 541 of the smoothed luminance generation section 522 classifies pixels of the tone-curve-corrected image $L_c$ received from the tone curve correction section 521 into m×n blocks depending on positions of the pixels, and generates the reduced image $L_{cl}$ having an average value of the luminance of the pixels classified into the individual blocks as its own pixels. A reduced image memory 542 holds thus generated m×n-pixel reduced image $L_{cl}$. An interpolation section 543 calculates, by interpolation, the luminance of the pixel position sequentially specified using the pixels of the reduced image held by the reduced image memory 542, and outputs the obtained interpolation value $L_{cl}(p)$ as luminance of the pixels of the smoothed image to the contrast correction section 524. It is to be noted herein that p=(x,y) is a coordinate or vector expressing the pixel position. Size of the smoothed image output from the interpolation section 543 is equivalent to that of the tone-curve-corrected image $L_c$.

That is, in the smoothed luminance generation section 522, the tone-curve-corrected image $L_c$ is reduced to generate the reduced image $L_{cl}$, and by using the held reduced image $L_{cl}$, the luminance of the smoothed image is calculated by interpolation operation in a pixel-wise manner.

Although it was conventionally necessary to adopt a relatively large-scale filtering for an effective grayscale compression processing, the smoothed luminance generation section 522 needs only the reduced image memory 542 for holding the m×n-pixel reduced image.

Figure 38:
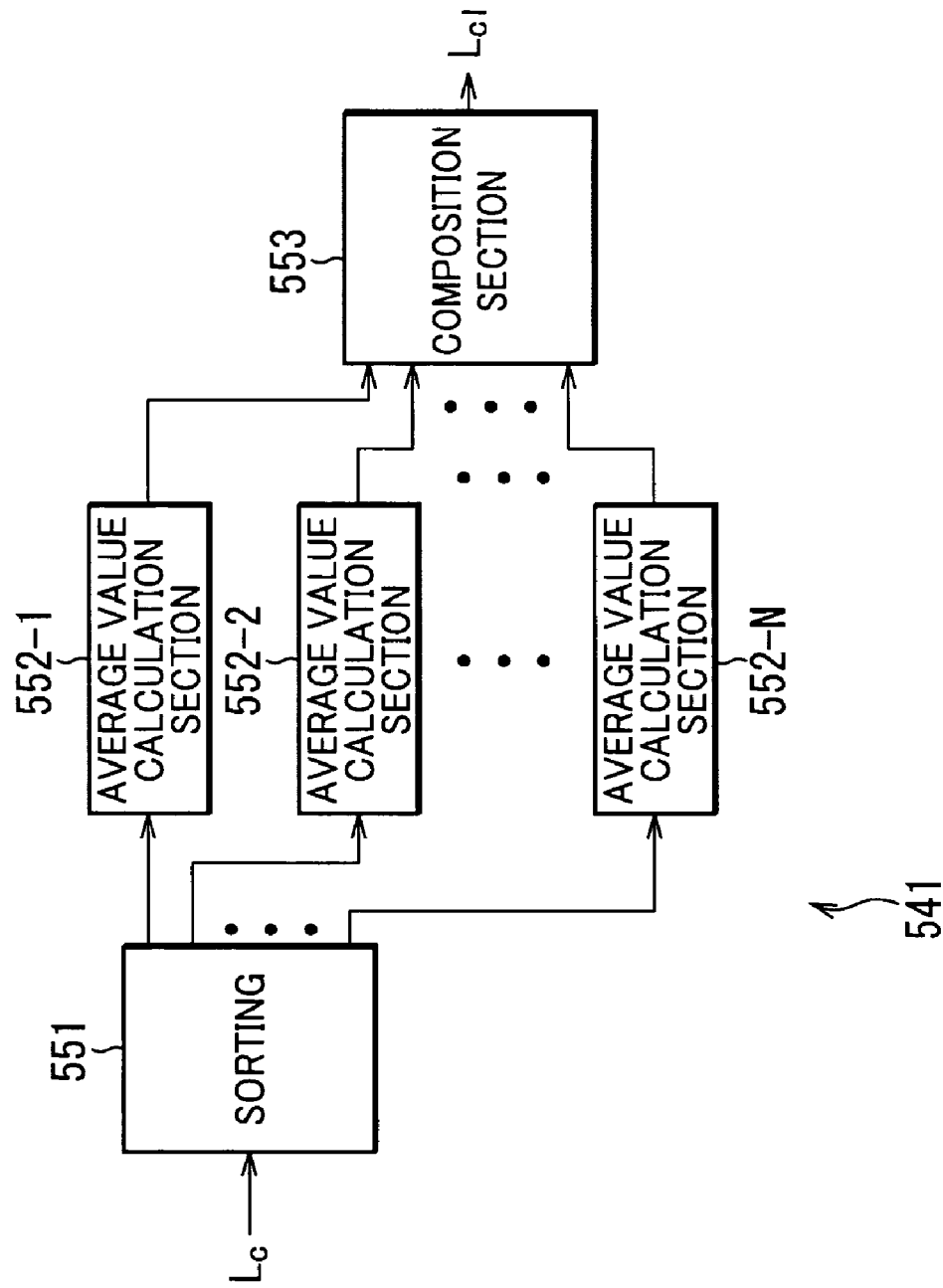
FIG. 38 is a block diagram showing an exemplary configuration of a reduced image generation section shown in FIG. 37.

FIG. 38 shows an exemplary configuration of the reduced image generation section 541 shown in FIG. 37. A sorting section 551 of the reduced image generation section 541 sorts the pixels of the tone-curve-corrected image $L_c$ received from the tone-curve correction section 521 into m×n blocks depending on the pixel position, and then supplies them to average value calculating sections 552-1 to 552-N (=m×n). For example, those classified into the first block are supplied to average value calculation section 552-1, and those classified into the second block are supplied to the average the value calculation section 552-2. The following description adopts a simple notation of average value calculation section 552 when there is no need of discrimination of the individual average value calculation sections 552-1 to 552-N.

The average value calculation section 552-$i$ ($i$=1,2, ... ,N) calculates an average value of the luminance of the pixels of the tone-curve-corrected image $L_c$ classified into the i-th block, and outputs it to a composition section 553. The composition section 553 generates an m×n-pixel reduced image $logL_{cl}$ having, as a pixel value, the average value of the luminance respectively received from the average value calculation means 552-$i$.

Figure 39:
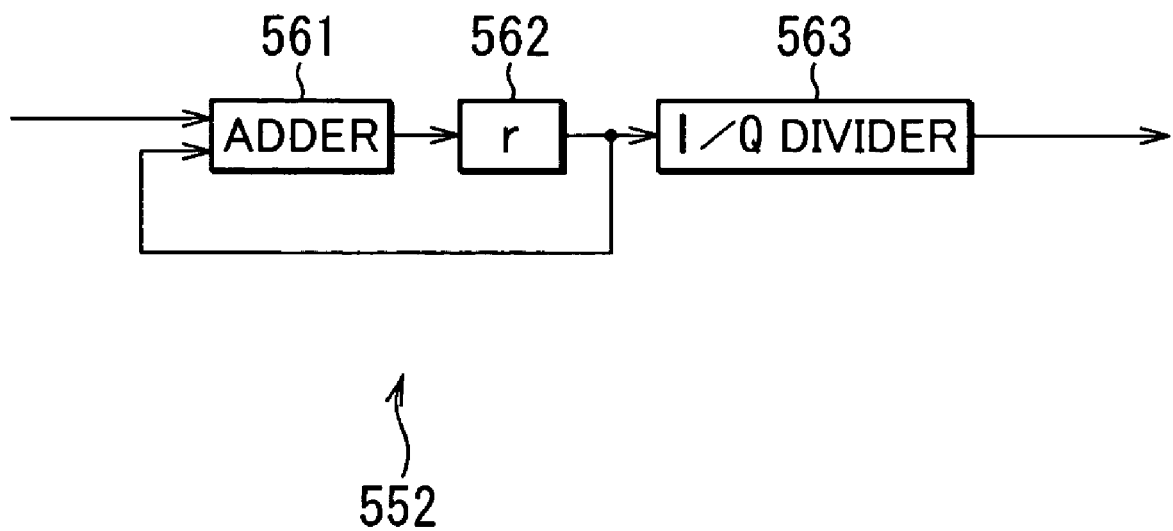
FIG. 39 is a block diagram showing an exemplary configuration of an average value calculation section shown in FIG. 38.

FIG. 39 shows an exemplary configuration of the average value calculation section 552 shown in FIG. 38. An adder 561 of the average value calculation section 552 adds the luminance of the tone-curve-corrected image $L_c$ received from the sorting section 551 in the preceding stage to a value held by a register (r) 562, to thereby update the value held by the register (r) 562. A divider 563 divides a value finally held by the register 562 by the number of pixels Q composing one block, to thereby calculate an average value of the luminance of Q pixels classified into one block.

Figure 40:
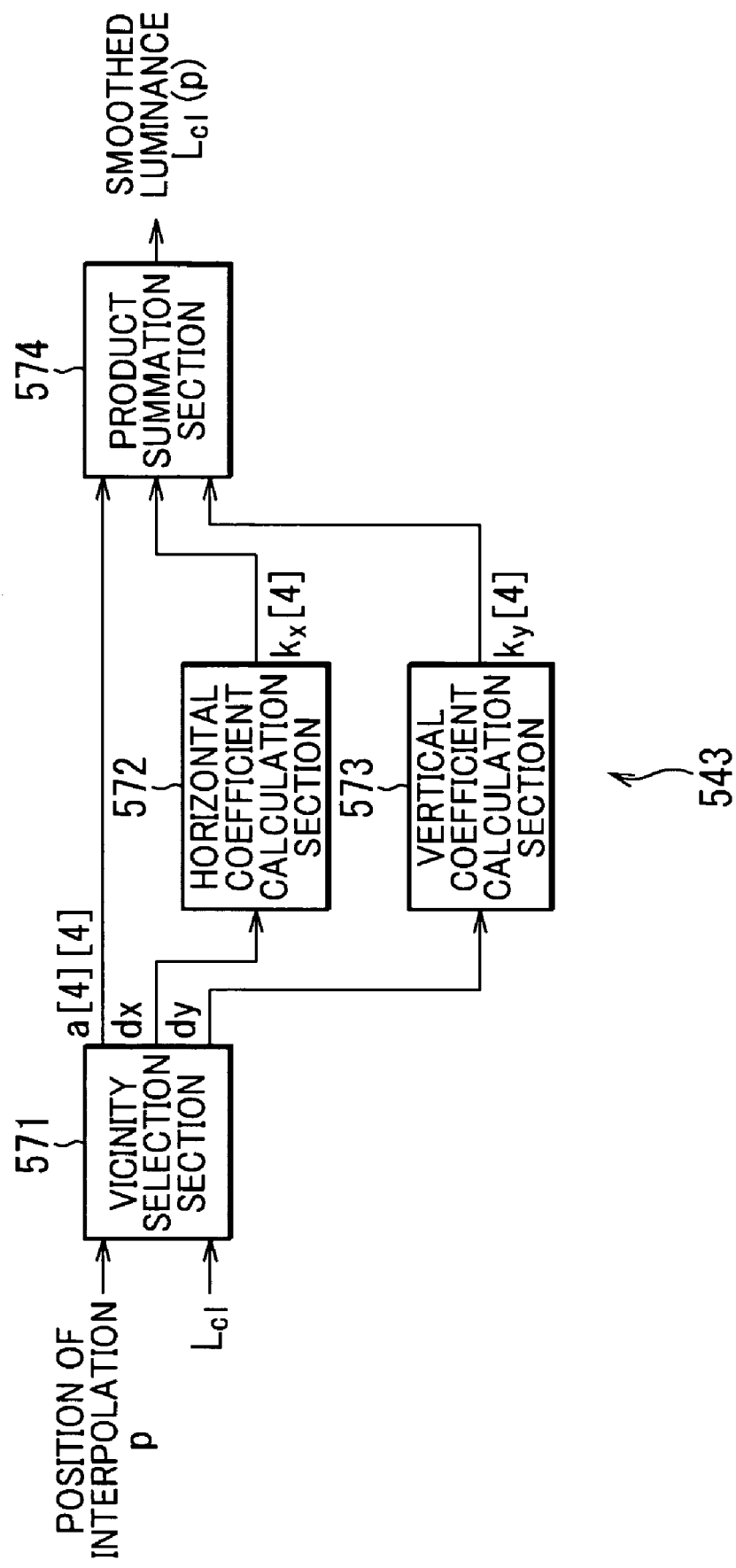
FIG. 40 is a block diagram showing an exemplary configuration of an interpolation section shown in FIG. 37.

FIG. 40 shows an exemplary configuration of the interpolation section 543 shown in FIG. 37. A vicinity selection section 571 of the interpolation section 543 acquires, upon reception of the position of interpolation p, 4×4-pixel luminance a[4][4] in the vicinity of the position of interpolation p, based on the m×n-pixel reduced image $logL_{cl}$ held by the reduced image memory 542, and outputs it to the products summation section 574.

A notation of a[i][j] herein means that pixel value a is an i×j two-dimensional arrangement data. The vicinity selection section 571 outputs horizontal displacement dx and vertical displacement dy between the acquired luminance a [4][4] and position of interpolation p to a horizontal coefficient calculation section 572 or a vertical coefficient calculation section 573, respectively.

It is to be noted that relations among the position of interpolation p, neighboring luminance a[4][4] and amounts of displacement dx, dy are similar to those described in the above referring to FIG. 11, so that the explanation therefor will be omitted.

The horizontal coefficient calculation section 572 calculates a tertiary interpolation coefficient $k_x[4]$ in the horizontal direction based on the horizontal displacement dx received from the vicinity selection section 71. Similarly, the vertical coefficient calculation section 573 calculates a tertiary interpolation coefficient $k_y[4]$ in the vertical direction based on the vertical displacement dy received from the vicinity selection section 571.

The tertiary interpolation coefficient kx[4] in the horizontal direction is typically calculated by using the equation (1) described in the above.

The tertiary interpolation coefficient $k_y[4]$ in the vertical direction is typically calculated by using the equation (2) described in the above.

It is to be noted that any arbitrary calculation formula other than the equations (1), (2) shown in the above may be used for the calculation of the tertiary interpolation coefficients $k_x[4]$ and $k_y[4]$ so far as a sufficiently smooth interpolation can be obtained.

The products summation section 574 calculates an interpolation value $L_{cl}(p)$ of the position of interpolation p of the reduced image $L_{cl}$ by sum-of-products calculation using the neighboring pixel value a[4][4], horizontal interpolation coefficient $k_x[4]$ and vertical interpolation coefficient $k_y[4]$, using the equation (3) described in the above.

Referring now back to FIG. 34, the gain setting section 523 calculates the gain value g(p), which is used for adjusting the amount of correction of the contrast of the luminance $logL_c$(p) of the smoothed image in the contrast correction section 524, for the individual pixel positions based on the representative value γ received from the tone curve correction section 521, and outputs it to the contrast correction section 524.

The gain value g(p) will be explained below. For a gain value of g(p)=1, contrast is not enhanced nor suppressed by the contrast enhancement section 524. For a gain value of g(p)>1, contrast is enhanced corresponding to the value. On the contrary, for a gain value of g(p)<1, contrast is suppressed corresponding to the value.

Outline of the gain value setting by the gain setting section 523 is similar to the gain value setting by the above-described gain setting section 93, so that the explanation therefor will be omitted.

Figure 41:
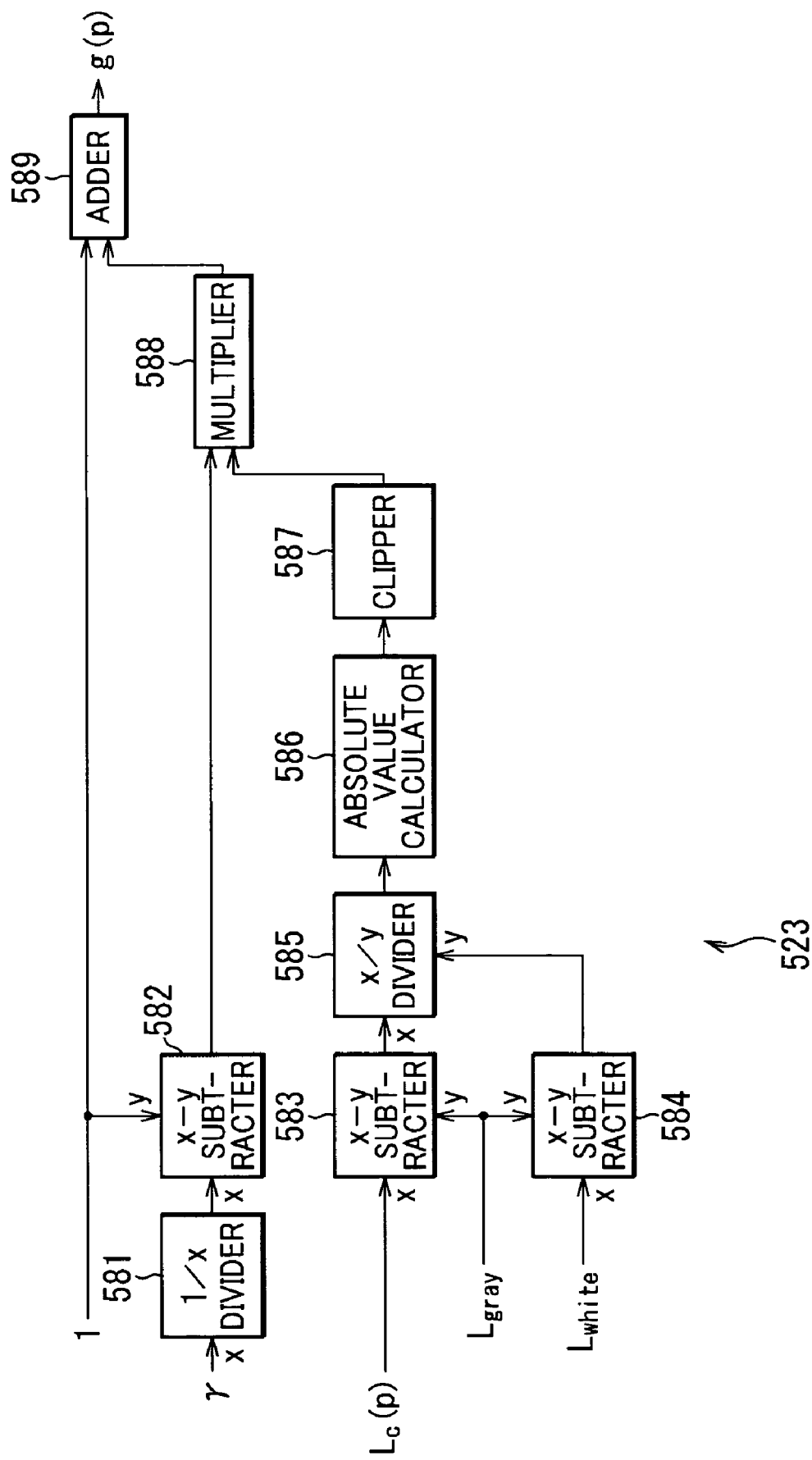
FIG. 41 is a block diagram showing an exemplary configuration of a gain value setting section shown in FIG. 34.

FIG. 41 shows an exemplary configuration of the gain value setting section 523. A divider 581 calculates the inverse 1/γ=$g_0$ of the representative value γ received from the preceding stage, and outputs it to a subtracter 582. The subtracter 582 calculates ($g_0$−1) and output it to a multiplier 588.

A subtracter 583 calculates difference ($L_c$−$L_{gray}$) between the individual luminance of the tone-curve-corrected image $L_c$ and the luminance $L_{gray}$ having a moderate gray level, and outputs it to a divider 585. The subtracter 584 calculates difference ($L_{white}$−$L_{gray}$) between the luminance $L_{white}$ having a white clipping level and luminance $L_{gray}$, and outputs it to a divider 585. The divider 585 divides the output ($L_c$−$L_{gray}$) of the subtracter 583 by the output ($L_{white}$−$L_{gray}$) of the subtracter 584, and outputs it to an absolute value calculator 586. The absolute value calculator 586 calculates an absolute value of the output from the subtracter 585, and outputs it to a clipper 587. The clipper 587 clips the output from the absolute value calculator 586 so as to adjust it to 1 when the output exceeds 1, but leaves it unchanged when the output does not exceed 1, and outputs the result as attn(p) to a multiplier 588.

The multiplier 588 multiplies the output from the subtracter 582 by the output from the clipper 587, and outputs the product to an adder 589. The adder 589 adds 1 to the output from the multiplier 588, and outputs the result as the gain value g(p) to the succeeding stage.

Referring now back to FIG. 34, the contrast correction section 524 enhances the contrast of the tone-curve-corrected image $L_c$ which has previously been weakened, based on the gain value g(p) for the individual pixel positions p received from the gain value setting section 523 and the luminance $L_{cl}(p)$ of the smoothed image received from the smoothed luminance generation section 522, to thereby generate the grayscale-compressed image $L_u$.

Figure 42:
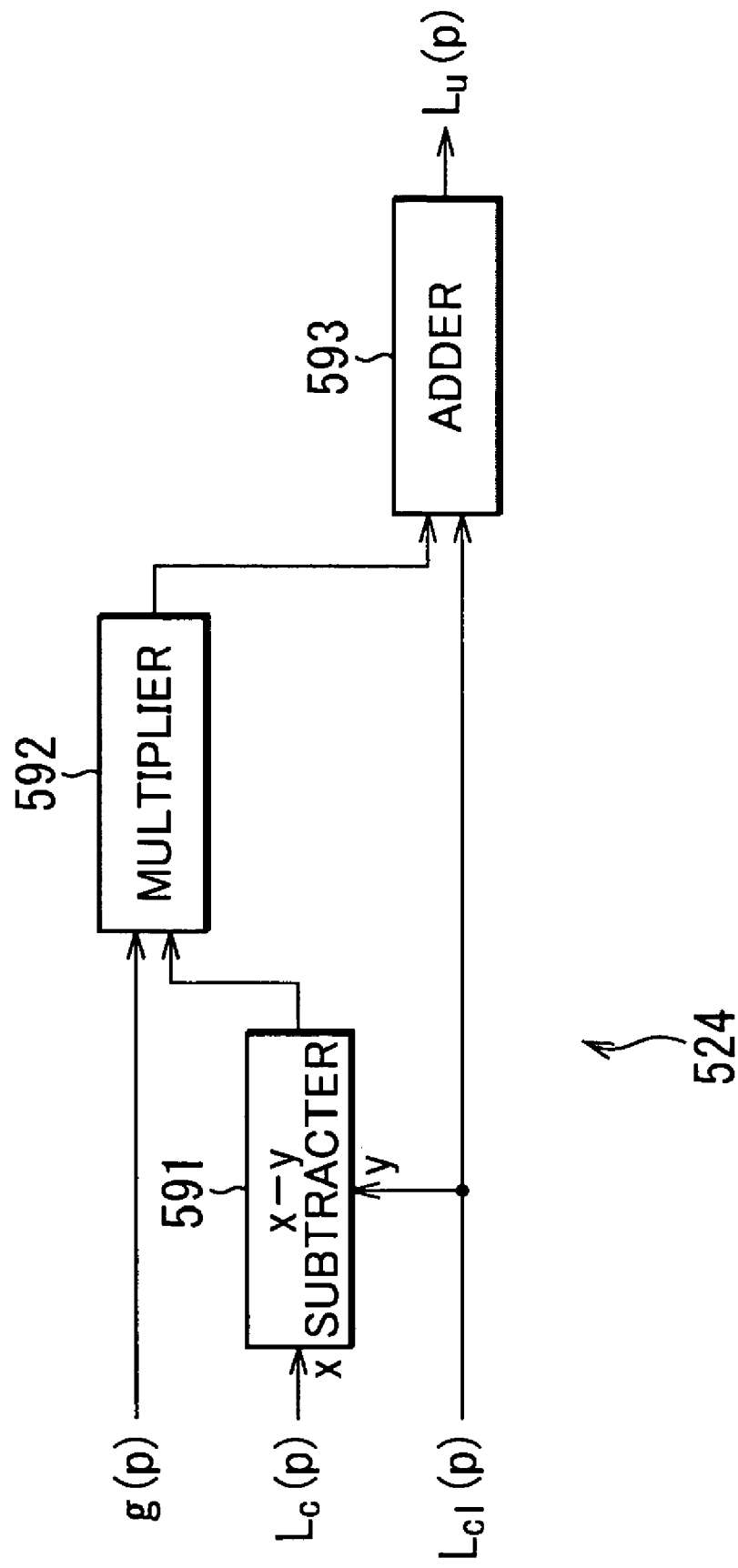
FIG. 42 is a block diagram showing an exemplary configuration of a contrast correction section shown in FIG. 34.

FIG. 42 shows an exemplary configuration of the contrast correction section 524. A subtracter 591 of the contrast correction section 524 calculates difference ($L_c(p) - L_{cl}(p)$) between the luminance $L_c(p)$ of the individual pixels of the tone-curve-corrected image $L_c$ and the luminance of the corresponded pixels of the smoothed image (i.e, interpolation value $L_{cl}(p)$ of the reduced image), and outputs it to a multiplier 592. The multiplier 592 calculates a product of an output of the subtracter 591 and the gain value g(p) received from the gain value setting section 523, and outputs the result to an adder 593. The adder 593 adds the luminance of the smoothed image (interpolation value $L_{cl}(p)$ of the reduced image) to an output of the multiplier 592, and outputs the obtained luminance $L_u(p)$, as the luminance of pixels composing the contrast-corrected, grayscale-compressed image $L_u$, to the succeeding stage.

It is to be noted now that the luminance of pixels of the smoothed image (interpolation value $L_{cl}(p)$ of the reduced image) is an interpolated value based on the pixels of the m×n-pixel reduced image $L_{cl}$, and therefore has only an extremely-low-frequency component of the image $L_c$ before being reduced.

Hence, the output ($L_c(p) - L_{cl}(p)$) of the subtracter 591 is equivalent to that obtained by subtracting only the extremely-low-frequency component from the original tone-curve-corrected image $logL_c$. The luminance $L_u(p)$ of the contrast-corrected, grayscale-compressed image is such as being obtained, as described in the above, by dividing the luminance signal into the extremely-low-frequency component and other components, and of these, the components other than the low-frequency components (output of the subtracter 591) are enhanced in the contrast by being multiplied by the gain value g(p), and by again synthesizing the both using the adder 593.

As described in the above, the contrast correction section 524 is configured so as to enhance the components in the low-to-middle-frequency region and high-frequency region, except for the extremely-low-frequency region, using the same gain value g(p). Therefore, it is made possible to obtain an image having the contrast enhanced very naturally to the eyes, without generating a local overshoot of the edge portion which may otherwise be distinct when only the high-frequency component is enhanced.

Figure 33:
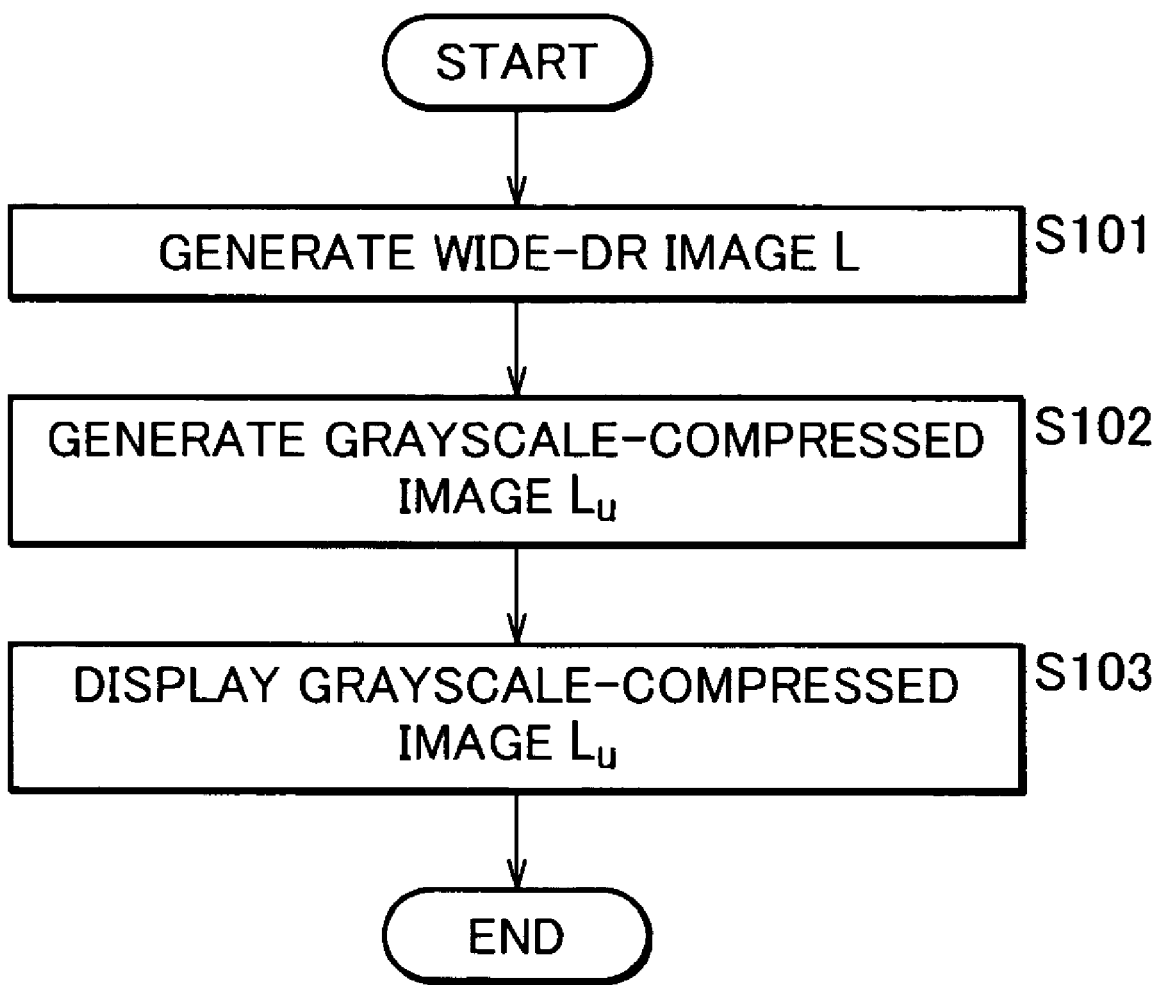
FIG. 33 is a flow chart for explaining operation of an image processing system shown in FIG. 32.
Figure 43:
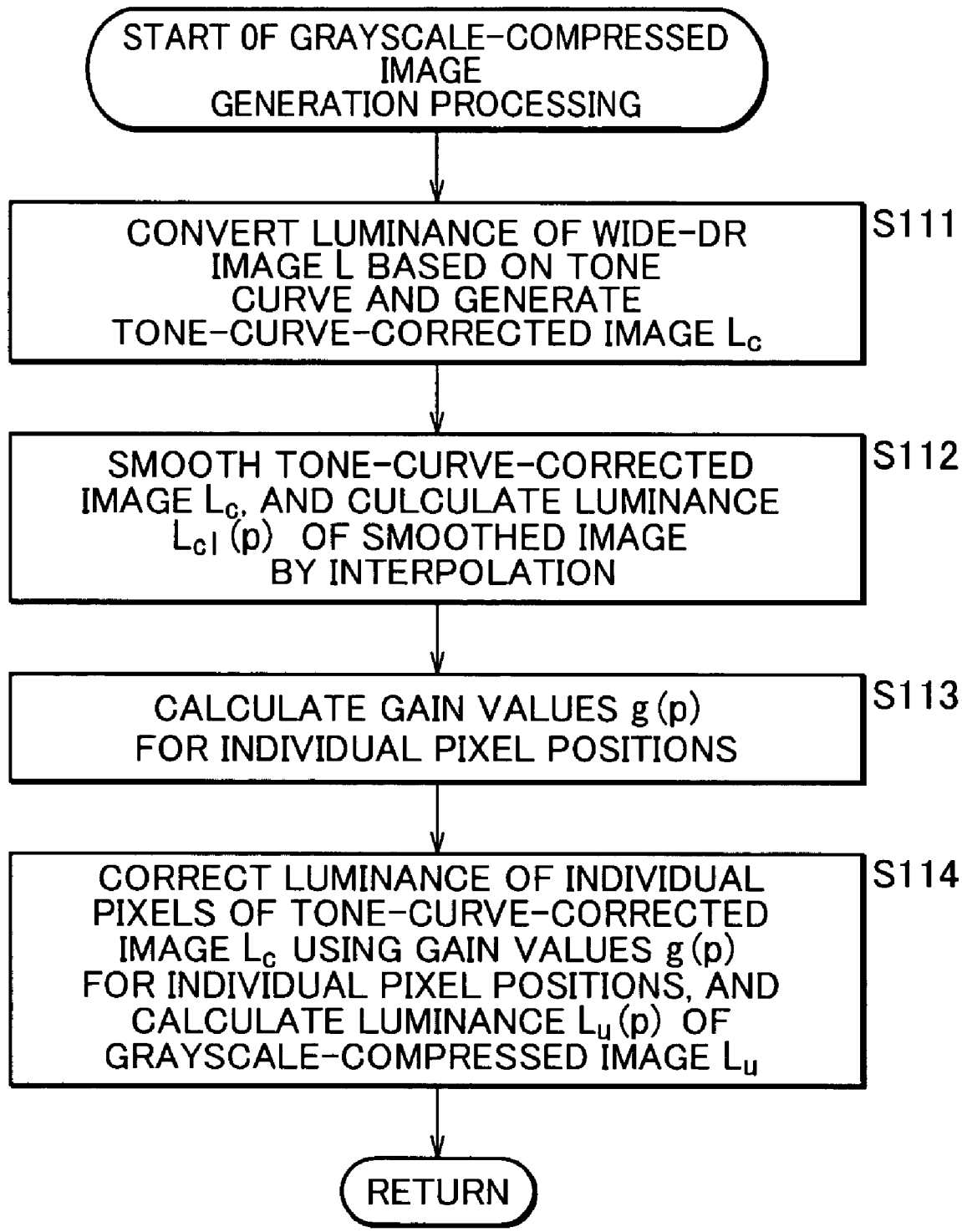
FIG. 43 is a flow chart for explaining grayscale-compressed image generation processing by the first exemplary configuration of the image processing apparatus.

Next, the grayscale-compressed image generation processing by the image processing apparatus 510 according to the first exemplary configuration (i.e., the processing in step S102 described in the above referring to the flow chart in FIG. 33) will be explained referring to the flow chart in FIG. 43.

In step S111, the tone curve correction section 521 corrects the luminance of the wide-DR image L received from the video camera 502 based on the preliminarily-obtained LUT, and outputs the obtained tone-curve-corrected image $L_c$ to the smoothed luminance generation section 522, gain value setting section 523, and contrast correction section 524. The tone curve correction section 521 also outputs the representative value γ, which expresses a slope of the tone curve used for the correction, to the gain value setting section 523.

In step S112, the smoothed luminance generation section 522 shrinks the tone-curve-corrected image $L_c$ to thereby generate the reduced image $L_{cl}$, and further calculates the luminance $L_{cl}(p)$ of pixels of the smoothed image based on the interpolation operation using the pixels of the reduced image $L_{cl}$, and outputs the result to the contrast correction section 524.

In step S113, the gain setting section 523 calculates the gain value g(p) which is used for adjusting the amount of correction of the contrast of the luminance $L_c(p)$ of the smoothed image in the contrast correction section 524, for the individual pixel positions based on the representative value γ received from the tone curve correction section 521, and outputs it to the contrast correction section 524.

It is to be noted that the processing in step S112 and step S113 can be carried out in parallel.

In step S114, the contrast correction section 524 corrects the luminance of the tone-curve-corrected image $L_c$, based on the gain value g(p) for the individual pixel positions p received from the gain value setting section 523, and the luminance $L_{cl}(p)$ of the smoothed image received from the smoothed luminance generation section 522, to thereby calculate the luminance $L_u(p)$ of pixels of the grayscale-compressed image $L_u$. The contrast-corrected grayscale-compressed image $L_u$ that is obtained as described above is therefore obtained as an image having the contrast enhanced very naturally to the eyes, without generating a local overshoot of the edge portion which may otherwise be distinct when only the high-frequency component is enhanced. Here is the end of the explanation on the grayscale-compressed image generation processing by the first exemplary configuration of the image processing apparatus 510.

Figure 44:
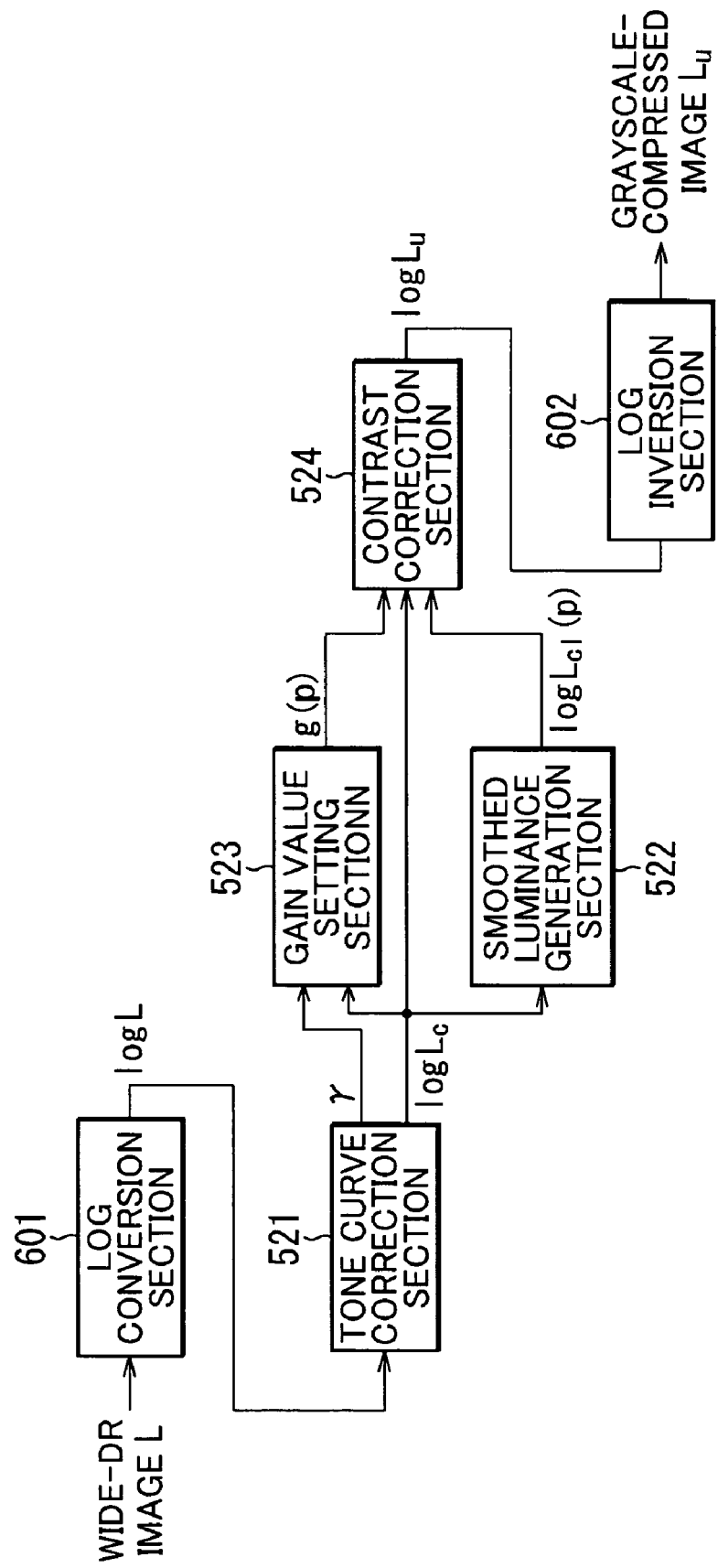
FIG. 44 is a block diagram showing a second exemplary configuration of the image processing apparatus shown in FIG. 32.

FIG. 44 in the next shows a second exemplary configuration of the image processing apparatus 510. The second exemplary configuration is such as being configured so that a logarithmic conversion section 601 for effecting the logarithmic conversion of the luminance of the wide-DR image L received from the video camera 501 is provided in the preceding stage of the tone curve correction section 521 in the first exemplary configuration shown in FIG. 34, and so that a logarithmic inversion section 602 for effecting the logarithmic inversion of the output of the contrast correction section 524 is provided in the succeeding stage of the contrast correction section 524 in the first exemplary configuration.

Any constituents other than the logarithmic conversion section 601 and logarithmic inversion section 602 composing the second exemplary configuration of the image processing apparatus 510 are equivalent to those in the first exemplary configuration shown in FIG. 34, and are given with the same reference numerals, so that the explanations therefor will be omitted. It is to be noted herein in the second exemplary configuration that the sections from the tone curve correction section 521 to the contrast correction section 524 individually processes the luminance after logarithmic conversion.

The tone curve correction section 521 in the second exemplary configuration adopts the tone curve such as shown in FIG. 4, for example. Application of the monotonously-increasing moderate inverse-S-shaped curve as shown in FIG. 4 will not give so strong effect of grayscale compression in the high luminance region and low luminance region, so that it is possible to obtain a desirable tone with less degree of whiteout or blackout even after the grayscale compression. On the contrary, the grayscale compression will strongly affect the middle luminance region, but this means that the contrast correction can fully be applied with the middle luminance region, and results in a desirable grayscale-compressed image $L_u$ with a less degree of contrast correction also in the middle luminance range. The tone curve herein has a representative value γ of 0.67.

Figure 45:
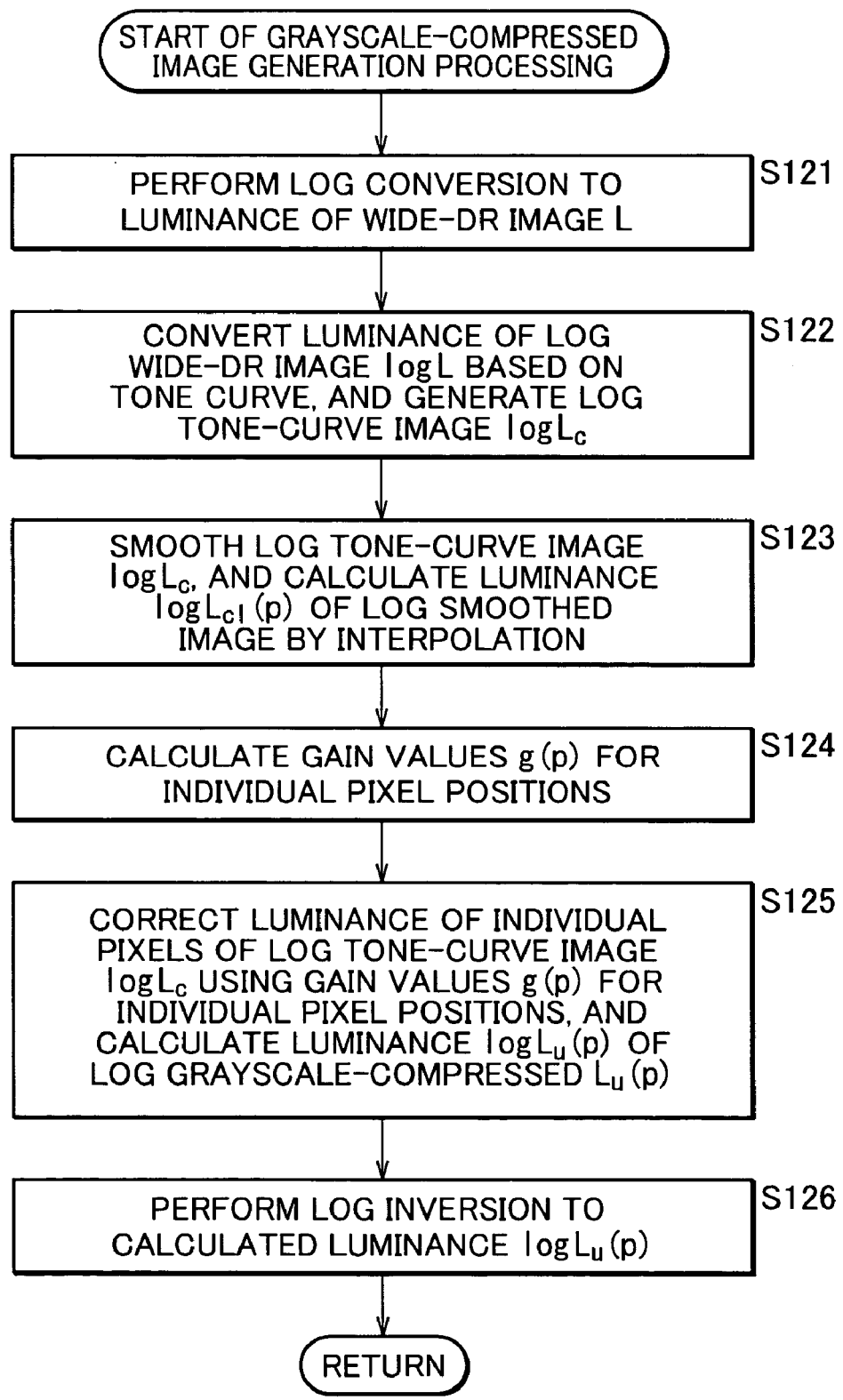
FIG. 45 is a flow chart for explaining grayscale-compressed image generation processing by the second exemplary configuration of the image processing apparatus.

Next, details of the grayscale-compressed image generation processing according to the second exemplary configuration of the image processing apparatus 510 will be explained referring to the flow chart in FIG. 45.

In step S121, the logarithmic conversion section 601 subjects the wide-DR image L received from the video camera 502 2 into logarithmic conversion, and outputs the obtained logarithmic wide-DR image logL to the tone curve correction section 521.

In step S122, the tone curve correction section 521 corrects the luminance of the logarithmic wide-DR image logL, typically based on the preliminarily-obtained LUT, which corresponds to the tone curve shown in FIG. 4, and outputs the obtained logarithmic tone-curve-corrected image $logL_c$ to the smoothed luminance generation section 522, gain value setting section 523, and contrast correction section 524. The tone curve correction section 521 also outputs the representative value γ, which expresses a slope of the tone curve used for the correction, to the gain value setting section 523.

In step S123, the smoothed luminance generation section 522 shrinks the logarithmic tone-curve-corrected image $logL_c$ to thereby generate the logarithmic reduced image $logL_{cl}$, and further calculates the luminance $logL_{cl}(p)$ of pixels of the logarithmic smoothed image by the interpolation operation using pixels of the logarithmic reduced image $logL_{cl}$, and outputs the result to the contrast correction section 524.

In step S124, the gain setting section 523 calculates the gain value g(p) which is used for adjusting the amount of correction of the contrast of the luminance $logL_c(p)$ of the logarithmic smoothed image in the contrast correction section 524, for the individual pixel positions based on the representative value γ received from the tone curve correction section 521, and outputs it to the contrast correction section 524.

It is to be noted that the processing in step S123 and step S124 can be carried out in parallel.

In step S125, the contrast correction section 524 corrects the luminance of the logarithmic tone-curve-corrected image $logL_c$ based on the gain value g(p) for the individual pixel positions p received from the gain value setting section 523, and the luminance $logL_{cl}(p)$ of the logarithmic smoothed image received from the smoothed luminance generation section 522, to thereby calculate the luminance $logL_u(p)$ of pixels of the logarithmic grayscale-compressed image $logL_u$, and outputs it to the logarithmic inversion section 602.

In step S126, the logarithmic inversion section 602 subjects the luminance $logL_u(p)$ of pixels of the logarithmic grayscale-compressed image $logL_u$ to the logarithmic inversion, and outputs the obtained $L_u(p)$ as the luminance of pixels of the grayscale-compressed image $L_u$.

Because the contrast-corrected grayscale-compressed image $L_u$ that is obtained as described above will not give so strong effect of grayscale compression in the high luminance region and low luminance region, so that it is possible to obtain a desirable tone with less degree of whiteout or blackout even after the grayscale compression. On the contrary, the grayscale compression will strongly affect the middle luminance region, but this means that the contrast correction can fully be applied with the middle luminance region, and results in a desirable grayscale-compressed image $L_u$ with a less degree of contrast correction also in the middle luminance range. Here is the end of the explanation of the grayscale-compressed image generation processing according to the second exemplary configuration of the image processing apparatus 510.

As has been described in the above, the image processing apparatus 510 according to one embodiment of the present invention makes it possible to convert a wide-DR image, having a dynamic range of luminance wider than the usual, to a grayscale-compressed image displayable on the display 111 having only a narrow dynamic-range of displayable luminance, based on a configuration largely reduced in a large capacity of memory (used as a frame memory and data delay line) which has been indispensable for the conventional grayscale compression technique, without ruining the nice-looking property. It is also made possible to obtain a grayscale-compressed image which is by no means inferior to that obtained by the grayscale compression processing conventionally been realized using a large-scale filtering.

Of course, the image processing apparatus 510 can convert the wide-DR image into the grayscale-compressed image, while being adapted to the dynamic range expressible on printers and projectors, besides the display 511.

The present invention is typically applicable to image signal processing circuit incorporated not only in photographing apparatuses such as digital video camera and digital still camera, but also in expression apparatuses such as display, printer, projector and so forth.

A series of processing described in the above can be executed on the hardware basis, but can be executed also on the software basis. For the case where the series of processing is executed on the software basis, a program composing the software is installed from a recording medium on a computer incorporated in a dedicated hardware, or, for example, to a general-purpose personal computer which can execute a variety of functions after being installed with a variety of programs.

FIG. 46 shows an exemplary configuration of a general-purpose personal computer. The personal computer 620 has a CPU (Central Processing Unit) 621 incorporated therein. The CPU 621 is connected with an input/output interface 625 via a bus 624. The bus 624 is connected with a ROM (Read Only Memory) 622 and a RAM (Random Access Memory) 623.

The input/output interface 625 is connected with an input section 626 which is constructed from an input apparatus such as keyboard, mouse and so forth through which the user enters operational commands, an output section 627 for outputting processing operation screen or resultant image of processing on a display apparatus, a storage section 628 structured with a hard disk drive and so forth for storing programs of various data, and an I/O interface 629 used for image data communication with the video camera 502 or the like. It is also connected with a drive 630 used for writing/reading of data to or from a recording medium such as a magnetic disk 631 (including flexible disk), optical disk 632 (including CD-ROM (Compact Disc-Read Only Memory) and DVD (Digital Versatile Disc)), a magneto-optical disk 633 (including MD (Mini Disc)), or a semiconductor memory 634.

The CPU 621 executes various processing according to a program stored in the ROM 622, or a program read out from any of the media ranging from the magnetic disk 631 to semiconductor memory 634 and installed on the storage section 628, and loaded from the storage section 628 to the RAM 623 from the storage section 628. The RAM 623 has, properly stored therein, also data necessary for the CPU 621 to carry out various processing.

It is to be understood that, in this patent specification, the steps for describing the program recorded in a recording medium includes not only processing carried out according to the given order on the time-series basis, but may also contain processing carried out in parallel or individually in place of those always processed on the time-series basis.

It is to be understood that the whole contents of the claims, specifications, drawings and abstracts of Japanese Patent Application No. 2003-003134 (filed on Jan. 9, 2003) and No. 2003-003135 (filed on Jan. 9, 2003) are referred to and incorporated herein in this specification.

INDUSTRIAL APPLICABILITY

As has been described in the above, the present invention makes it possible to realize a grayscale compression technique which requires only a small memory capacity to be consumed and a light load of calculation, allows easy hardware construction, and ensures a large grayscale compression effect.

It is also made possible to appropriately enhance the contrast of image using a smaller capacity of memory, based on a less amount of calculation, and based on a simple hardware construction.

The invention claimed is:

1. An image processing apparatus comprising:
a conversion means for generating a tone-converted image by converting luminance $L_1$ of pixels comprising a first input image based on a conversion function;
a reduced image generation means for generating a reduced image from the tone-converted image;
a smoothing means for generating a smoothed image having luminance $L_c$ of pixels comprising the first input image based on an interpolation calculation using pixels comprising the reduced image; and
a grayscale conversion means for generating a contrast-corrected image based on luminance $L_c$ of pixels comprising the first input image, luminance $L_1$ of pixels comprising the smoothed image, and a predetermined gain value g,
wherein gain value g is determined by an inverse number of a gradient of a tone curve.

2. The image processing apparatus according to claim 1, further comprising:
a gain value setting means for setting a the gain value g, wherein
the gain value setting means can be configured to set the gain value g based on input initial gain value $g_0$, reference gain value 1, and an attenuation value attn($Th_1$, $Th_2$, $L_c$) calculated using a first luminance threshold value $Th_1$, a second luminance threshold value $Th_2$, and luminance $L_c$ of pixels comprising the first input image.

3. The image processing apparatus according to claim 1, further comprising:
a gain value setting means for setting the gain value g based on an initial gain value $g_0$ which expresses an inverse $1/\gamma$ of a slope $\gamma$ of the conversion function,
wherein
the gain value setting means sets the gain value g based on the initial gain value $g_0$, a reference gain value 1, and an attenuation value attn($Th_1$, $Th_2$, $L_c$) calculated using a first luminance threshold value $Th_1$, a second luminance threshold value $Th_2$, and luminance $L_c$ of pixels comprising the tone-converted image.

4. The image processing apparatus according to claim 1, further comprising:
a correction information acquisition means for acquiring correction information including a slope of the conversion function,
wherein the grayscale conversion means generates the contrast-corrected image based on the reduced image and the slope of the conversion function.

5. The image processing apparatus according to claim 4, further comprising:
a hold means for holding the reduced image and the correction information;
wherein the hold means holds the reduced image corresponding to the first input image and a slope of the conversion function applied to the first input image, and the grayscale conversion means generates a contrast-corrected image of a second input image based on the reduced image of the first input image and the slope of the conversion function applied to the first input image, both stored in the hold means.

6. The image processing apparatus according to claim 1, wherein the reduced image generation means generates the reduced image based on a logarithmic luminance logL(p) of the tone-converted image.

7. An image processing method comprising:
generating a tone-converted image by converting luminance $L_1$ of pixels comprising a first input image based on a conversion function;
generating a reduced image based on a logarithmic luminance logL(p) of the tone-converted image;
generating a smoothed image having luminance $L_c$ of pixels comprising the first input image based on an interpolation calculation using pixels comprising the reduced image;
acquiring a correction information based on the reduced image; and
generating a contrast-corrected image based on the correction information, luminance $L_c$ of pixels comprising the first input image, luminance $L_1$ of pixels comprising the smoothed image, and a predetermined gain value g,
wherein gain value g is determined by an inverse number of a gradient of a tone curve.

8. An image processing apparatus comprising:
a conversion unit configured to generate a tone-converted image by converting luminance $L_1$ of pixels comprising a first input image based on a conversion function;
a reduced image generation unit configured to generate a reduced image from the tone-converted image;
a smoothing unit configured to generate a smoothed image having luminance $L_c$ of pixels comprising the first input image based on an interpolation calculation using pixels comprising the reduced image; and
a grayscale conversion unit configured to generate a contrast-corrected image based on luminance $L_c$ of pixels comprising the first input image, luminance $L_1$ of pixels comprising the smoothed image, and a predetermined gain value g,
wherein gain value g is determined by an inverse number of a gradient of a tone curve.

9. The image processing apparatus according to claim 8, wherein the reduced image generation unit is configured to generate the reduced image based on a logarithmic luminance logL(p) of the tone-converted image.

* * * * *

UNITED STATES PATENT AND TRADEMARK OFFICE
CERTIFICATE OF CORRECTION

PATENT NO.        : 7,570,390 B2
APPLICATION NO.   : 10/507274
DATED             : August 4, 2009
INVENTOR(S)       : Mitsunaga It is certified that error appears in the above-identified patent and that said Letters Patent is hereby corrected as shown below:

Claim 2, col. 41, line 42, delete "a" before -- the gain --.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,570,390 B2
APPLICATION NO. : 10/507274
DATED : August 4, 2009
INVENTOR(S) : Tomoo Mitsunaga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Seventh Day of September, 2010

David J. Kappos
*Director of the United States Patent and Trademark Office*